Figure 2:
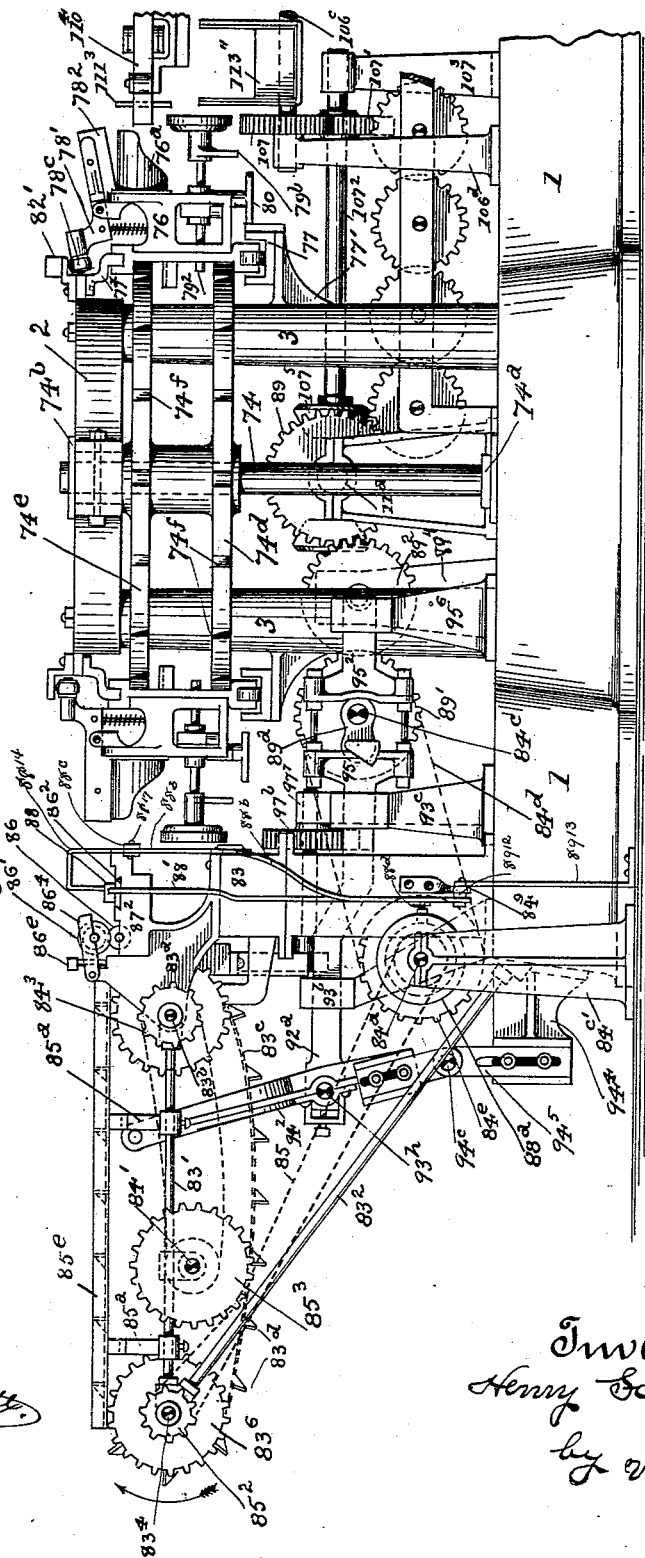

(No Model.)                                      28 Sheets—Sheet 1.

H. SCHAAKE.
CAN BODY SOLDERING MACHINE.

No. 563,069.                              Patented June 30, 1896.

Fig. 1.

Witnesses.
H. Monteverde.
W. N. Cobb.

Inventor.
Henry Schaake.
by Naacken
atty (No Model.) 28 Sheets—Sheet 3.

H. SCHAAKE.
CAN BODY SOLDERING MACHINE.

No. 563,069. Patented June 30, 1896.

Witnesses.

Inventor.
Henry Schaake
by Fra Acken
Atty (No Model.) 28 Sheets—Sheet 4.

H. SCHAAKE.
CAN BODY SOLDERING MACHINE.

No. 563,069. Patented June 30, 1896.

Witnesses.
Inventor.
Henry Schaake
by N. A. Acker
atty

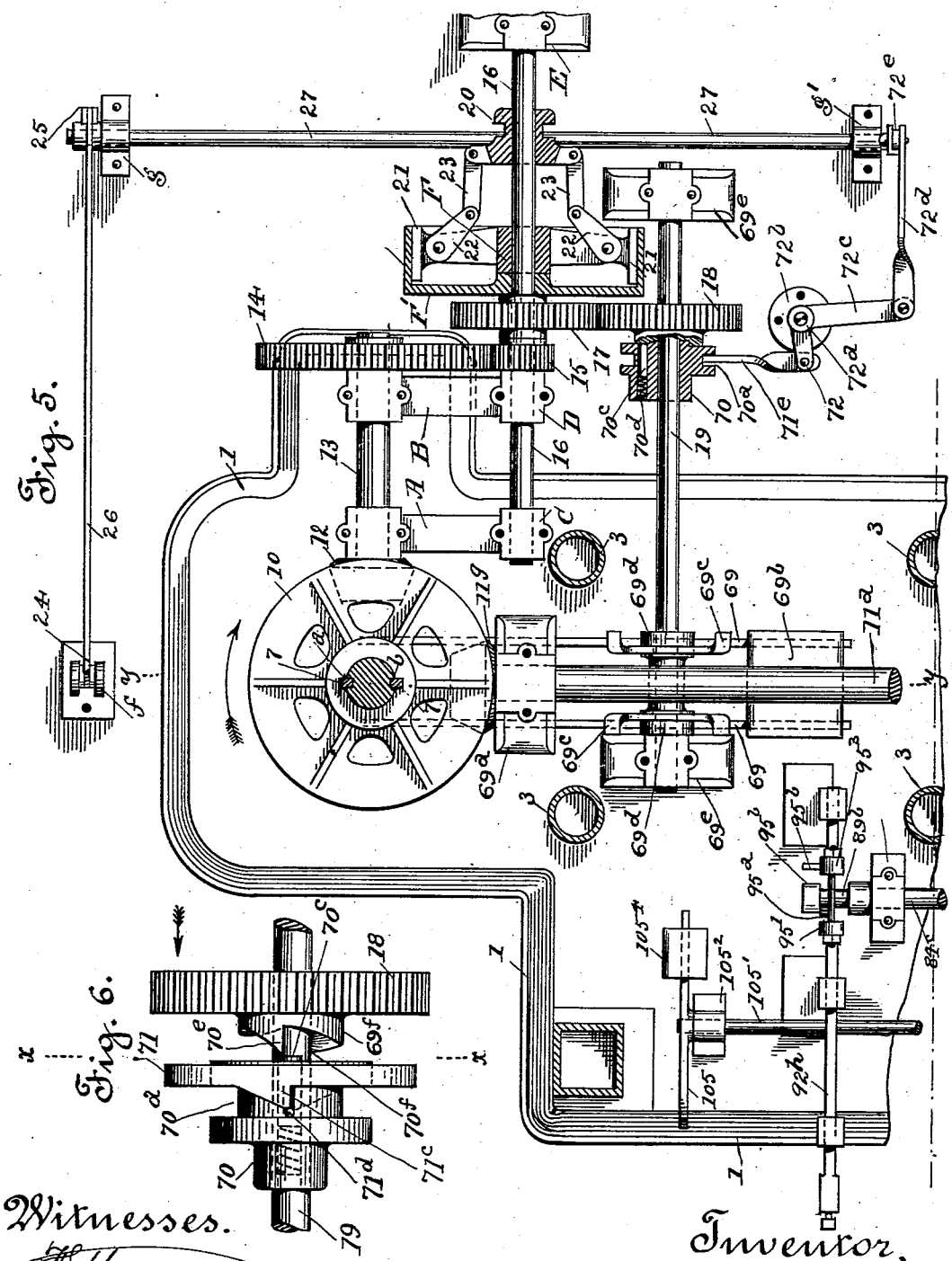

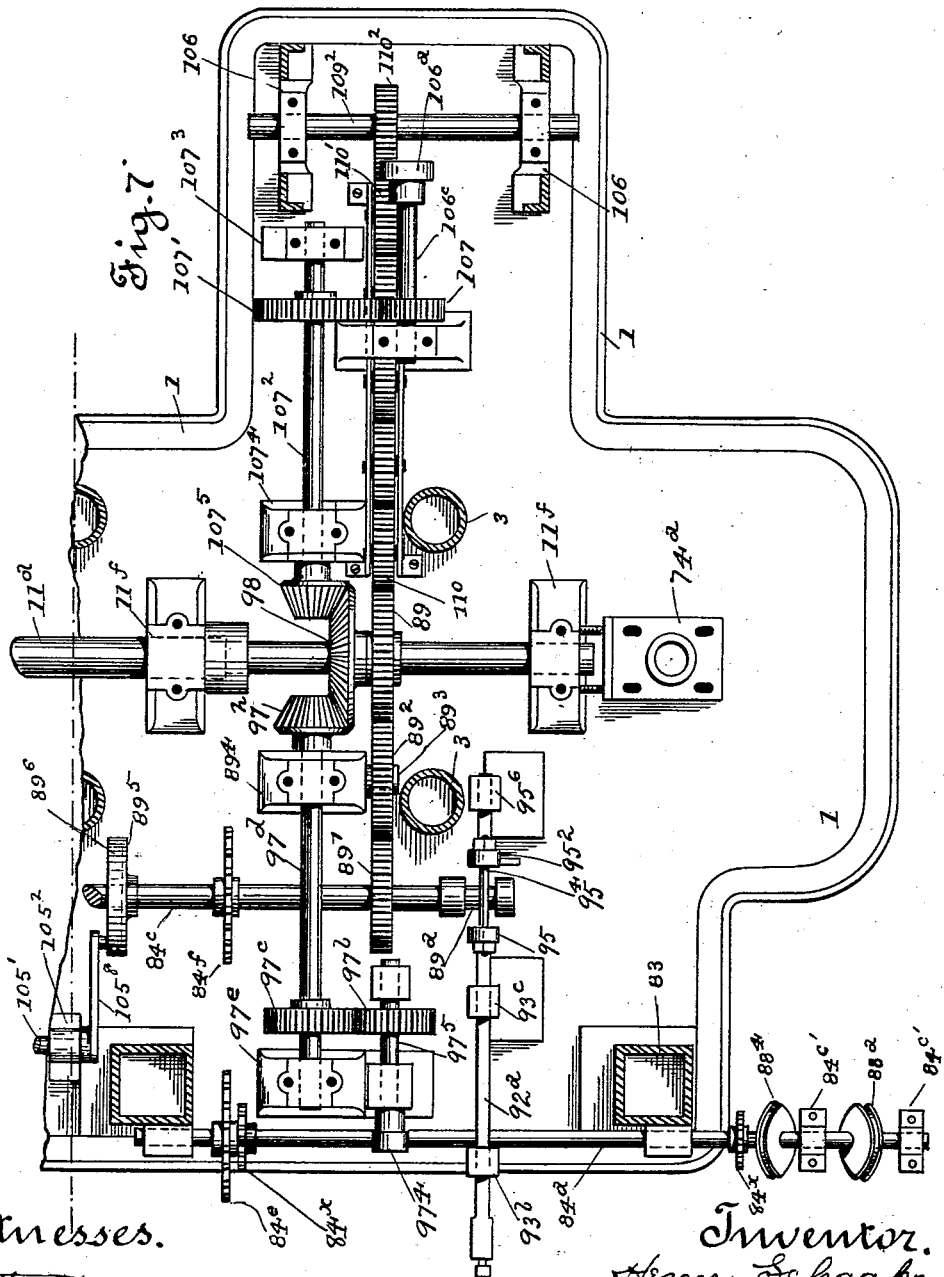

(No Model.) 28 Sheets—Sheet 7.

H. SCHAAKE.
CAN BODY SOLDERING MACHINE.

No. 563,069. Patented June 30, 1896.

Witnesses.

Inventor.
Henry Schaake
by N. A. Acker
Atty (No Model.)

28 Sheets—Sheet 8.

H. SCHAAKE.
CAN BODY SOLDERING MACHINE.

No. 563,069. Patented June 30, 1896.

Witnesses.
Inventor.
Henry Schaake
by v. Acker
Atty

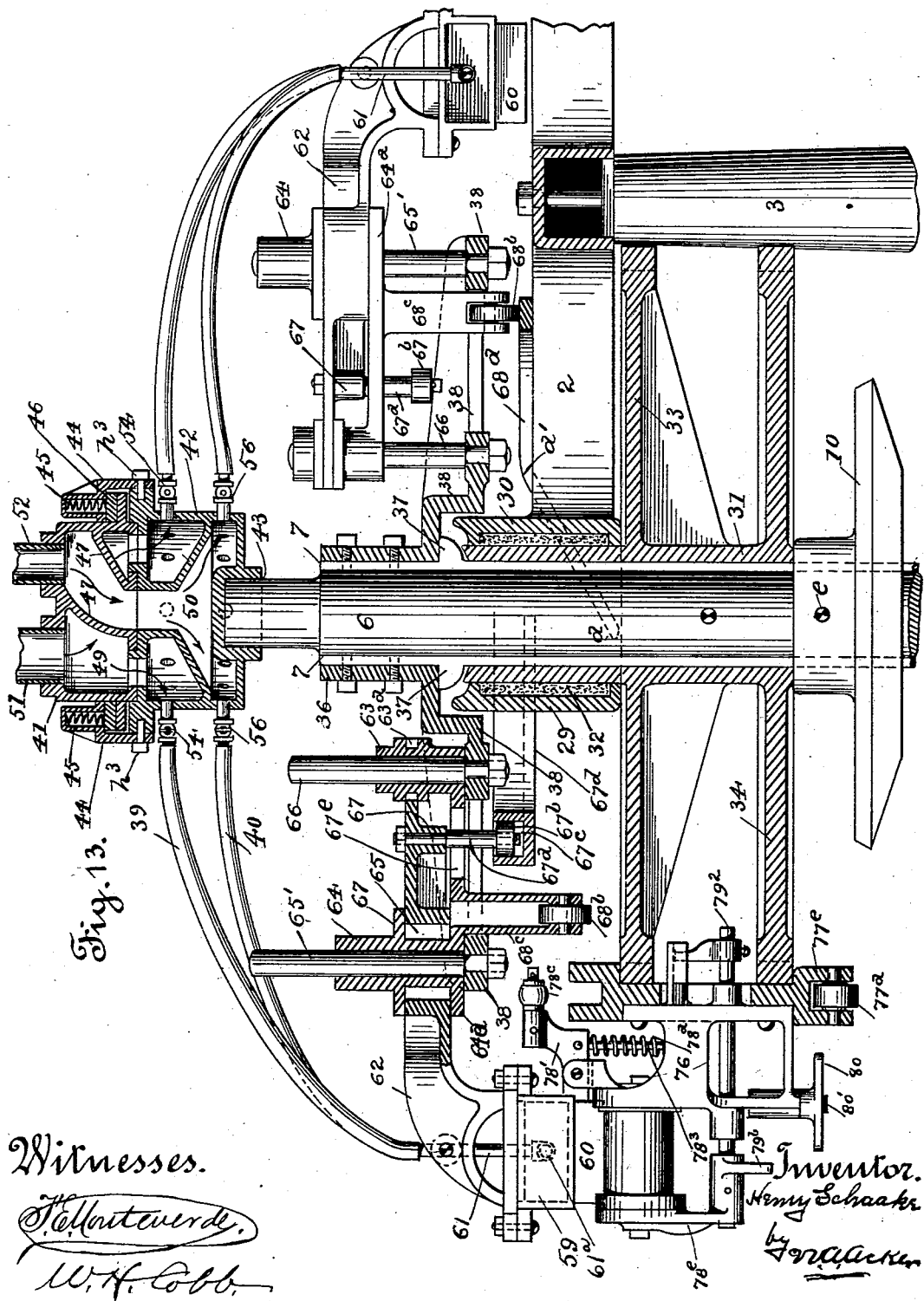

(No Model.) 28 Sheets—Sheet 10.
H. SCHAAKE.
CAN BODY SOLDERING MACHINE.
No. 563,069. Patented June 30, 1896.
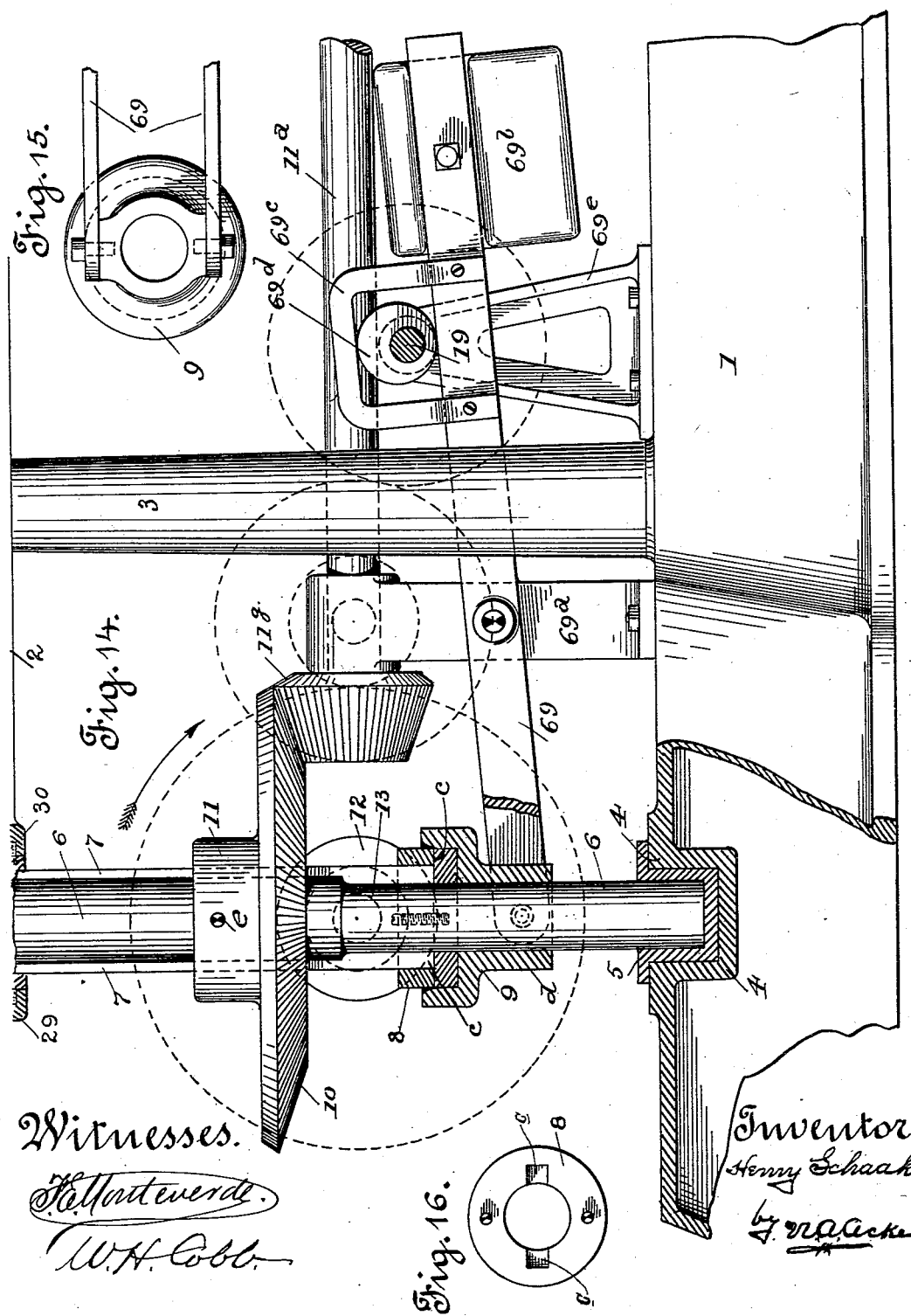
Witnesses.
H. Monteverde
W. H. Cobb
Inventor.
Henry Schaake
by M. A. Acker (No Model.)
28 Sheets—Sheet 11.
H. SCHAAKE.
CAN BODY SOLDERING MACHINE.
No. 563,069. Patented June 30, 1896.
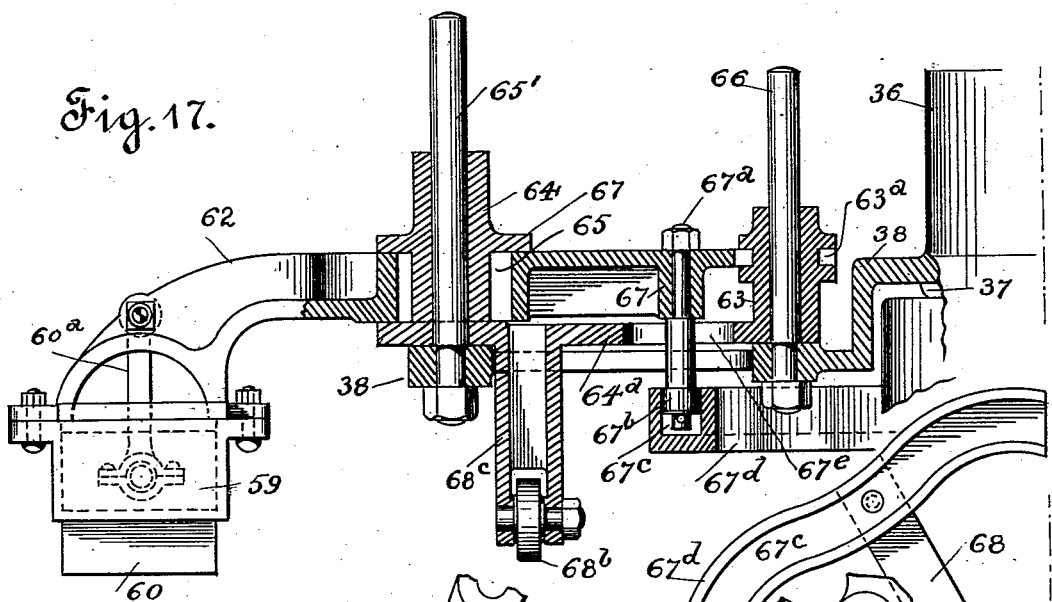
Fig. 17.
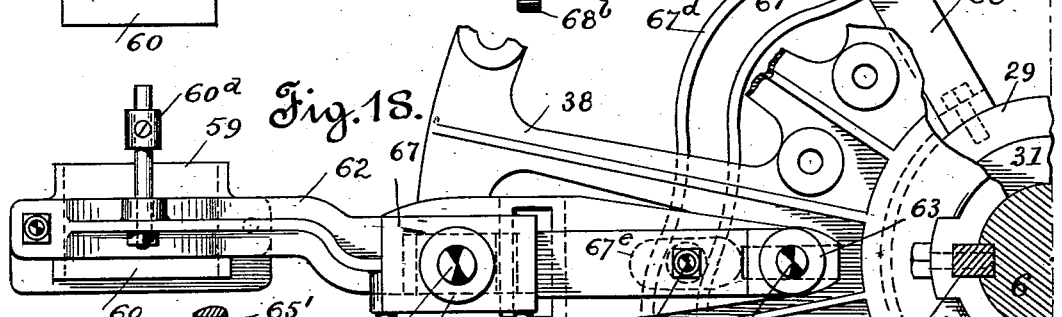
Fig. 18.
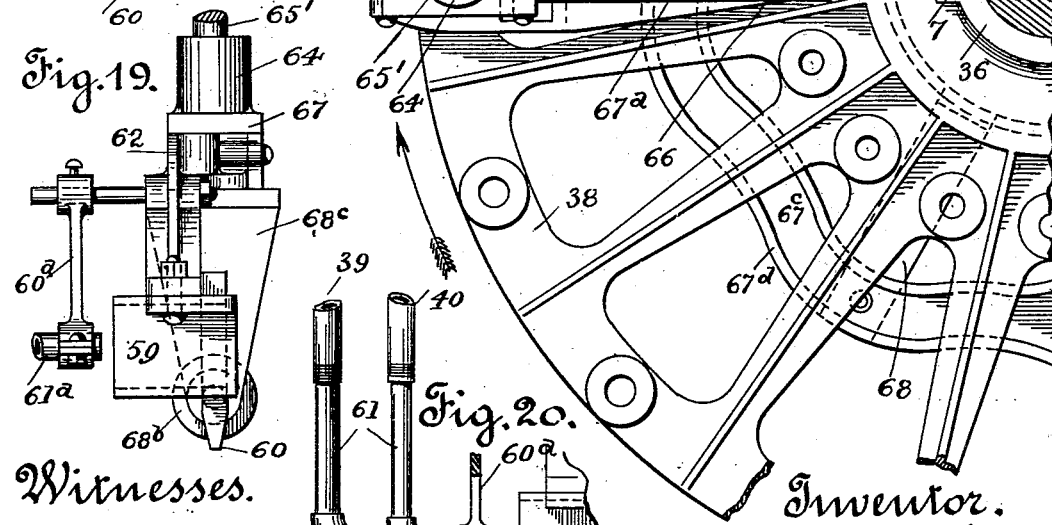
Fig. 19.
Fig. 20.
Witnesses.
J. E. Monteverde
W. H. Cobb
Inventor.
Henry Schaake
by N. A. Acker
atty (No Model.) 28 Sheets—Sheet 12.
H. SCHAAKE.
CAN BODY SOLDERING MACHINE.
No. 563,069. Patented June 30, 1896.
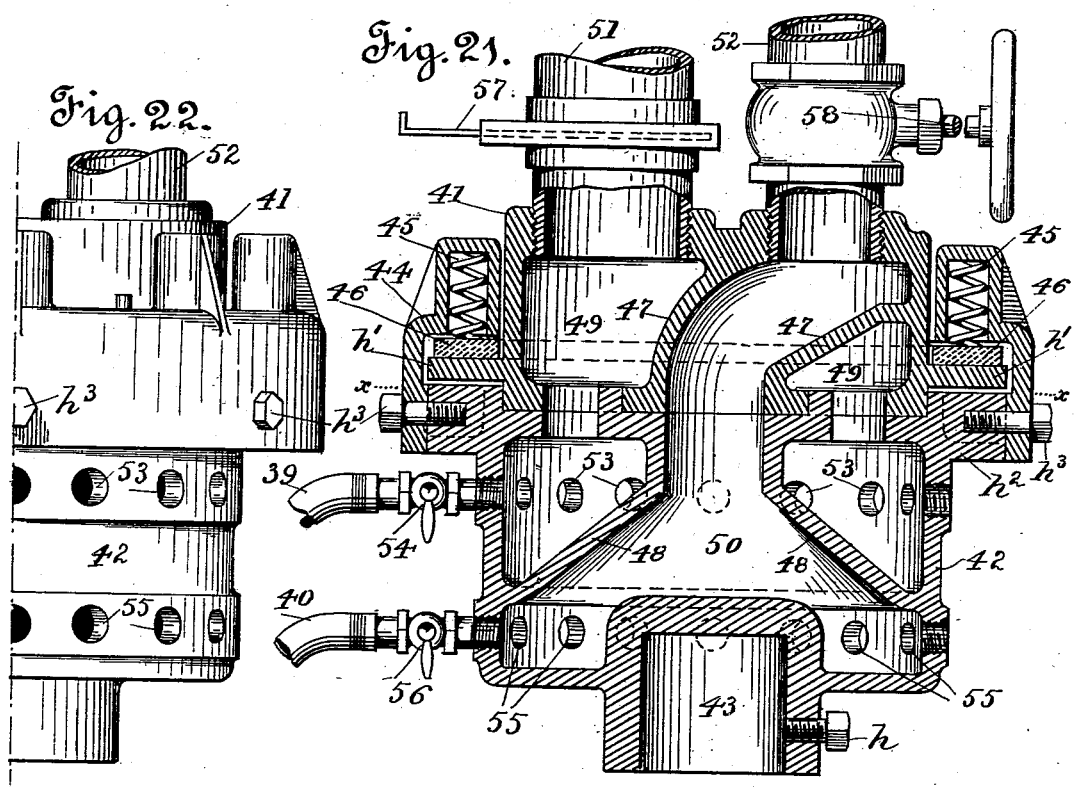
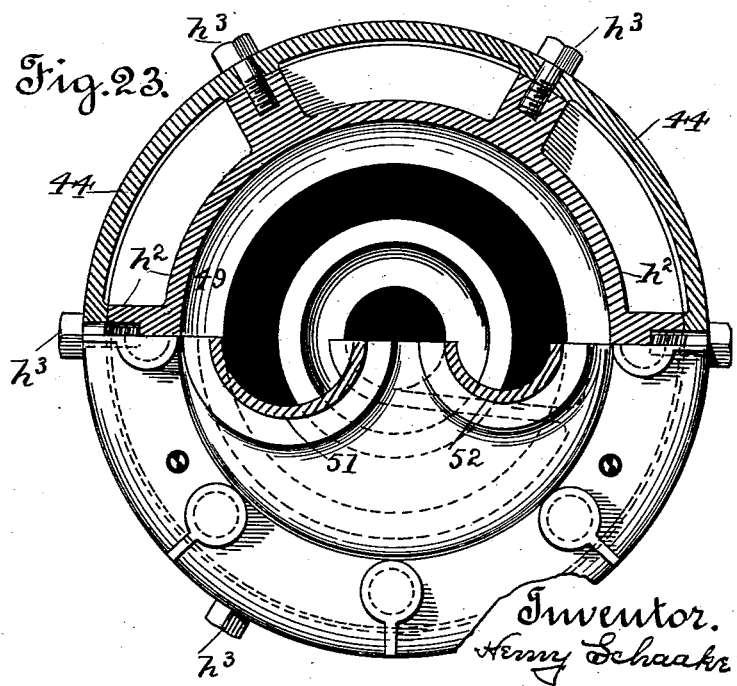
Witnesses.
F. E. Monteverde
W. H. Cobb
Inventor.
Henry Schaake
by V. A. Acker
atty

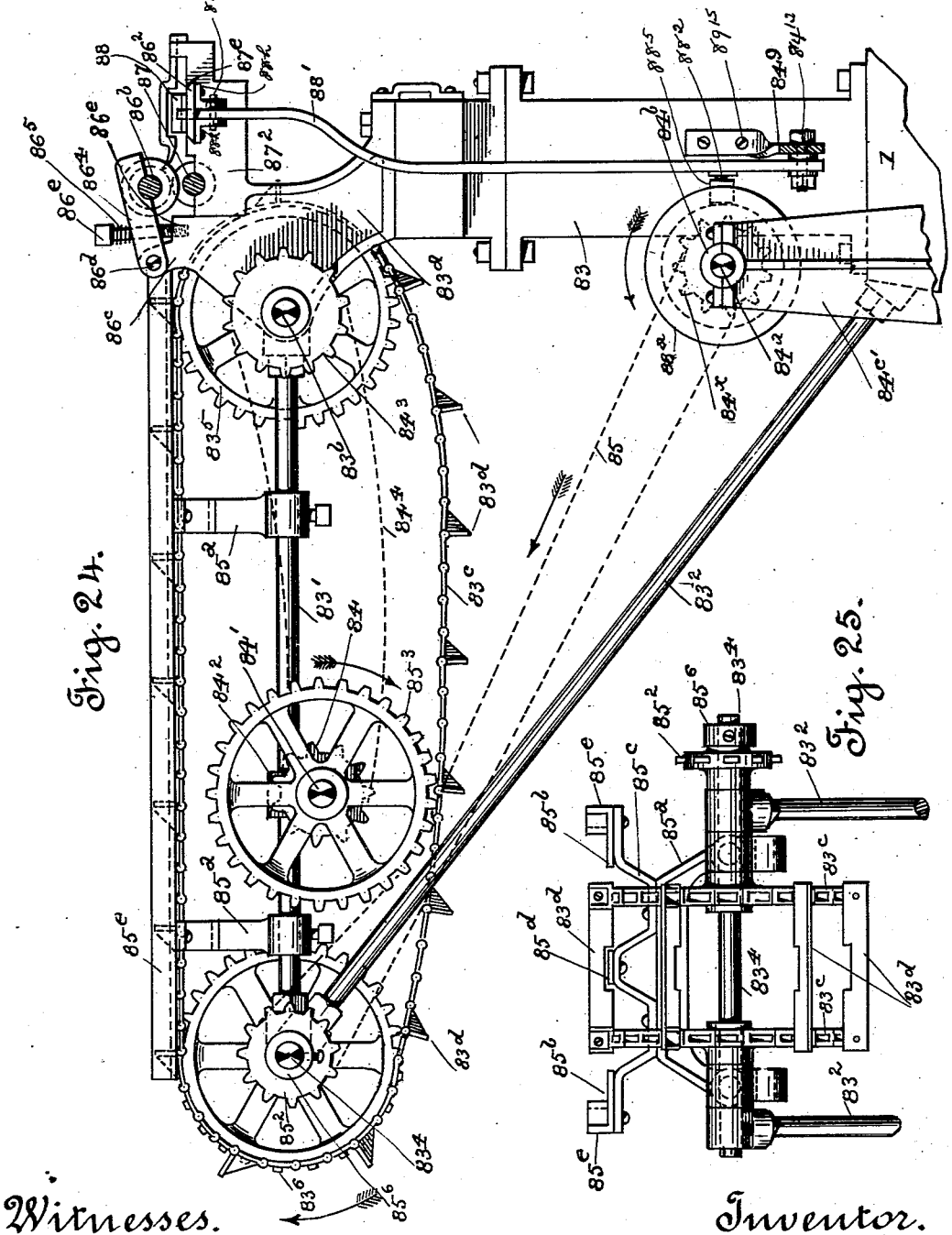

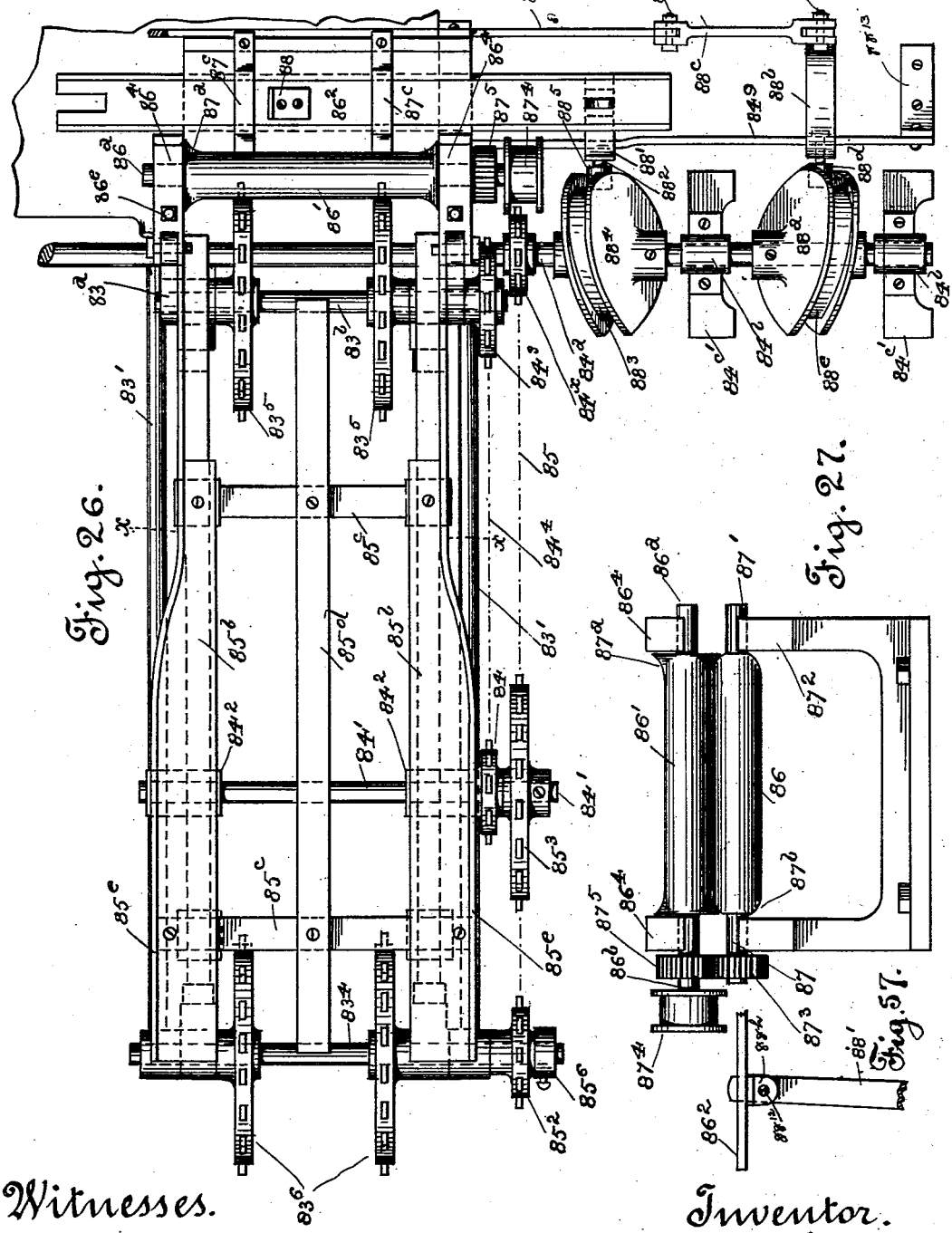

(No Model.) 28 Sheets—Sheet 15.
H. SCHAAKE.
CAN BODY SOLDERING MACHINE.
No. 563,069. Patented June 30, 1896.
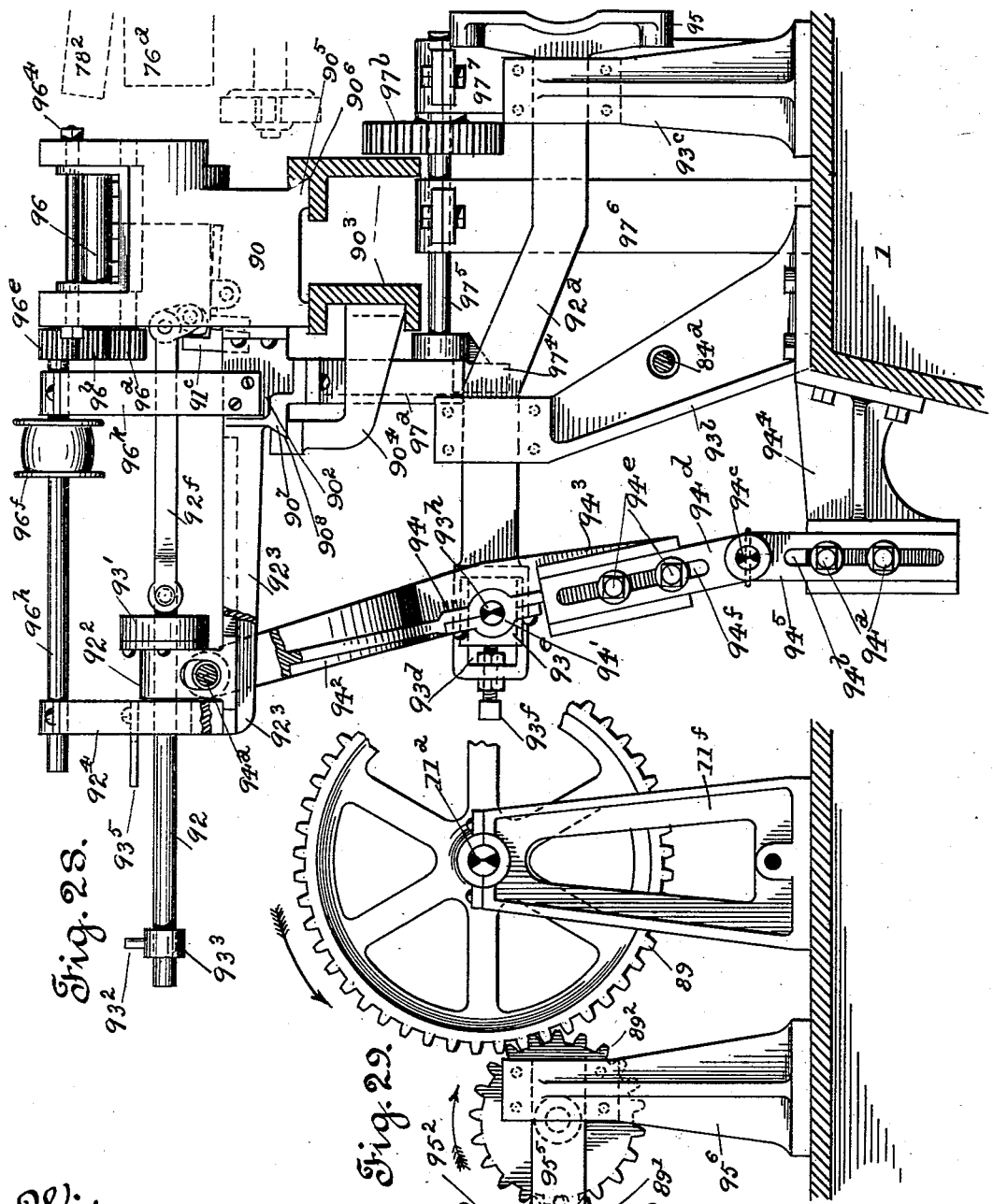

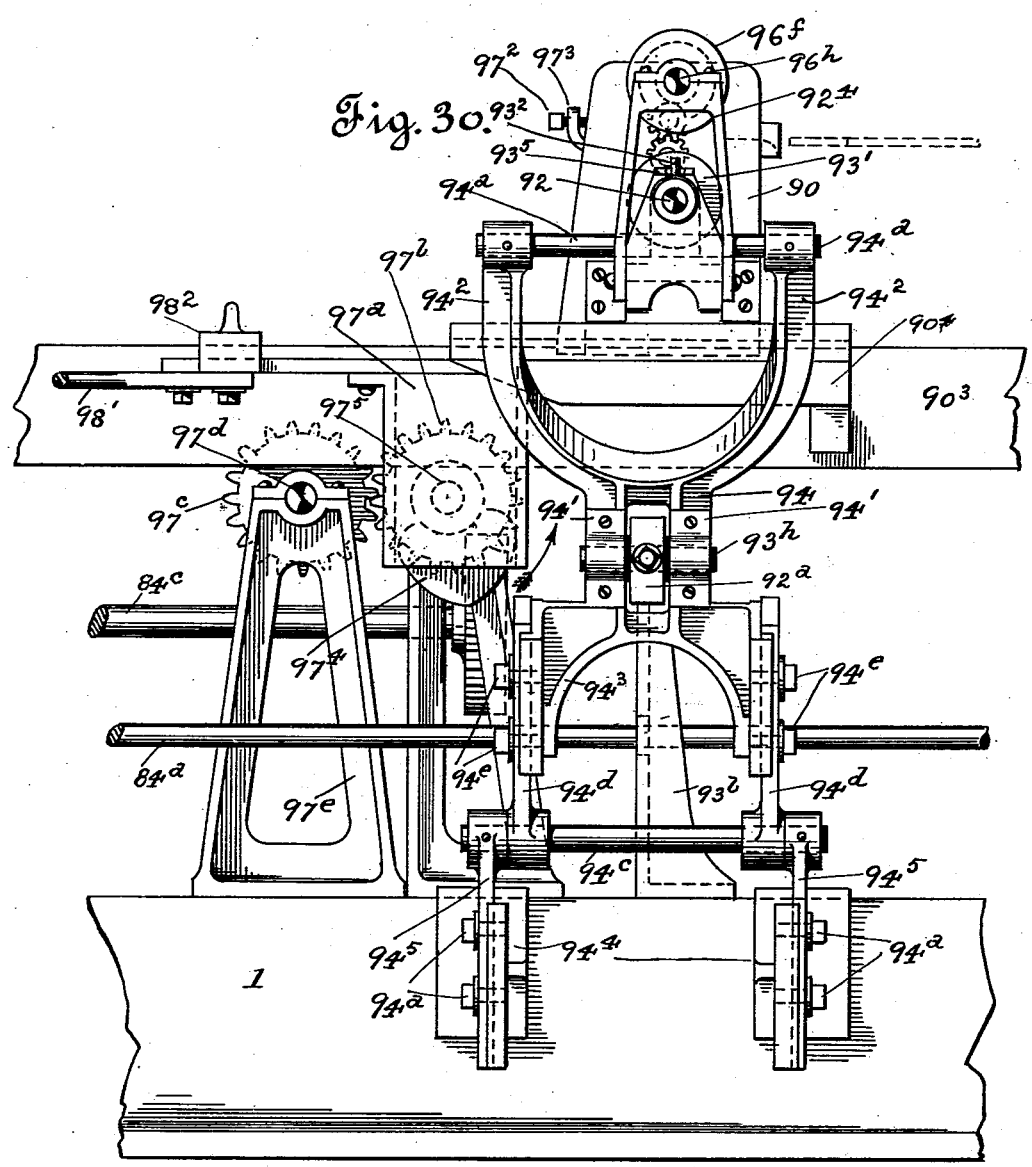

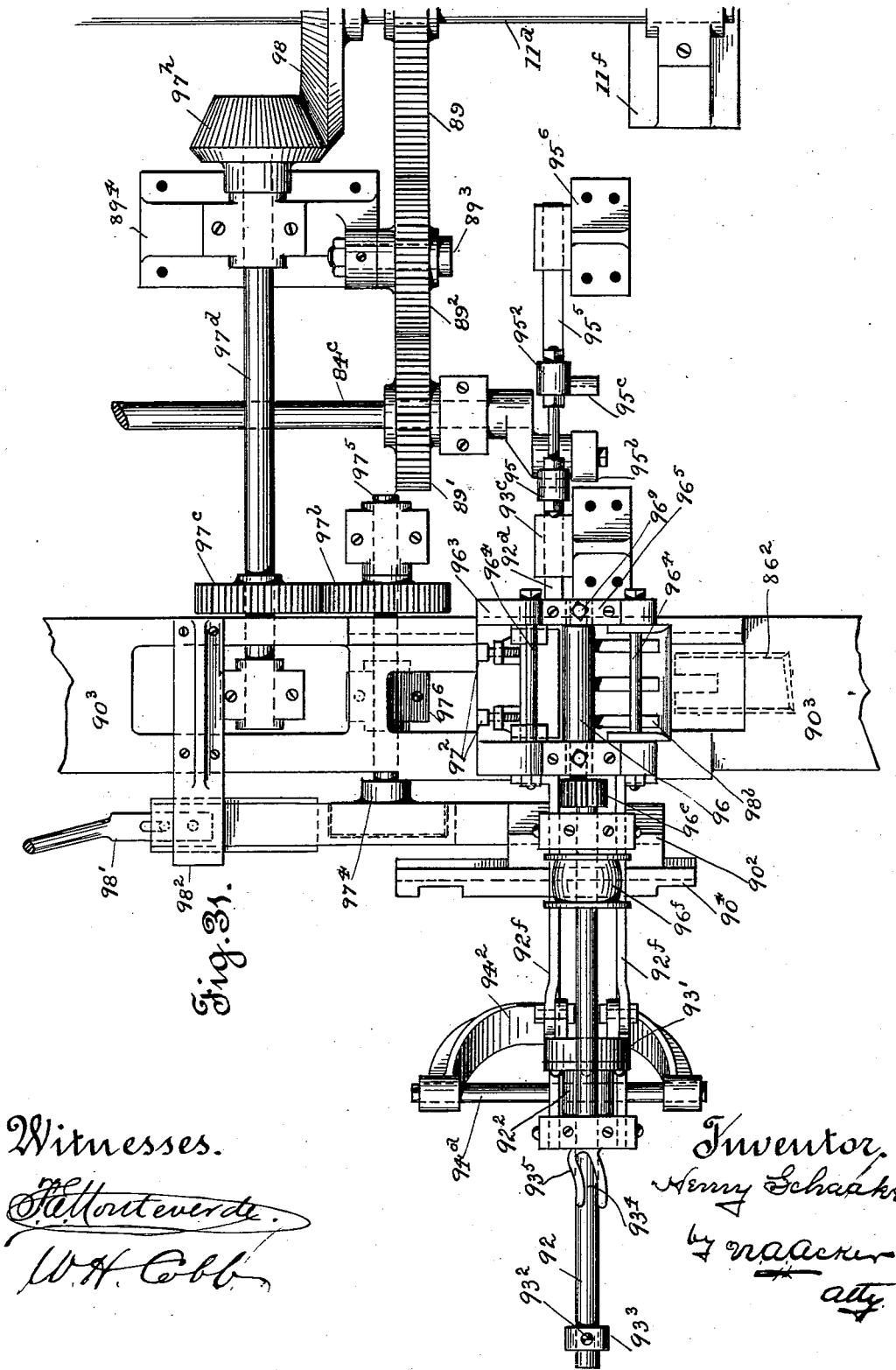

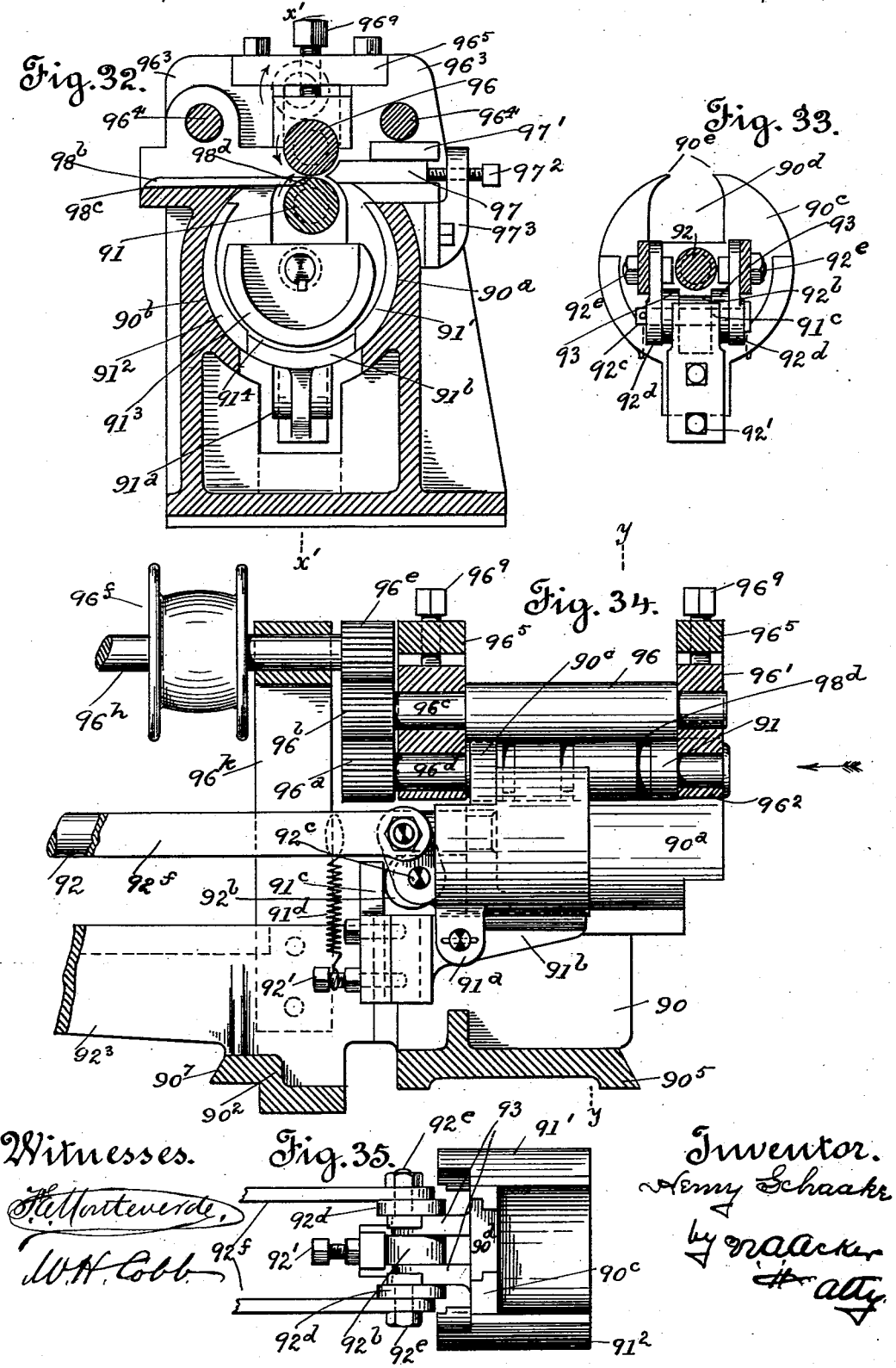

(No Model.) 28 Sheets—Sheet 19.
H. SCHAAKE.
CAN BODY SOLDERING MACHINE.
No. 563,069. Patented June 30, 1896.
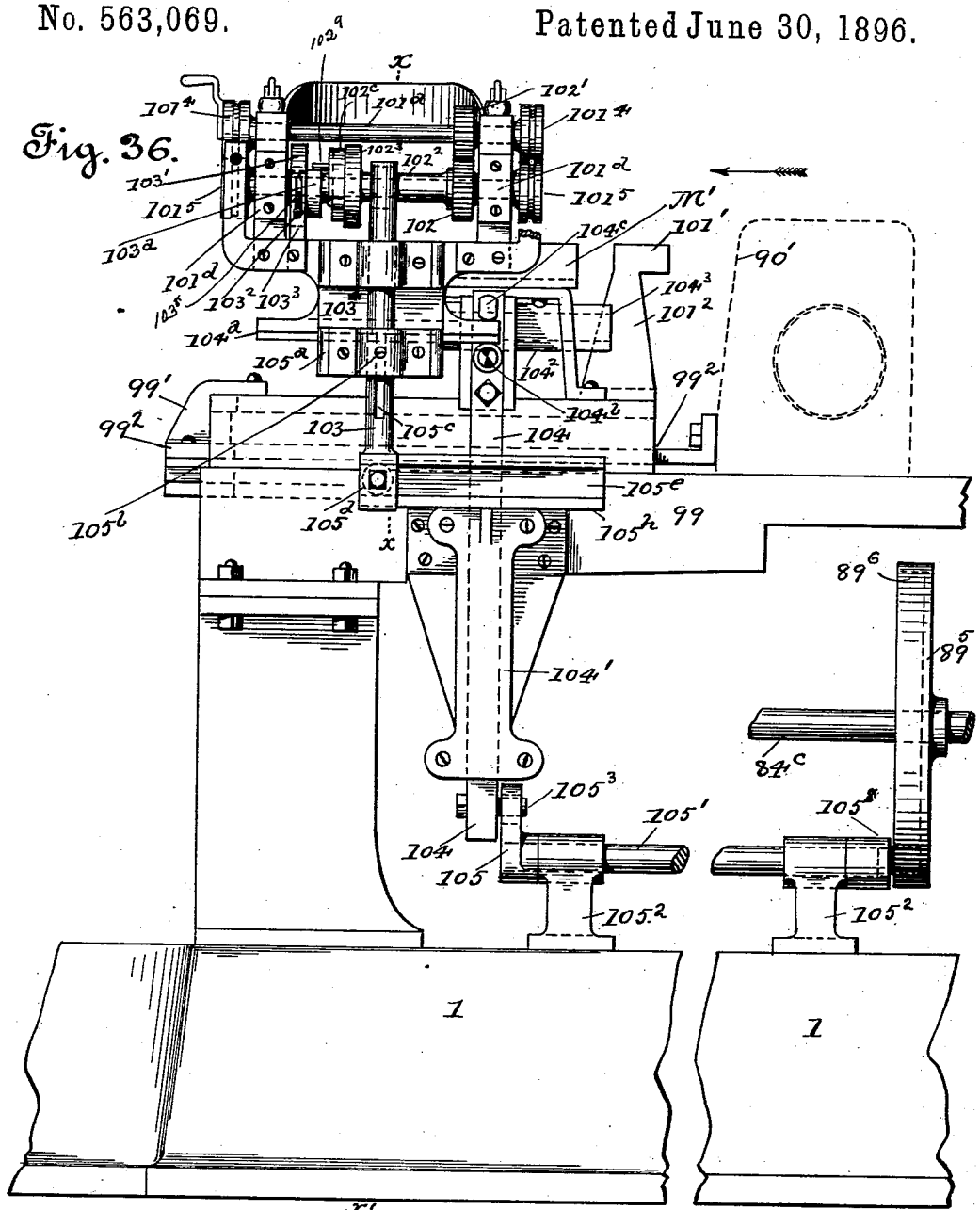
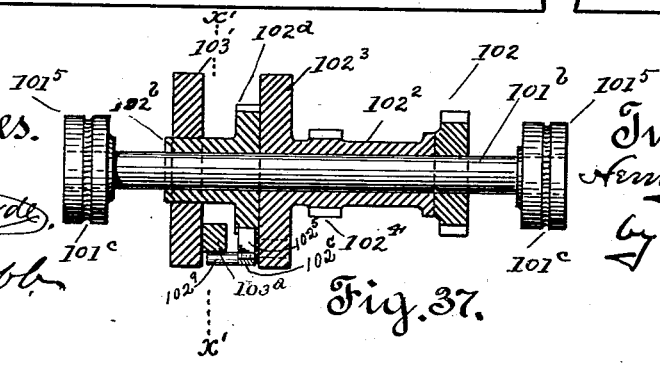
Witnesses.
H. Monteverde
W. H. Cobb
Inventor.
Henry Schaake
by W. A. Acker
atty (No Model.) 28 Sheets—Sheet 20.
H. SCHAAKE.
CAN BODY SOLDERING MACHINE.

No. 563,069. Patented June 30, 1896.

Witnesses.
Inventor.
Henry Schaake
by ... atty.

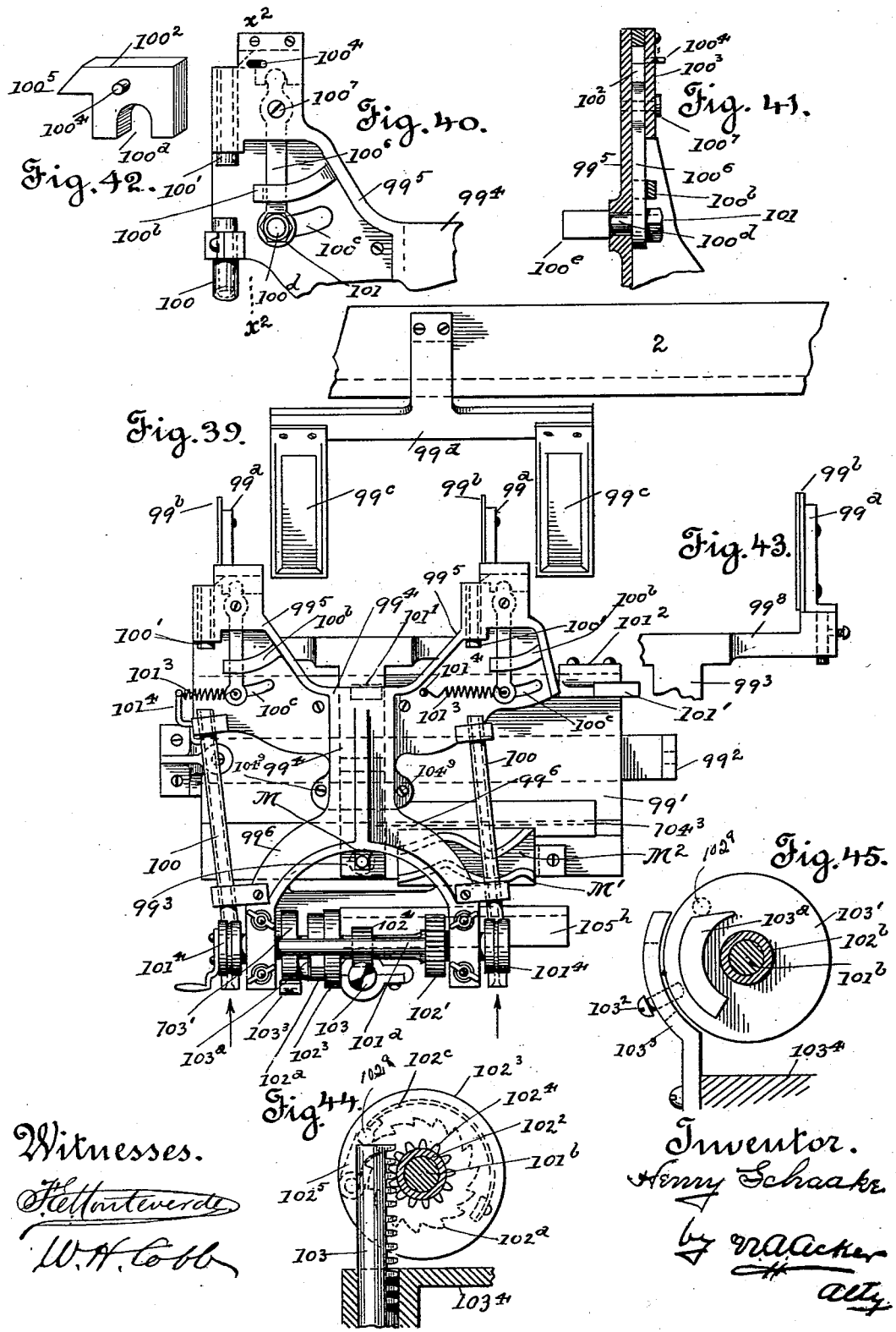
(No Model.) 28 Sheets—Sheet 21.
H. SCHAAKE.
CAN BODY SOLDERING MACHINE.
No. 563,069. Patented June 30, 1896.

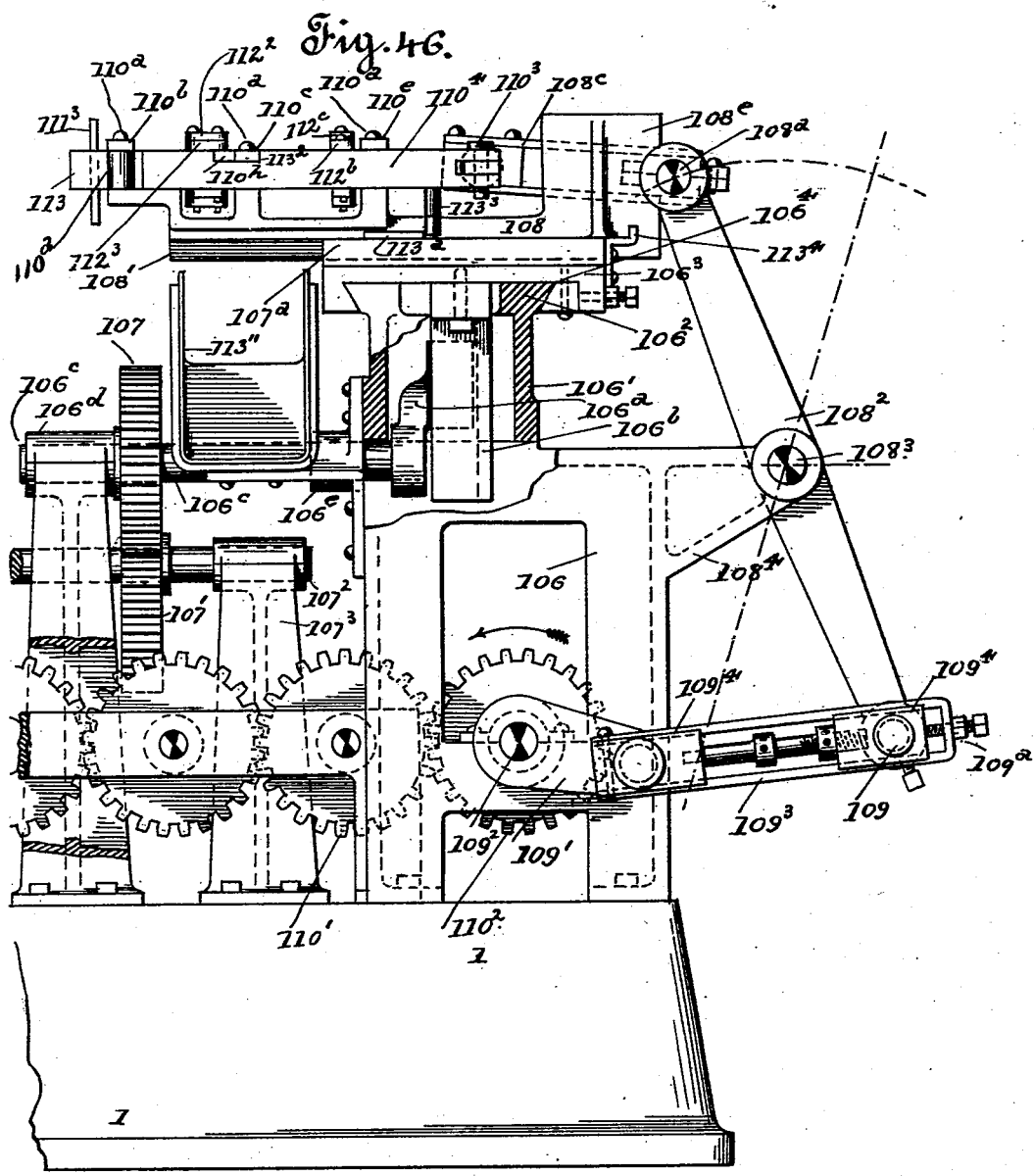

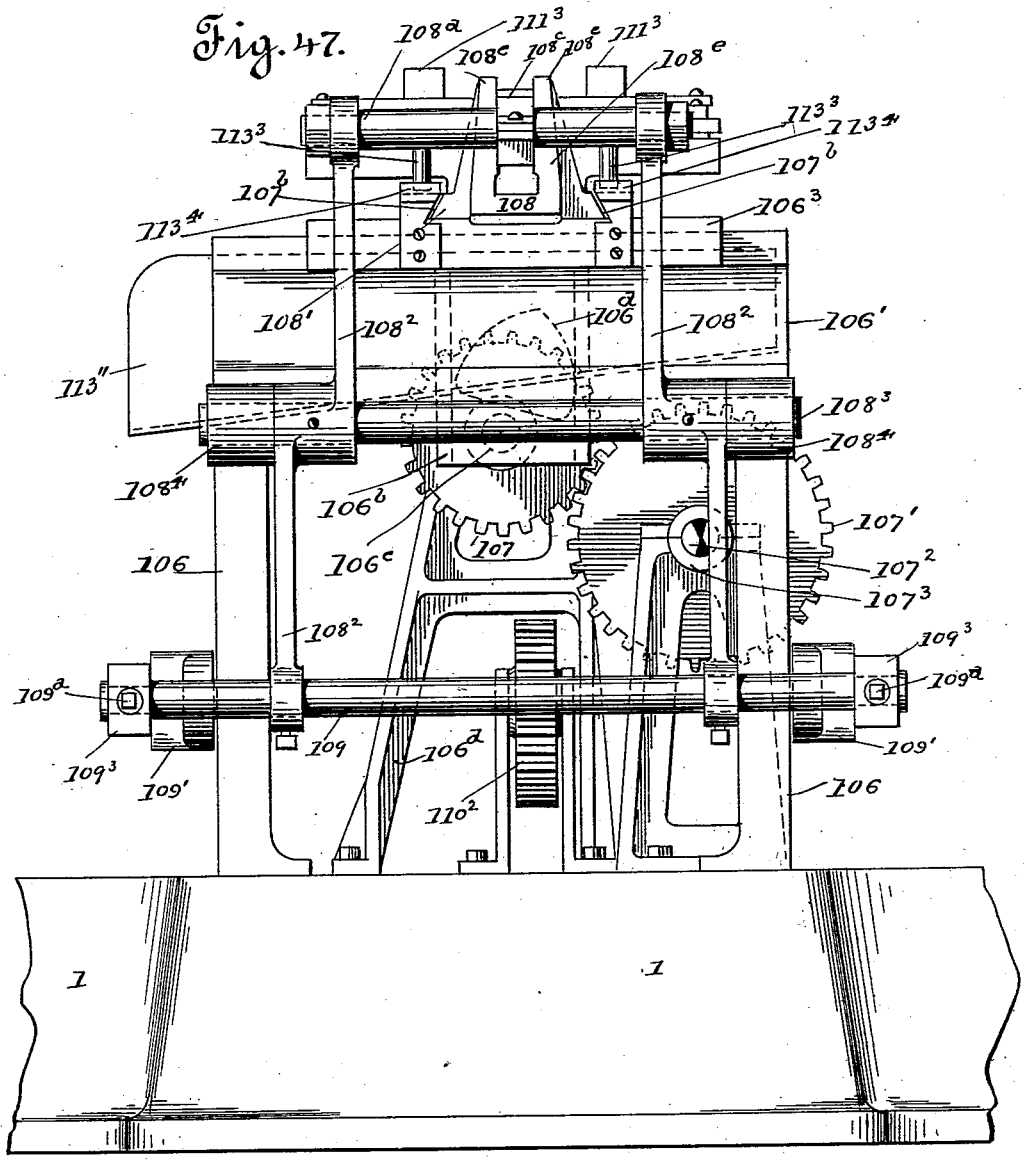

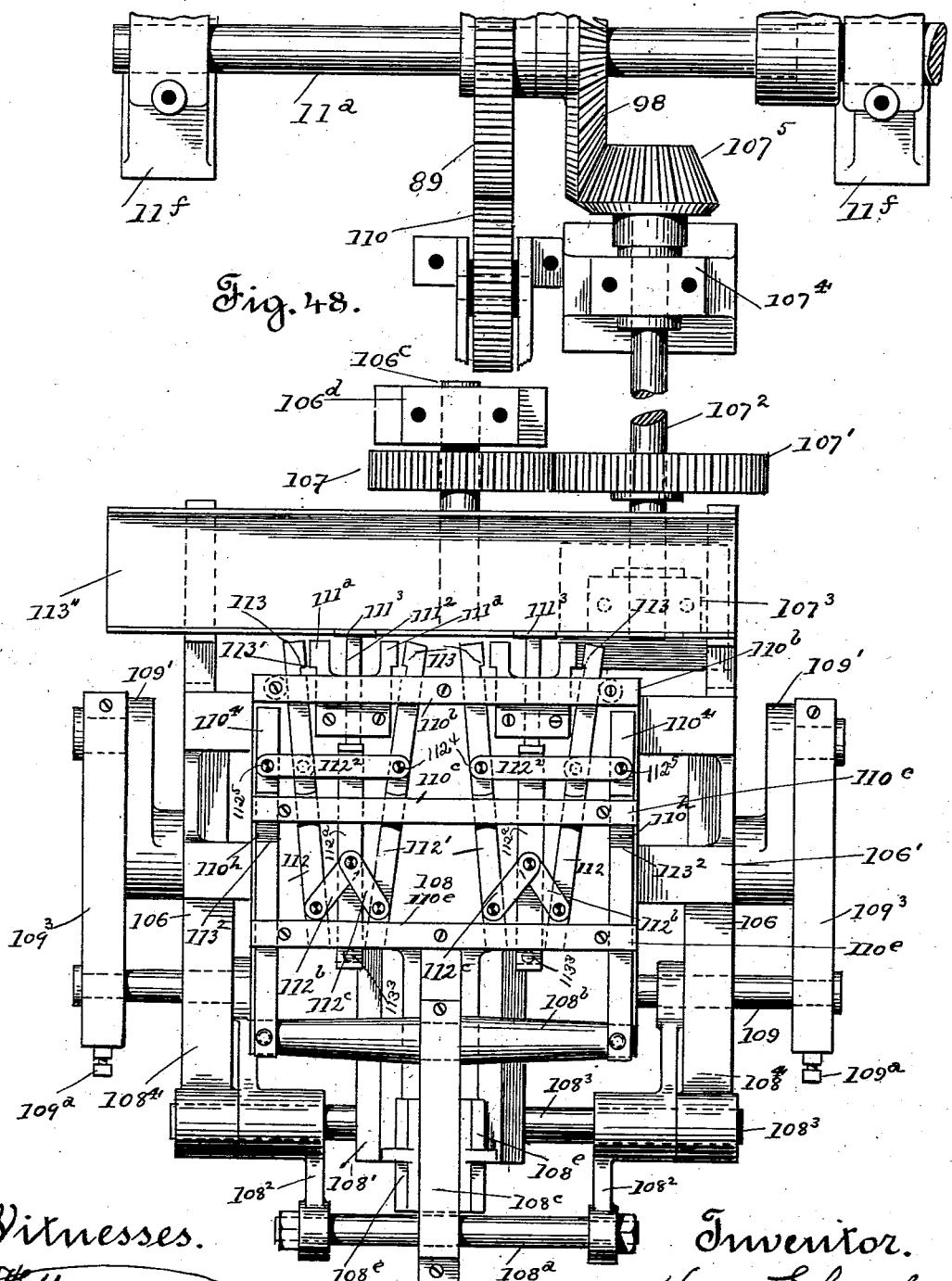

(No Model.) 28 Sheets—Sheet 25.

H. SCHAAKE.
CAN BODY SOLDERING MACHINE.

No. 563,069. Patented June 30, 1896.

Witnesses.
F. Monteverde
W. H. Cobb

Inventor.
Henry Schaake
by N. A. Acker
atty (No Model.)  28 Sheets—Sheet 26.
H. SCHAAKE.
CAN BODY SOLDERING MACHINE.
No. 563,069.  Patented June 30, 1896.
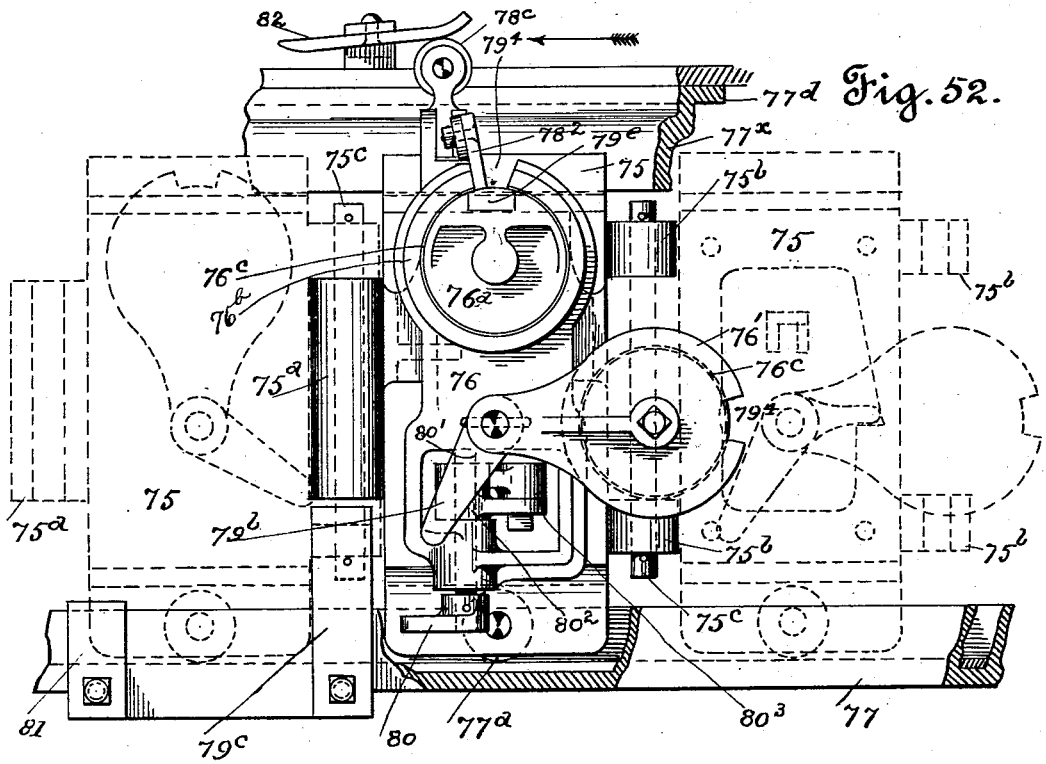
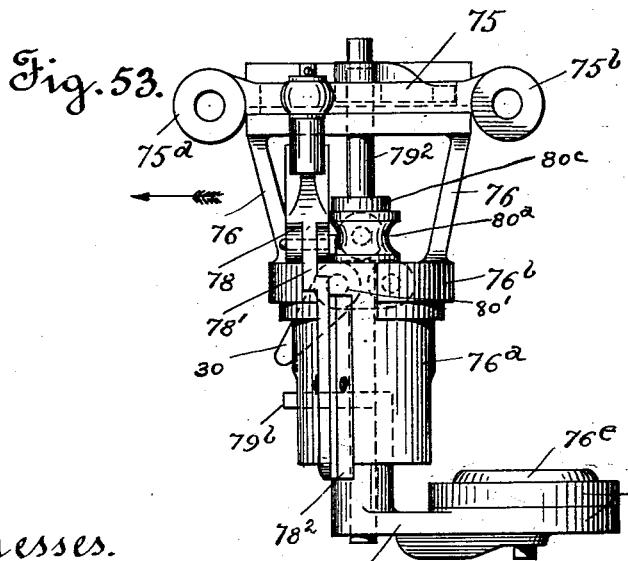
Witnesses.
Inventor.
Henry Schaake (No Model.)

28 Sheets—Sheet 27.

H. SCHAAKE.
CAN BODY SOLDERING MACHINE.

No. 563,069.

Patented June 30, 1896.

Witnesses.
H. Monteverde
W. H. Cobb

Inventor.
Henry Schaake
by N. A. Acker
atty.

(No Model.)　　　　　　　　　　　　　　　　28 Sheets—Sheet 28.
H. SCHAAKE.
CAN BODY SOLDERING MACHINE.
No. 563,069.　　　　　　　　　　　　　Patented June 30, 1896.
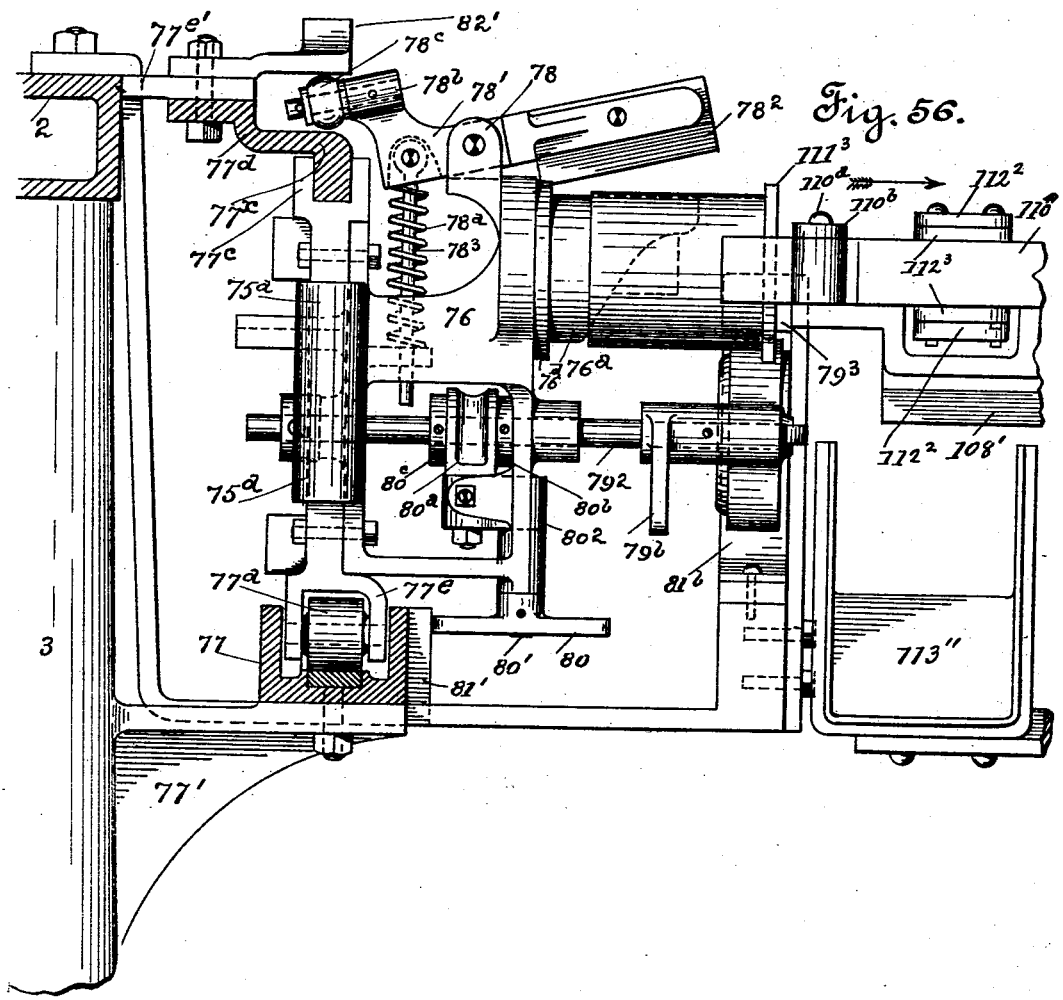
Witnesses
Inventor.
Henry Schaake
by V. A. Acker
Atty.

UNITED STATES PATENT OFFICE.

HENRY SCHAAKE, OF SAN FRANCISCO, CALIFORNIA.

CAN-BODY-SOLDERING MACHINE.

SPECIFICATION forming part of Letters Patent No. 563,069, dated June 30, 1896.

Application filed October 11, 1894. Serial No. 525,613. (No model.)

*To all whom it may concern:*

Be it known that I, HENRY SCHAAKE, a citizen of the United States, residing at San Francisco, in the county of San Francisco and State of California, have invented a certain new and useful Can-Body-Soldering Machine; and I do hereby declare the following to be a full, clear, and exact description of the said invention, such as will enable others skilled in the art to which it most nearly appertains to make, use, and practice the same.

The present invention relates to a certain new and useful can-body-soldering machine, which consists in the arrangement of parts and details of construction, as will be hereinafter more fully set forth in the drawings, described, and pointed out in the specification.

The main object of my invention is to provide a soldering-machine for can-bodies which will receive the can-body blanks and form or roll the same into proper shape for a can-body prior to delivering the body-blank thus formed to the horn or mandrel of the soldering-machine proper. By forming the can-body blank into proper shape prior to delivering the same to the horn or mandrel, I remove all spring or elasticity from the metal. Consequently, when the can-body has been formed and soldered within the machine proper, all elasticity is removed from the metal and undue strain removed from the side seam of the can-body. This is a desideratum in machines of this character, and one which will be highly appreciated by manufacturers of this class of articles for several reasons. By the ordinary manner of manufacturing can-bodies by an automatic machine the spring or elasticity is not removed from the metal out of which the can-body is formed. Consequently, if the body be cut longitudinally, after the same has been soldered, it will be noticed that the metal will immediately spring apart or away. This is due to the fact that the body-blank is simply folded or formed around the mandrel or horn of the machine, being held therearound until the overlapping or contiguous edges of the sheet metal have been soldered together, the full outward strain existing within the metal. Consequently a sufficient amount of solder must be applied to the seam, not only to unite the lapping ends of the body, but to compensate for this outward strain of the metal from which the body is formed. This unnecessary outward strain upon the side seam of the can-body tends to reduce the strength of the ordinary can-body.

By primarily forming or rolling the can-body blank to approximately the shape of the can-body prior to delivering the same to the seamer horn or mandrel a can-body is formed which will be a true cylinder, thus permitting of the same fitting snugly within the flange of the can-head, when the head is applied thereto by the ordinary heading or ending machine.

The ordinary machine, by simply folding the body-blank upon the mandrel or horn, does not produce a cylindrical body, for the reason that the overlapping or contiguous edges of the body-blank are forced downward and so held until the solder has been applied and permitted to cool. Consequently when the pressure of the clamping-jaws is removed the body portion proper springs away and hence leaves a flat seam or soldered portion, which breaks the true cylinder and adds to the difficulty of applying the can heads or ends.

The invention consists in providing mechanism for receiving the body-blanks from the feed mechanism and primarily forming the body in order to remove the spring from the metal and automatically deliver the partially-formed body to the horn or mandrel of the seaming-machine, a gage-plate or sizing device for the body, mechanism for automatically operating the gage device in order to clasp or release the can-body, in the feed mechanism for the can-body blanks, and in the extractor mechanism for the can-bodies.

My machine may more properly be said to be an automatic can-body former or seamer composed of mechanism for delivering the body-blanks to a primary former, which receives the blanks, partially forms the can-body in order to remove the spring from the metal, and automatically delivers the partially-formed body to one of a series of continuous-traveling horns or mandrel devices for sizing the bodies so that they shall be of a uniform diameter, mechanism for applying flux and solder to the bodies and soldering the seam thereof, and extracting the soldered body during the continuous travel of the seamer horn or mandrel.

In order to more fully comprehend my invention, reference must be had to the accompanying sheets of drawings, forming a part of this application, wherein—

Figure 3:
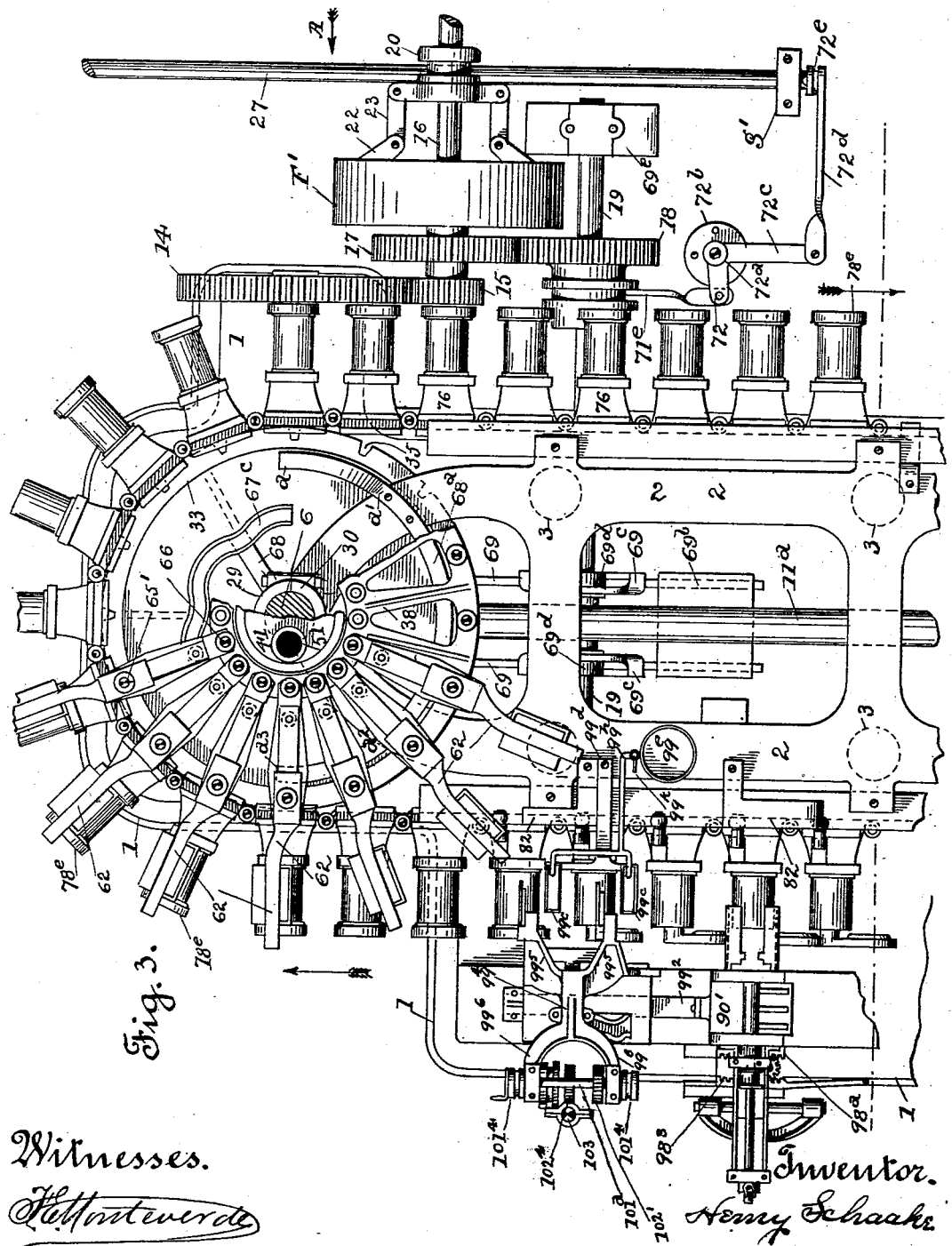
Figure 4:
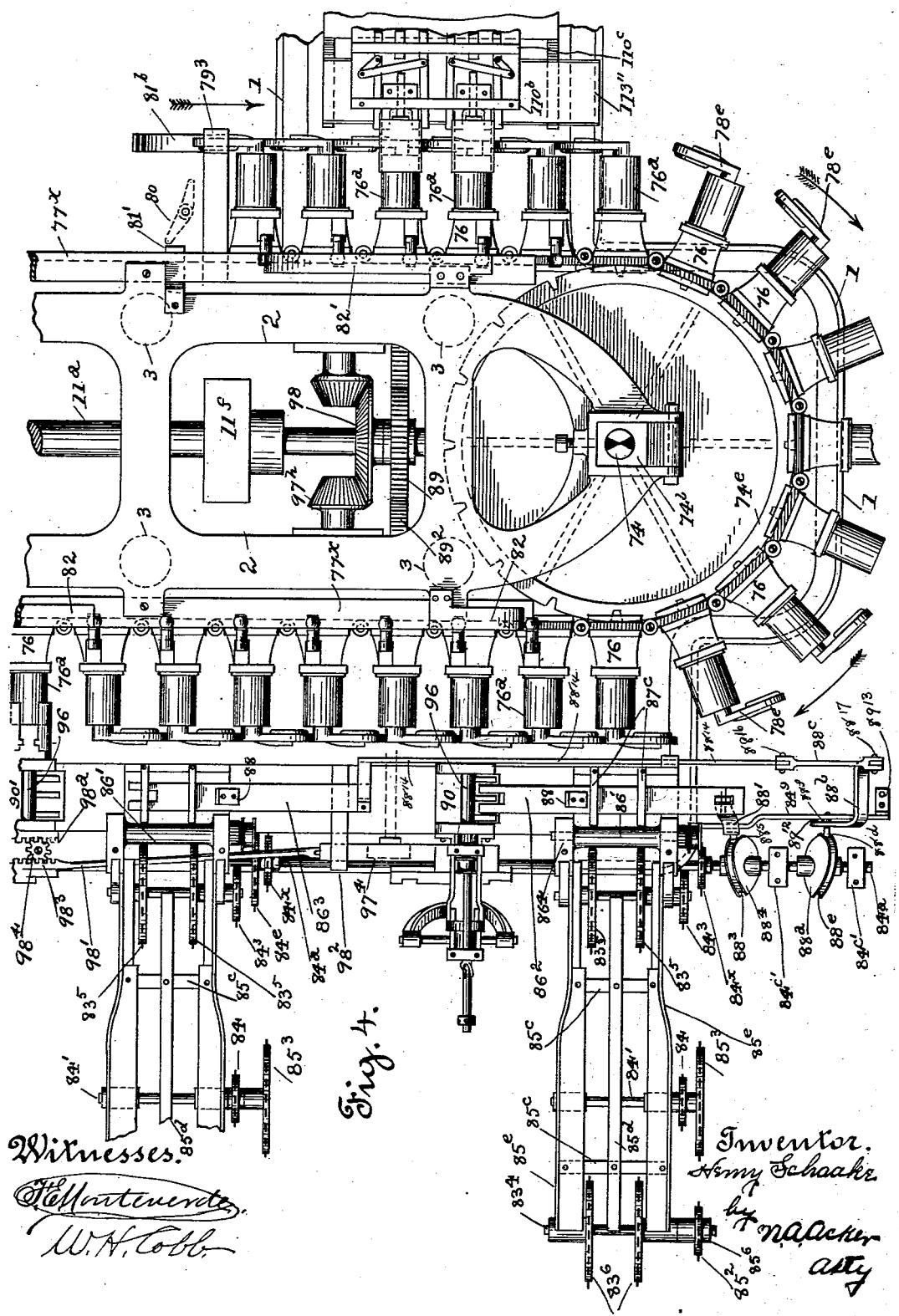
Figure 8:
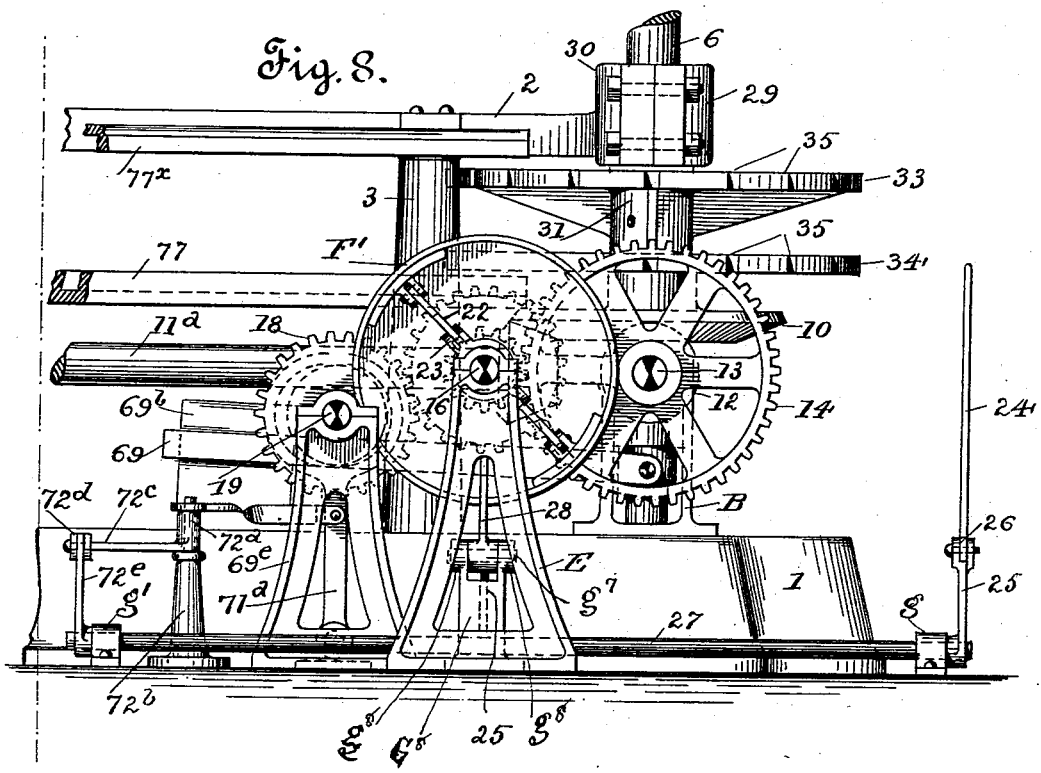
Figure 9:
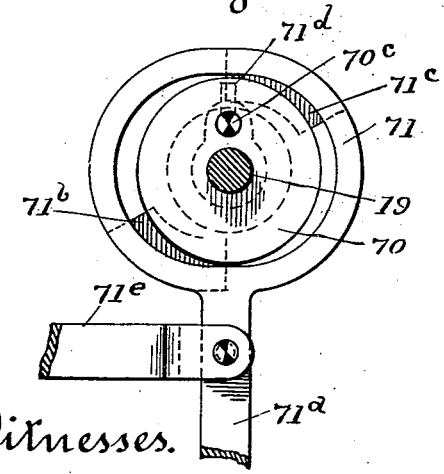
Figure 10:
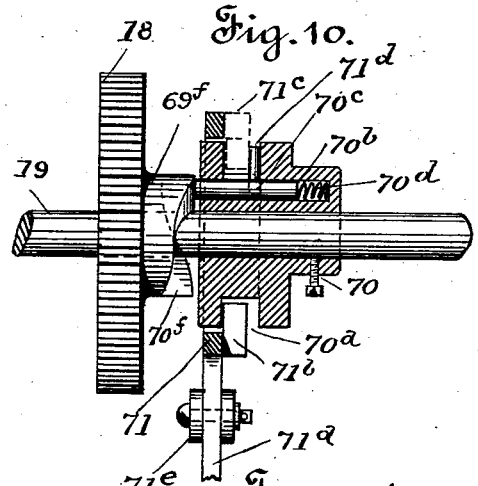
Figure 11:
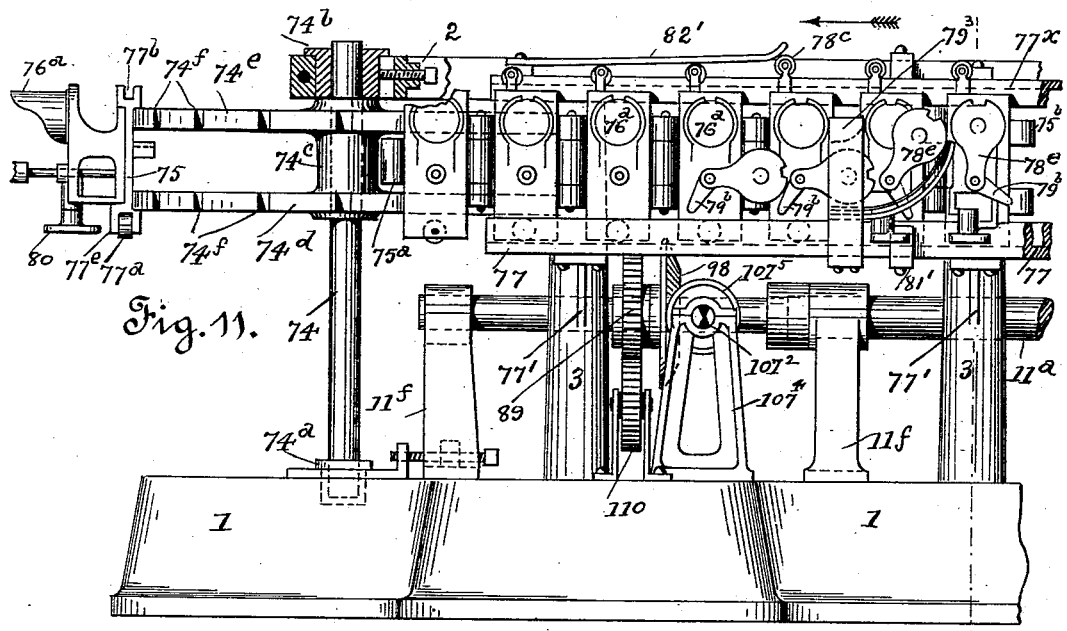
Figure 12:
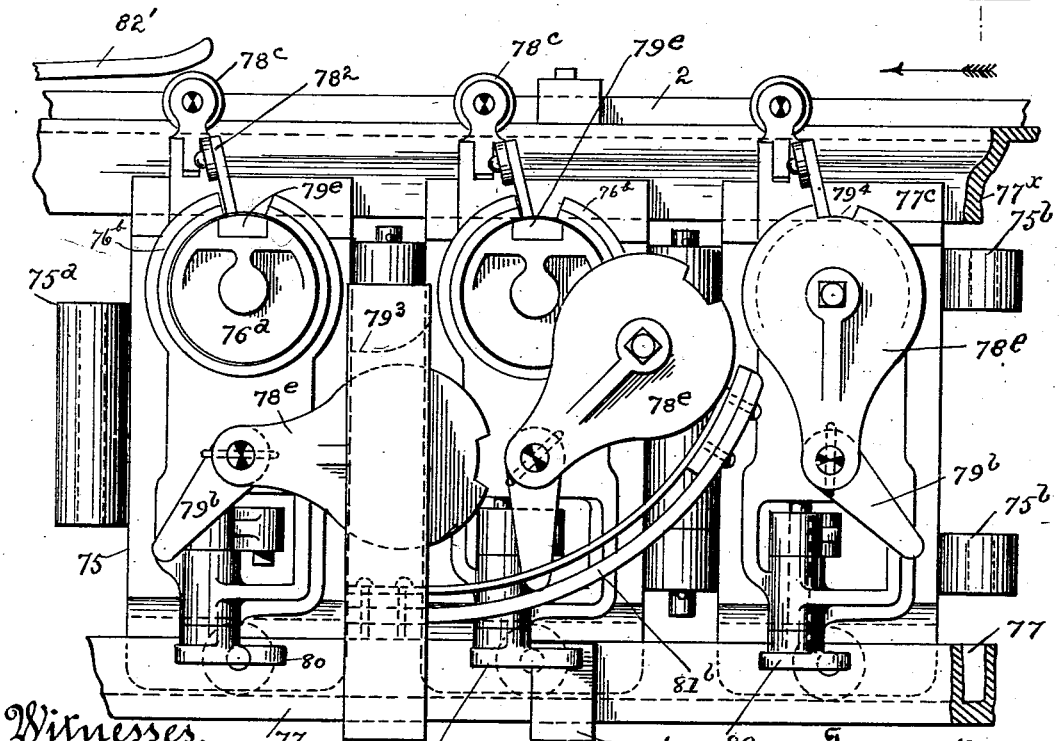
Figure 38:
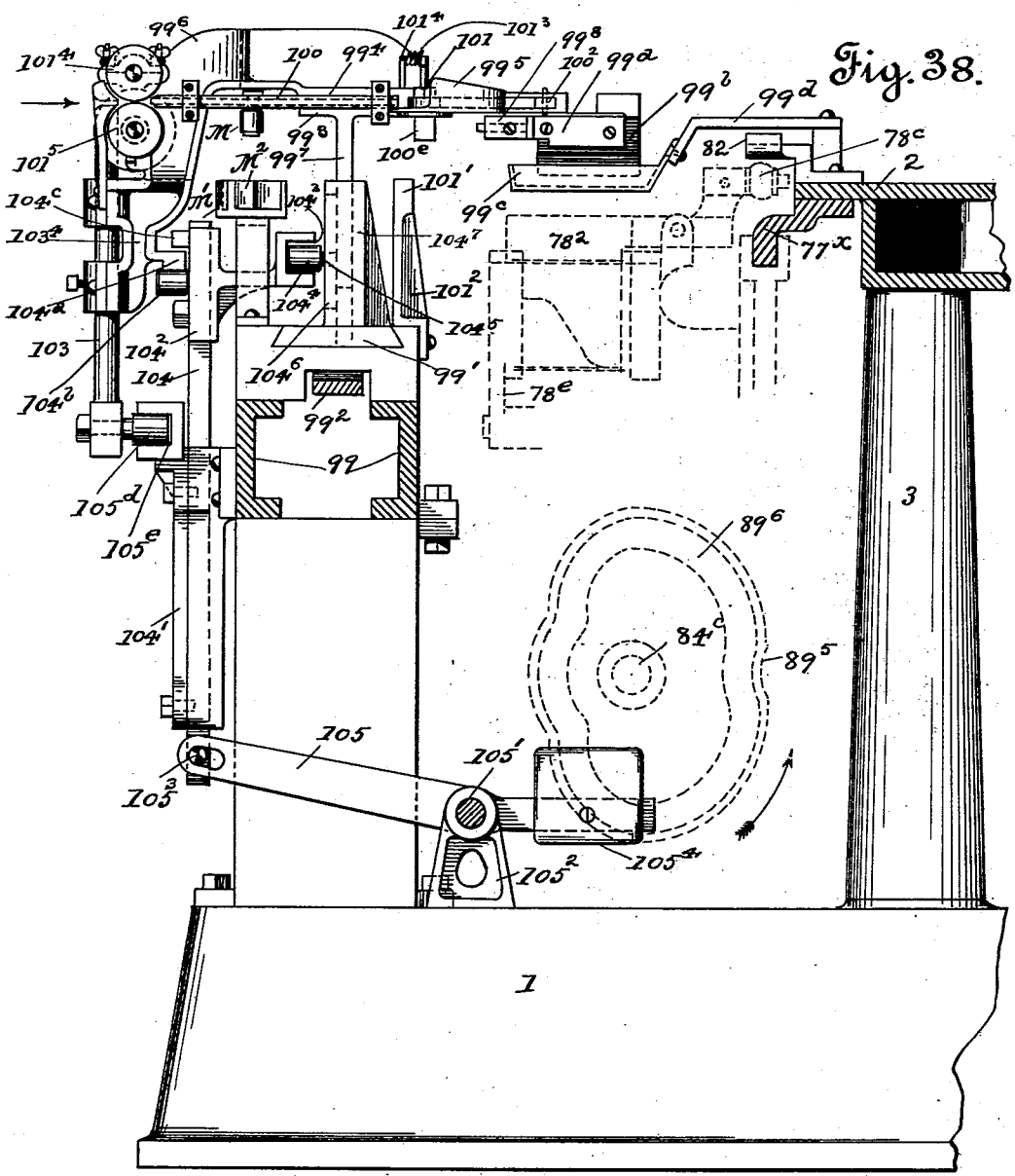
Figure 49:
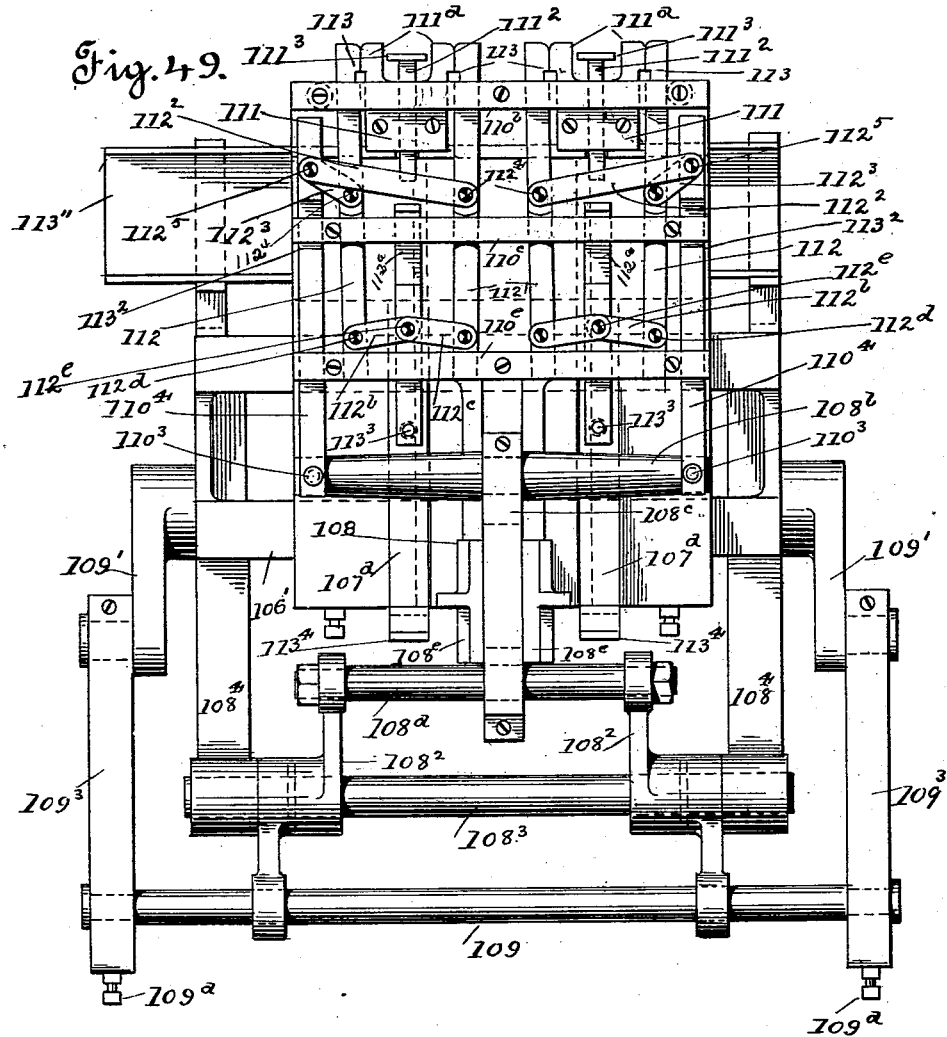
Figure 51:
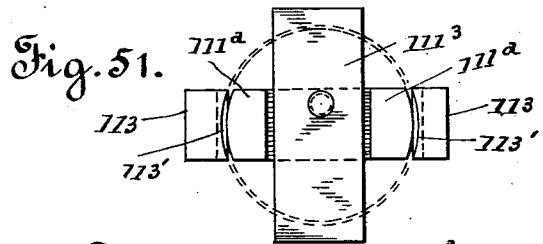
Figure 50:
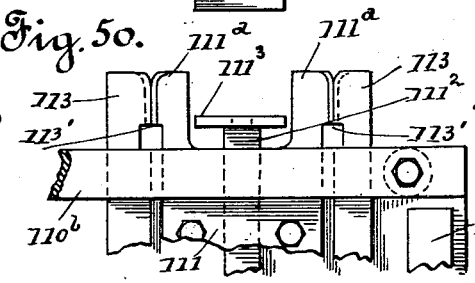
Figure 54:
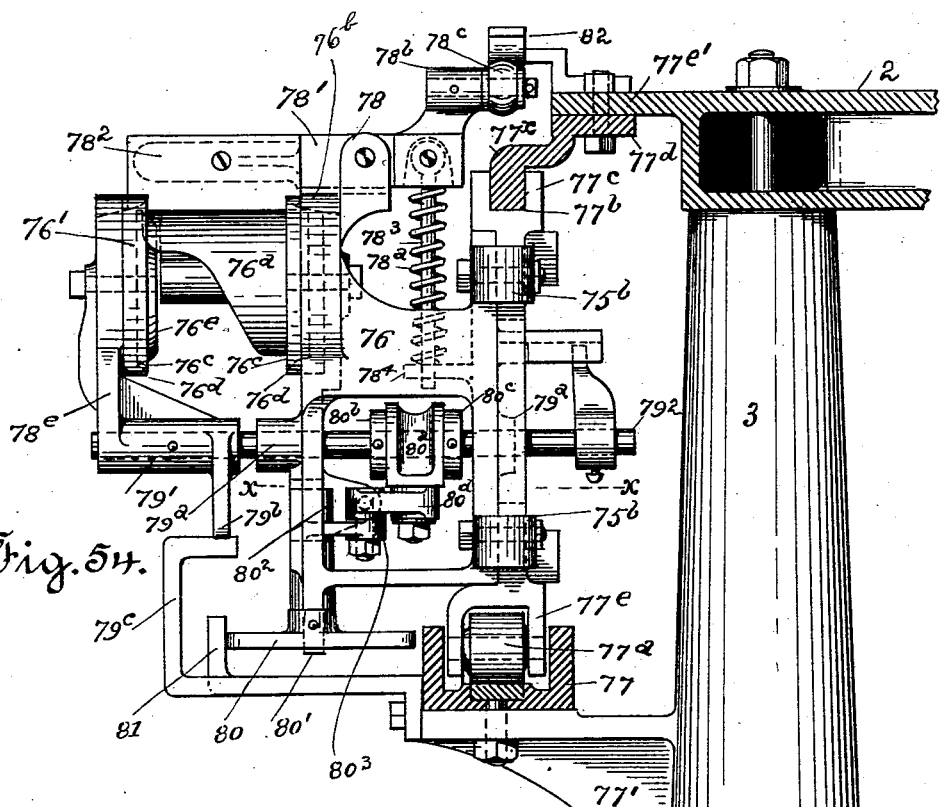
Figure 55:
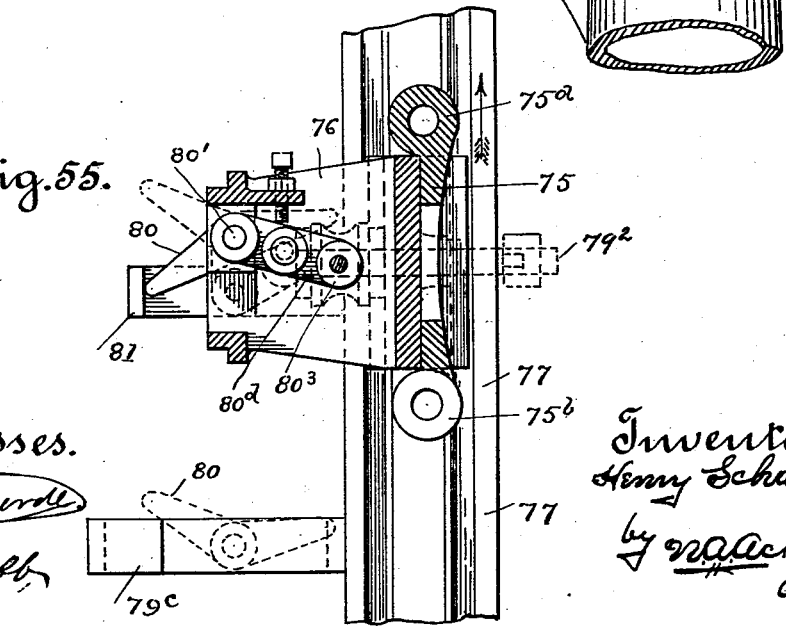

Figure 1 is a front end elevation of the machine, the forward portion of the endless carrier for the horn or mandrel being broken away in order to better illustrate the position of the driving mechanism for the endless carrier, showing one of the solder-feeds, mechanism for operating the same, and the mechanism for imparting rotary motion to the vertical movable spider-frame, to which are attached the solder-irons. Fig. 2 is a rear end elevation of the machine, showing one of the body-blank feeds and mechanism for operating the same. Figs. 3 and 4 are top plan views of the machine, portions being broken away, Fig. 4 being a continuation of Fig. 3. Figs. 5 and 7 are longitudinal sectional top plan views, Fig. 7 being a continuation of Fig. 5, taken on line $x\,x$, Fig. 1, showing the drive mechanism for the different parts, the stationary section of the gas and air reservoir being shown set at a right angle to its position illustrated by Fig. 1, in order that the interior connection between said section and the movable section may be fully shown. Fig. 6 is a detail top plan view of the clutch mechanism which operates the cross-shaft for throwing the cam which raises and lowers the soldering-irons with the stopping and starting of the machine. Fig. 8 is a side elevation of that portion of the machine illustrated by Fig. 3 viewed in direction of arrow A, showing the spider-frame secured to the main vertical shaft and the endless carrier removed. Fig. 9 is a detail view in elevation of the clutch mechanism for operating the cam which raises and lowers the soldering-irons, taken on line $x\,x$, Fig. 6, and viewed in direction of the arrow. Fig. 10 is a side view in elevation of the clutch mechanism illustrated by Fig. 6, partly in section. Fig. 11 is a side view in elevation of the portion of the machine illustrated by Fig. 4, with the extractor removed and a portion of the endless carrier being removed. Fig. 12 is an enlarged detail view in elevation of the can mechanism for throwing the sizing device or gage-plate in order to permit the ready removal of the formed can-body from the horn or mandrel. Fig. 13 is a vertical sectional longitudinal side elevation taken through the drive-disk for the endless carrier, gas and air reservoir, and top plate, said section being taken on line $x'\,x$, Fig. 1. Fig. 14 is an enlarged detail view, in side elevation, of the raising and lowering mechanism for the soldering-irons, said view being taken on line $y\,y$, Fig. 5. Fig. 15 is a bottom plan of the sleeve-collar to which the forward ends of the weighted fulcrumed lift-rods are connected. Fig. 16 is a top plan of the upper collar which is keyed to the vertical shaft. Fig. 17 is a detail enlarged side elevation of one of the arms which carries a soldering-iron at its outer end. Fig. 18 is a top plan view showing one of the soldering-arms, the rotatable spider-frame, partly broken away, which carries the soldering-arms, and the camway for imparting a reciprocating motion to the soldering-arm. Fig. 19 is a front elevation of one of the soldering-arms. Fig. 20 is a detail view showing one of the burners for the gas. Fig. 21 is a vertical sectional elevation of the gas and air distributer or reservoir. Fig. 22 is a partial front elevation of the same. Fig. 23 is a cross-sectional top plan view of the same, taken on line $x\,x$, Fig. 21. Fig. 24 is a detail side elevation of one of the feed devices for the body-blanks. Fig. 25 is an end elevation of the same. Fig. 26 is a top plan of the feed mechanism illustrated by Fig. 24, showing in connection therewith the grooved cams and rods for operating the reciprocating slide-plates which receive the body blanks from the rolls of the feed device and deliver the same to the forming-rolls. Fig. 27 is an end elevation of the rolls which receive the body-blanks from the feed mechanism and deliver the same to the reciprocating slide-plates. Fig. 28 is a side view in elevation of the forming-rolls for the can-body blanks. Fig. 29 is a detailed view in side elevation of the mechanism for transmitting the motion of the drive-shaft of the machine to the cam for throwing the delivery mechanism in or out so as to place the partially-formed body upon the forming horn or mandrel. Fig. 30 is a front elevation of the mechanism illustrated by Fig. 28. Fig. 31 is a top plan view of the mechanism disclosed by Figs. 28 and 29. Fig. 32 is an enlarged detail view, end elevation, of one of the forming devices, taken on line $y\,y$, Fig. 34, viewed in direction of arrow. Fig. 33 is a front view in elevation of the forming-plates for the body-blanks. Fig. 34 is a vertical sectional side elevation of the mechanism set forth in Fig. 32, being taken on line $x'\,x'$ of said figure. Fig. 35 is a top plan view of Fig. 33. Fig. 36 is a front elevation of the solder-feed mechanism. Fig. 37 is a detail view of the lower solder-feed rolls. Fig. 38 is a side elevation of the feed mechanism set forth in Fig. 36. Fig. 39 is a top plan view of the mechanism illustrated by Fig. 38, showing the position of the parts after the slide-frame has moved outward, so as to remove the flux-brushes from within the flux-holding receptacles, the horns or mandrels shown in Fig. 38 being removed. Fig. 40 is a broken detail view showing the end of a cutter-arm for the wire-solder. Fig. 41 is a vertical sectional side elevation taken on line $x^2\,x^2$, Fig. 40. Fig. 42 is a perspective view in detail of the solder-cutting knife. Fig. 43 is a detail view of the flux-arm. Fig. 44 is a detail side elevation of the rack and pinion for driving the solder-feed shaft, taken on line $x\,x$, Fig. 36. Fig. 45 is a similar view of the flux mechanism, taken on line $x'$ $x'$, Fig. 37. Fig. 46 is a side view in elevation of the extractor for removing the soldered can-bodies from the horns or mandrels. Fig. 47 is a front view in elevation of the same. Fig. 48 is a top plan view of the can-body extractor, showing the extracting-fingers or nipper-arms, which grasp the can-body, thrown inward and open, said view disclosing a broken detail top plan of a portion of the drive mechanism illustrated by Fig. 7, which transmits movement from the central drive-shaft of the soldering-machine to operate the can-body-extracting mechanism. Fig. 49 is a similar view of the extractor, showing the extracting-fingers or nipper-arms, which grasp the can-body, thrown outward and closed. Fig. 50 is a detail broken top plan view of the nipping or extracting fingers. Fig. 51 is a front elevation of the same, the position of the can-body being shown in the dotted lines. Fig. 52 is a detail front view in elevation of the horn or mandrel, showing position of the gage or clamp plate when lowered and raised. Fig. 53 is a top plan view of the same. Fig. 54 is a vertical sectional side elevation of the seamer horn or mandrel, showing the position of the clamping-knife or clamp-plate and gage or sizing plate prior to the horn or mandrel being carried in front of the fluxing device. Fig. 55 is a cross-sectional top plan view taken on line $x$ $x$, Fig. 54. Fig. 56 is a side view in elevation of the horn or mandrel, showing position of the gage-clamp or sizing-plate and of the retaining-knife blade or clamp-plate after the end of the can-body has been engaged by the nipper-arms of the extractor, the can-body being shown as partially removed from the horn or mandrel; and Fig. 57 is an enlarged detail view showing a portion of one of the slide-plates for conveying the can-body blanks to the forming-rolls and a portion of the lever for imparting motion to the said slide-plate.

In order to facilitate the handling of the body-blanks and increase the output of the machine, I duplicate several parts of my machine. For instance, I provide a double feed, two flux-applying devices, two soldering-operating mechanisms, and two wire-soldering devices. Consequently I form and seam two can-bodies at the same time, and hence gain double capacity for the machine. These duplicate parts, however, being the same in construction, do not require independent description for each, but the describing of one will answer for the other, the same reference-numeral referring to the corresponding portion of the duplicate part.

The numeral 1 is used to indicate the base or platform of my machine, and 2 the top plate thereof, which is supported a distance thereabove by means of the columns or upright supports 3. Within the base, near its forward end, is formed the socket 4, which receives the bearing-plate 5, into which is fitted the lower end of vertical rotatable shaft 6. This shaft is cast with two vertical grooves or channels $a$ $b$, within each of which is fitted, loosely, the vertical movable keys 7. The lower end portions of said keys fit within the channels $c$, cut part way through the collar 8, the lower end of the channels forming a seat, upon which rests the lower end of the keys 7. This collar 8 is fitted within the collar 9, which forms a seat therefor. The collar 9 is a non-rotating one, being loosely secured upon the shaft 6, while the upper collar 8 is connected to the vertical rotatable shaft 6 by the keys 7, and consequently is carried around therewith. The collar 9 is provided with a downwardly-extending sleeve $d$, which gives a long bearing thereto. In the present instance I have shown the collar 8 as being composed of two parts, united by small screw-bolts, Fig. 16. This is immaterial, however, as the collar may be formed integral.

To the vertical shaft 6 is secured the bevel-wheel 10. This wheel is rigidly affixed to the shaft 6 by pin $e$, which extends through the hub 11 into said shaft. Through the hub of the wheel I cut two channels or grooves, within which fit the keys 7 and through which the same move as raised or lowered. These keys work loosely within the channels or grooves cut within the hub of the bevel-wheel. Consequently no strain of the wheel comes upon the keys, and the same are allowed free vertical movements within the grooves or channels of the shaft 6. This bevel-wheel serves as a drive-wheel for the rotatable vertical shaft 6 and for the longitudinal drive-shaft $11^a$, which imparts motion to the entire machine through the medium of the hereinafter-described intermediate mechanism.

The drive bevel-wheel 10 derives its motion from the bevel-pinion 12, which intermeshes with the teeth of the bevel drive-wheel 10. The bevel-pinion 12 is secured to inner end of shaft 13, which works in bearings of standards A B. To the outer end of this shaft is secured the large gear-wheel 14, which is driven by the pinion 15, Fig. 3, secured to shaft 16, which works in bearings of the standards C D E, Fig. 5. Upon this shaft in front of pinion 15 is secured the gear-wheel 17, which intermeshes with gear 18, secured to cross-shaft 19. The driving-shaft 16 is operated, in order to transmit its motion to the respective gear mechanism, by the clutch-wheel F, rigidly secured to the shaft, as shown in Fig. 5. This clutch-wheel is thrown into locked engagement with the loose pulley-rim F' as the clutch-collar 20 is thrown inward, which causes the brake or clutch shoes 21 to be thrown into frictional contact with the inner face of the pulley-rim F' by the toggle or link arms 22 being thrown into a vertical position. The arms 22 are connected to the clutch-collar 20 by the links 23. Inasmuch as the pulley-rim is continuously driven by means of a drive-belt (not shown) it is obvious that its motion is transmitted to the clutch-wheel the moment the brake-shoes are thrown into frictional contact therewith. As the clutch-collar 20 is moved outward or away from the clutch-wheel the brake-shoes are moved from engagement with the pulley-rim, which stops the working of the machine. The clutch-collar is moved in or out, upon the shaft 16, by means of the hand-lever 24, fulcrumed at its lower end to ear $f$.

To the forward end of the longitudinal rod 27 is secured, at a right angle thereto, the short arm 25, which arm is connected to the fulcrumed hand-lever 24 by means of the rod 26. As the fulcrumed hand-lever is thrown back and forth the arm 25 is likewise moved, which causes the longitudinal rod 27 to oscillate in the bearings $g\ g'$. From the longitudinal rod 27, near its center, projects the arm $g^5$, which is connected to the lower arm $g^6$ of the bell-crank lever $G^9$ by the link 28'. This bell-crank lever works upon the axle $g^7$, secured within bearing $g^8$ of the bracket $G^8$. The arm 28 of the bell-crank lever $G^9$ is forked at its upper end in order to fit within the groove of the clutch-collar 20. As the longitudinal rod 27 is oscillated, by the throw of the fulcrumed hand-lever, the arm 28 of the bell-crank lever $G^9$, through its connection with the said rod 27, will be thrown in or out, so as to move the clutch-collar 20 upon the shaft 16, for the purpose of placing the brake or clutch shoes 21 in or out of frictional engagement with the inner face of the pulley-rim F', Figs. 1 and 8.

The vertical shaft 6 extends above the top plate 2 of the machine, and is held thereto by means of the bearing-plate 29, which is bolted to the semicircular bearing-plate 30, which forms an upwardly-projecting bearing-sleeve for the outer or forward end of the top-plate, Figs. 3 and 13. To the said vertical shaft 6 is rigidly secured, above the bevel-wheel 10, the long sleeve 31. The upper portion of this sleeve works or rotates within the bearing-plates 29 30 of the top plate, frictional wear being overcome by interposing between the inner face of the bearing-plates 29 30 and outer face of the sleeve 31 the Babbitt-metal lining 32, Fig. 13. From the lower portion of the sleeve 31, or that portion which lies below the top plate 2, project the disks 33 34, one being located a distance below the other. These disks constitute the forward drive-disks for the endless carrier, which carry the horns or mandrels, the periphery of said disks being notched, as shown at 35, in order that the endless carrier may engage therewith, Figs. 1 and 3. The sleeve 31 has two channels or grooves cut in the inner face thereof its entire length, through which the keys 7 7 work or slide.

Immediately above the sleeve 31 is located the sleeve 36, which is fitted over the vertical shaft 6 and secured directly to the keys 7, the lower end of the sleeve resting upon the shoulders 37 of the keys, Fig. 13. This sleeve is cast integral with the spider-frame 38, which carries the soldering-iron arm, more fully described hereinafter. By securing the sleeve 36, which is a part of the spider-frame 38, directly to the vertical sliding keys, the same is not only carried around by the keys during rotation of the vertical shaft, but is also raised or carried upward as the keys are lifted, as will be described.

The upper end of the vertical shaft 6 supports the air and gas reservoir, from which extend the air and gas pipe 39 and 40. The air and gas reservoir is composed of a stationary or non-rotatable section 41 and a rotatable section 42. The upper or non-rotatable section 41 may be held rigid, in any suitable manner, (as, for instance, by straps or rods depending from the ceiling of the building within which the machine is located;) but I prefer to secure the said section to the lower end of the gas and air supply pipes, Figs. 13 and 21. These pipes are connected to the ceiling of the building by straps or brackets, (not shown,) and, being immovable, they prevent the section 41 from rotating. The lower section is cast with a socket-seat 43, within which the upper end of the vertical shaft 6 fits, the said shaft being secured within the seat by screw-bolts $h$. The flange $h'$ of the non-rotatable section 41 fits upon the flange $h^2$ of the rotatable section 42, and is held in place by means of the hollow flanged annular ring 44. Within this ring I fit a series of springs 45, which, when the sections are fitted together and the ring in place, bear firmly upon the packing-ring 46, placed upon the flange $h'$ of the non-rotatable section. The annular ring is secured to the lower section 42 by the flange thereof being secured to flange of said section by bolts $h^3$. Through the non-rotatable section is fitted the lower end of the gas and air supply pipes, which pipes, being held rigid, prevent the section 41 rotating or moving with the section 42 as carried around by the vertical shaft 6.

The air and gas reservoir is subdivided by partitions 47 and 48 into two compartments 49 and 50, one serving to receive air and the other gas, the partitions maintaining the two separate. The air-supply pipe 51 connects with chamber 49, and gas-supply pipe 52 with chamber 50. The lower portion of chamber 49 is provided with a series of exit-openings 53, into which inner end of air-cock 54 fits, the outer end thereof being connected to the inner end of air-pipe 39. The lower portion of the gas-chamber 50 is communicated with by the exit-openings 55, into which fit the inner ends of gas-cocks 56, to the outer end of which is connected gas-pipes 40. The air and gas supply pipe for the fire-boxes I form of ordinary hose in order to secure flexibility. The inflow of air and gas to the reservoir is controlled by means of the slide 57 and the valve 58. By moving the slide in or out the amount of air may be regulated, while the turning on or off of valve 58 controls the supply of gas to the reservoir.

The air and gas from the reservoir discharge through hose 39 and 40 into fire-box 59, to which the soldering iron or bolt 60 is connected, the air and gas being conveyed thereto through the medium of tubes 61, which connect with discharge-tube $61^a$. This tube is held in place by bracket $60^a$, Figs. 19 and 20.

By reference to Figs. 13, 17, and 18 of the drawings it will be observed that the fire-boxes 59, which carry the soldering irons or bolts, are bolted or otherwise secured to the outer end of the soldering-iron arms 62, which arms are connected to and carried by the spider-frame 38. These arms are cut away or bifurcated at their inner ends, so as to permit of the same straddling the upper portion of the sleeve 63, which is provided with an annular groove $63^a$, within which the arms formed by the bifurcation of the soldering-iron arms fit and work as the arms are reciprocated. This sleeve forms a portion of the plate $64^a$, which rests upon the spider-frame. The outer end of this plate is cast or provided with an upwardly-extending sleeve 64, which projects through the elongated opening 65 cut within the soldering-iron arm. However, flange 67 of this sleeve bears upon the upper face of the soldering-iron arm and serves, in connection with the groove cut in the sleeve 63 within which the arms formed by the bifurcation of the inner end of the soldering-iron arm fit, to hold the soldering-iron arm in a horizontal plane. The plate $64^a$ is secured to the spider-frame by means of the vertical rods 65' 66, as shown. By means of the plate $64^a$ the soldering-iron arm is raised and lowered, as hereinafter described.

From the soldering-iron arm, near the inner end, downwardly projects the sleeve 67, through which extends the rod $67^a$, the lower end of which carries the roll $67^b$. This roll, as the soldering-iron arm is carried around by the rotation of the spider-frame, works within the inwardly and outwardly inclined groove $67^c$ of the curved cam-plate $67^d$. This cam-plate is connected to the bearing-plates 29 and 30 of the top-plate 2 by means of brackets 68, consequently is immovable. As the spider-frame is carried around by the rotation of the vertical shaft 6 the depending roll of the soldering-iron arm travels within the inwardly and outwardly inclined groove of the curved cam-plate $67^d$, and causes the soldering-iron arm to move in or out, thus causing the soldering bolt or iron to be reciprocated over the seam of the traveling can-body. By this arrangement it will be observed that the soldering iron or bolt is reciprocated over the seam of the can-body during the continuous rotary travel of the spider-frame. It will be noticed that the vertical rod $67^a$ extends downwardly through an elongated opening $67^e$ cut within the plate $64^a$.

During the reciprocal movement of the soldering-iron arm the soldering bolt or iron is maintained in contact with the solder located upon the seam of the can-body. However, the moment the depending roll of the soldering-iron arm moves from within the groove of the curved cam, the soldering iron or bolt is raised from contact with the seam of the can-body. This is accomplished through the medium of the plate or lift-plate $64^a$.

To the upper face of the top plate 2 I secure the curved cam plate or track $68^a$, the ends of which extend forward beyond the forward end of the top plate and are inclined downward and extend below the grooved cam-plate $67^b$, as shown by reference-letters $a$ $a'$ $a^2$ $a^3$, Figs. 1 and 13. Upon this circular inclined trackway travels the roll $68^b$, secured within the sleeve $68^c$, downwardly projecting from the lift-plate $64^a$. This roll is so situated as to be in true line with the inclined circular track $68^a$. Consequently the moment the roll $67^b$ moves from within the inclined groove of the cam-plate $67^d$ the roll $68^b$ enters upon the inclined portion $a$ $a'$ of the inclined circular track $68^a$. As the said roll travels upwardly upon this portion of the track the plate $64^a$ is elevated, which raises or lifts the arm 62, thus removing the soldering iron or bolt from contact with the seam of the can-body, leaving the body free to be carried in front of the extractor mechanism. The soldering-iron arm is held in its raised position until the roll $68^b$ reaches the point $a^2$ of the circular trackway, from which point it is gradually lowered by the said roll traveling over the downwardly-inclined portion to point $a^3$. The lift-plate and soldering-iron are thus gradually lowered instead of being permitted to suddenly fall by gravity, which would considerably jar the mechanism. When the lift-plate and soldering-iron arms have been lowered the full distance, the roll $67^b$ will be within the groove of the cam-plate and the soldering bolt or iron in position upon the traveling can-body. It must be borne in mind that the reciprocal movement of the soldering iron or bolt and the raising and lowering of the same from and onto the can-body takes place during the continuous rotary travel of the spider-frame and while the can-body is in motion, as hereinafter described, differing from most of the ordinary seaming-machine by causing the soldering bolt or iron to travel and reciprocate over the seam of the can-body while the same is in motion.

While I employ a number of soldering irons or bolts and lift-plates in my machine, each works identically. Consequently it is deemed unnecessary to describe each separately, the description of one answering for the others.

Should necessity require the stoppage of the machine at any time, it is desirable and, in fact, a desideratum that the soldering irons or bolts be raised clear of the can-body automatically with the stopping of the machine, in order that the heat of the soldering iron or bolt may not burn the metal of the can-body, which it will do if the irons are permitted to bear upon the can-body while the machine is at rest, and in my machine it will do so if mechanism be not provided to raise the irons, for the reason that at all times one of the soldering bolts or irons bears upon the can-body, held upon a horn or mandrel. In order to overcome this defect, I provide the vertically-movable keys 7, which, when raised or lowered, likewise raise and lower the spider-frame 38, fastened thereto, which frame, when lifted, elevates the soldering-iron arms, and consequently the lift-plate, carrying the soldering bolts or irons therewith. This raising or lowering of the vertical keys is automatically accomplished by the stopping or starting of the machine through the medium of the following mechanism:

To the loose or non-rotating collar 9 I movably connect the forward end of the rearwardly-extending rods 69, Figs. 14 and 15, which rods are fulcrumed to the standard $69^a$, which standard forms a bearing for the forward end of the drive-shaft $11^a$. The weight of the spider-frame and its connecting mechanism, which bear upon the collar 9, through the medium of the collar 8 and keys 7, is compensated for or evenly balanced by the weight $69^b$, fastened between the rods 69 at their inner ends. These rods have bolted or otherwise secured thereto straps $69^c$, which straddle the eccentric cams $69^d$, secured to the cross-shaft 19. These ends of this shaft rest in bearing-boxes of standards $69^e$. As the shaft 19 is rotated the eccentric cams are carried therewith and, contacting with the straps $69^c$ and rods 69 during their rotation, serve to raise or lower the inner ends of the rods 69, which imparts an opposite throw to the outer end. Upon the shaft 19 is located the loose gear 18, which derives its motion from the gear 17, as before described. The inner face of the gear 18 is provided with the clutch-collar $69^f$, which, when engaged by the clutch mechanism located upon the shaft 19, serves to impart motion to the said shaft, Figs. 6 and 10. To the shaft 19, back of or behind the clutch-collar $69^f$, is secured the collar 70, which collar has an annular groove $70^a$ cut within the periphery thereof. Through this collar is bored the opening $70^b$, into which is fitted the pin $70^c$. The inner end of the opening $70^b$ forms a seat for the spring $70^d$, which bears against the inner end of the pin $70^c$, and the resiliency of which forces the outer end of said pin beyond the outer face of the grooved collar. When the pin is forced outward its full distance by the resiliency of spring $70^d$, the end thereof is engaged by one of the shoulders $70^e 70^f$, Fig. 6, of the clutch-collar. Inasmuch as this collar is continually rotating, it is obvious that as this projecting end of the pin is engaged by one of the shoulders thereof, the motion of the clutch-collar will be imparted to the fixed collar 70, which transmits motion to the cross-shaft 19. As this shaft is rotated, the eccentric cams $69^d$ will be carried thereby, and as revolved, will either contact with straps $69^c$, which straddle the cams, or with rods 69, and raise or lower the inner end of the rods 69, which imparts an opposite movement to the outer end of said rods, thereby causing the spider-frame 38 to lower or raise, in order to lower or raise the soldering irons or bolts. However, it is only desirable that a half-rotation be allowed the cross-shaft 19, so that with the step-rotation thereof the cams $69^d$ will describe one-half of a circle in order that with the movement thereof the spider-frame, through its intermediate mechanism, will be either raised or lowered. For this reason I surround the grooved collar 70 by the eccentric-strap 71, which strap is held in place by the upright $71^a$, which is fulcrumed to the base-plate 1. This eccentric is provided with two inwardly-projecting wedge-shaped shoes $71^b 71^c$, located at diametrically opposite points, Fig. 9. These shoes are shaped in an opposite direction, and one is always located within the annular groove $70^a$, so as to contact with the upwardly-extending lug $71^d$, projecting from the pin $70^c$. The eccentric-strap is thrown back and forth by means of the lever $71^e$, one end of which is connected to the fulcrumed upright or standard $71^a$, and the opposite end to the arm 72 of the bell-crank lever $72^a$, secured to the standard $72^b$. Arm $72^c$ of the crank-lever is connected at its outer end to oscillating rod 27 by means of connecting-rods $72^d 72^e$. As the rod 27 is oscillated by the movement of hand-lever 24, Fig. 8, with the starting or stopping of the machine, the eccentric-strap 71, through the medium of the mechanism just described, is thrown forward or backward.

Now, supposing the machine to be in operation and the parts standing in the relative positions indicated by Figs. 5, 6, and 14, and the hand-lever 24 is thrown, say, backward, in order to stop the machine. This movement of the hand-lever will, through its connecting parts, impart an oscillatory motion to the rod 27, the movement of which will throw the eccentric-strap 71, by means of its connection therewith, forward, which will remove shoe $71^c$, Fig. 6, from contact with lug $71^d$, and permit the resiliency of spring $70^d$ to force the pin $70^c$ outward its full distance, when the projecting end thereof will be engaged by one of the shoulders of the clutch-collar $69^f$ and carried around by the rotary travel of the said clutch-collar. Consequently the motion of the loose traveling collar $69^f$ will be transmitted to the cross-shaft 19, through the medium of the fastened collar 70. However, as the shoe $71^c$ is moved from engagement with the lug $71^d$, Figs. 6, 9, and 10, by the forward throw of the eccentric-strap, the shoe $71^b$ is moved its full distance within the annular groove $70^a$. Consequently, as the cross-shaft 19 is carried around, the lug $71^d$ engages with the shoe $71^b$ and is forced inward, which carries the pin $70^c$ therewith, thus moving the same from engagement with the shoulder of the clutch-collar, and hence stopping the rotation of the cross-shaft 19. It will thus be seen that the shaft 19 is only permitted a half-rotation. During the half-rotation the eccentric cams 69$^d$ are carried therewith. Consequently when the shaft is brought to a rest the position of the cams will be exactly the opposite to that illustrated by Fig. 14, that is, the eccentric portion of cams will bear upon the upper face of the rods 69, instead of under face of straps 69$^c$. As the cams move into said position the inner portion of the rods 69 move downward and the outer portion upward, which raises the spider-frame so as to remove the soldering irons or bolts from contact with the can-body. Of course, it will be understood, without further description, that as the hand-lever 24 is thrown to start the machine the mechanism before described operates reversely, which lowers the spider-frame 38 and so places the soldering irons or bolts as to bear upon the can-bodies.

At the rear end of the machine is located the vertical shaft 74, which works or rotates within bearing-boxes 74$^a$ 74$^b$ of the base-plate and top plate 2, Fig. 11. This shaft has secured thereon the collar 74$^c$, from which projects the disks 74$^d$ 74$^e$, the outer face or periphery of which has a series of notches 74$^f$ cut therein, which correspond with the notches cut within the faces of disks 33 34, projecting from collar 31. Over these disks, which constitute the rotatable carrier-wheels, travels the endless carrier belt or chain, which is composed of a series of open links 75, each of which is provided with a male section 75$^a$ and female section 75$^b$ of a hinged joint, as shown by Fig. 52, which links are united together by means of the bolts 75$^c$, which pass through the male and female sections of the hinge-joints, each link of the endless belt or chain being free to swing independent of the other. To the outer face of each link of the endless carrier belt or chain there is secured what I term the "seamer-horn" or "mandrel-frame," which carries the horn or mandrel and gaging mechanism, hereinafter described.

The links which constitute the endless carrier chain or belt engage the notches cut within the face or periphery of the disks composing the carrier-wheels. Consequently as the disks rotate, through the medium of the rotatable shaft 6, the endless carrier belt or chain is forced to travel over the carrier-wheels by reason of the links thereof engaging the notched portion of the wheels.

Owing to the weight of the carrier belt or chain, horn or mandrel, and gaging devices, it is necessary that a support be provided in order to prevent the sagging of the endless carrier chain or belt. For this purpose I provide the grooved trackways 77, which I arrange on each side of the machine. These trackways run the entire length of the machine and are held in place by brackets 77', which project from the supports 3, Figs. 1, 2, and 54. The ends of the links of the endless carrier chain or belt extend above and below the disks composing the carrier-wheels, and are somewhat enlarged, as shown at 77$^c$ 77$^e$, Fig. 54. The lower enlarged end is bifurcated and has secured therein the roll 77$^a$, which travels within the grooved trackway. The upper enlarged end is provided with the groove or channel 77$^b$, within which fits the downwardly-extending flange 77$^x$ of the guide-rail 77$^d$. This rail is connected to the support 3 at each side of the machine by means of the brackets or flange 77$^{e'}$, to which they are bolted or secured. These rails correspond in length to the grooved trackways and the flange thereof fitting within the groove or channel of the upper end of the links serve to maintain the endless carrier steady, while the lower trackways 77 act as supports for the said endless carrier chain or belt.

From the seamer-horn or mandrel-frame 76, which projects horizontally from the endless carrier, extends the horn or mandrel 76$^a$, which horn or mandrel receives the partly-formed can-body and holds the same until the side or lap seam of the can-body has been soldered. This mandrel is located between the gaging or sizing clamps 76' 76$^b$, the former being a movable one, while the latter is fixed or stationary. The fixed or stationary gaging or sizing clamp may constitute a part of the frame for the horn or mandrel, Fig. 53. There is provided a clamp gaging or sizing device for each horn or mandrel, each of which acts upon the ends of the can-body when held upon the mandrel or horn, and serves to true or round the can-body accurately. The face of each gage or clamp plate is provided with an annular groove or seat 76$^c$. This groove or seat is formed by reaming the face of the gage-plate and bolting to the reamed face thereof the disk 76$^e$. This disk is of less diameter than the face of the gage-plate. Consequently there exists an annular groove or space between the flange 76$^d$, formed by the reaming of the gage-plate and the rounded or inclined edge of the disk 76$^e$, into which the end of the can-body enters as the same is forced upon the mandrel or horn. It will thus be observed that the annular groove is provided with inclined walls, which facilitates the entrance of the can-body within the annular seat or groove.

The seamer mandrel or horn 76$^a$ is composed of a cylindrical block whose diameter approximates that of the can-body which is to be soldered, and the same is secured to the stationary plate or gaging device in any suitable manner. At one end, that which abuts against the stationary clamp, I make the mandrel or horn in the form of a cylinder. Commencing at the opposite end, however, the under face of the mandrel or horn is cut away diagonally to the opposite end, forming a curve. By thus cutting away the horn or mandrel I diminish its diameter or size at that end which first received the rolled or partially-formed can-body, so that the can-body may easily move onto the said horn or mandrel. The contour of the face or top of the mandrel or horn is preserved, which forms a horizontal top to support the can-body along its side or lap seam, and permit the lap-blade to press the lap end of the can-body firmly down.

To the ear 78, upwardly projecting from mandrel-frame 76, Fig. 54, is fulcrumed the knife-lever 78', to the outer end of which is secured the knife or clamp blade $78^2$, which blade or knife bears upon the lap edge of the can-body when placed over the horn or mandrel, and holds the same firmly down during the process of soldering. This blade may be made of any suitable material desired, tile or slate being preferred. The inner end of lever 78' is connected to a vertical rod $78^3$, which works through the bracket $78^4$, projecting from the open mandrel-frame. This rod is surrounded by a spiral spring $78^a$, the ends of which bear against the under face of lever 78' and upper face of bracket $78^4$. The resiliency of this spring is sufficient to normally hold the clamp blade or knife firmly against the face of the mandrel or lap edge of the can-body, if the body be held upon the horn or mandrel. The upwardly-extending portion $78^b$ of the lever 78' has connected thereto the roll $78^c$.

The clamp or gage plate 76' is fastened to the arm $78^e$, which arm terminates in a right-angular sleeve 79'. This sleeve is keyed to the rotatable shaft $79^2$, which works in bearings $79^a$. From the sleeve 79' depends the lever $79^b$, which, during the travel of the endless carrier chain or belt, engages with the cam $79^c$, Figs. 52 and 54, Figs. 11 and 12, located at one side of the machine. As the lever engages with this the movable clamp or gage plate is thrown at right angles to the horn or mandrel. When the said lever engages with cam $79^c$, the clamp or gage plate carrying arm is raised so as to place the clamp or gage plate in position to receive the end of the can-body, Figs. 53 and 54, while when the arm $78^e$ engages with cam $79^3$, located at the opposite side of the machine, the said clamp-carrying arm is lowered in order to permit the withdrawal of the soldered can-body from the mandrel, Figs. 11 and 12. The position of the cams $79^c$ and $79^3$ is such that the movable clamp-gage is not brought into line with the horn or mandrel by engaging the cam $78^c$, until after the rolled can-body has been fitted upon the mandrel and is being carried forward toward the soldering-irons, while the cam $79^3$ does not act to release the movable clamp-gage until after the can-body has been soldered and same is being carried toward the extractor mechanism by the travel of the endless carrier. When acted upon by this cam, the movable clamp-gage is thrown or swung over at right angles to the mandrel or horn, and consequently falls below the level of the horn or mandrel, and thus permits the soldered can-body to clear the same while being withdrawn from the horn or mandrel.

In order that the soldering-iron may bear firmly upon the seam of the retained can-body and move over the entire length thereof when reciprocated, I cut an opening or notch $79^4$ in the top of each clamp or gage plate, within which the soldering-iron fits and works when bearing upon the seam of the can-body, Fig. 12.

If so desired, the upper face of the horn or mandrel may have a longitudinal groove cut therein, within which a lap-tile $79^e$, Fig. 52, may be fitted, so as to prevent the tinning of the horn or mandrel.

The movable clamp or gage plate has a second movement imparted thereto, that is, a longitudinal one. When engaged by cam $79^c$, the clamp plate or gage is merely thrown upward, so as to be placed in line with the horn or mandrel. After the clamp plate or gage has been brought into line, it is necessary that the same be drawn or moved inward, so as to force the outer end of the can-body within the annular groove of the clamp. This longitudinal movement is imparted to the movable clamp plate or gage by shifting the cross-rod $79^2$ in or out, which is accomplished through the medium of the turnstile-cam 80, secured to the lower end of vertical rod 80'. This rod extends through an opening within the lower portion of the mandrel-frame 76, Fig. 52, and is held in place by the bushing $80^2$, from which projects an ear $80^3$. The bushing is rigidly secured to the vertical rod. Consequently as the rod is oscillated by the movement of the turnstile-cam, through the medium of the hereinafter-described fixed cams, the ear $80^3$ is thrown in or out. Upon the cross rod or shaft $79^2$ is loosely mounted the collar $80^a$, which is prevented from lateral movement by means of the collars $80^b$ $80^c$, keyed to the shaft at either side thereof. This collar $80^a$ is connected at its lower end to ear $80^3$ by means of link $80^d$. Consequently as the ear is thrown in or out the collar $80^a$ is drawn therewith, which, engaging with the fixed collars $80^b$ $80^c$, draws the cross-shaft in or out. At each side of the machine I locate a fixed cam for operating the turnstile-cam, which cams I number 81 and 81'. The cam 81 is located beyond the cam $79^c$, so as to throw the turnstile-cam after the clamp or gage plate has been brought into line with the horn or mandrel, in order to shift the cross-shaft $79^2$ inward, whereby the clamping plate or gage is forced over toward the horn or mandrel, so as to place the end of the can-body within the annular groove thereof, for the purpose of truing and sizing the can-body. The clamping or gage plate 76' is held in this position until the side seam of the can-body has been soldered. As the endless carrier chain or belt carries the horn or mandrel, with the soldered can-body, toward the extractor mechanism, the turnstile-cam 80 engages with the fixed cam 81', located within its line of travel in advance of the cam $79^3$, Figs. 11 and 12, and imparts an opposite throw thereto to that given by fixed cam 81, and, through its connecting mechanism, forces or shifts the cross-shaft $79^2$ outward, which moves the clamp or gage plate away from the horn or mandrel, so as to remove the outer end of the soldered can-body from within the annular groove prior to the clamping or gage plate being thrown downward at a right angle to the horn or mandrel by reason of the lever $78^c$ engaging with the cam $79^3$.

It is necessary that the movable clamping or gage plate $76'$ be first moved outward or away from the mandrel or horn, horizontally, so as to remove the outer end of the can-body from within the annular groove thereof, before the said clamping or gage plate is thrown at a right angle or laterally thereto; for if the said plate moves laterally before the outer end of the can-body has been removed from within the annular groove, the retained end or edge of the can-body will be mashed. My movable clamp or gage plate has therefore a double movement, one in a plane at right angles to the horn or mandrel and the other in horizontal alinement thereto. Consequently injury to the can-body is absolutely prevented, for the clamp or gage plate cannot be moved up to the outer end of the can-body and the end of the can-body gaged by the annular groove of the clamp or gage plate, until the said plate has first been swung upward and placed in horizontal alinement with the horn or mandrel; nor can the movable clamp or gage plate be swung at a right angle to the horn or mandrel, after gaging the end of the can-body, until the said plate has been moved outward or away from the horn or mandrel its full distance horizontally, as before described.

In order to prevent the arm $78^e$, carrying the clamping or gage plate $76'$, dropping suddenly when released by the cam $79^3$, which would tend to jar the machine and cause a pounding noise to be given thereto, I provide the curved trackway $81^b$, Fig. 12, which receives the swinging arm $78^e$, carrying the clamp or gage plate $76'$, and gradually lowers the same its full distance. This trackway is bolted or otherwise secured to the frame of the machine at that side on which the extractor is located.

The clamp knife or blade $78^2$, which bears upon the lap edge of the can-body, is raised by the roll $78^c$, secured to the inner end of the knife-rod $78'$, being carried by the travel of the endless carrier chain or belt beneath the face of the inclined fixed cam 82, Fig. 52. As the roll travels under the cam the inner end of the knife-rod is lowered, which raises the outer end and lifts the knife or clamp blade from contact with the horn or mandrel. During the forward travel of the endless carrier chain or belt with the roll beneath the inclined cam 82, the rolled can-body is placed upon the horn or mandrel, by the hereinafter-described mechanism. The moment the roll $78^c$ moves from under the inclined cam 82, the resiliency of the spring $78^a$ forces the inner end of the knife-rod upward, which causes the outer end to descend until the clamp blade or knife $78^2$ bears firmly upon the lap edge of the can-body. The clamp blade or knife is held in this position until the side seam of the can-body has been soldered and is not raised from contact with the body until the opposite side of the machine is reached, when the clamp blade or knife is raised, prior to the horn or mandrel coming in front of the extractor mechanism, in order to permit of the soldered can-body being withdrawn from the mandrel. This releasing of the pressure of the clamp knife or blade from the can-body is caused by the roll $78^c$ traveling beneath the inclined cam-plate $82'$, Fig. 12, which causes the inner end of the knife-rod to lower and the outer end to move upward, which lifts the clamp blade or knife, Fig. 56. The clamp knife or blade is held in its raised position until the mandrel or horn has been carried beyond the extractor mechanism, when the roll will move from under the inclined cam-plate and the resiliency of the spring $78^a$ will force the clamp knife or blade downward.

While in my machine I make employment of a number of clamping or gage plates, (two for each horn or mandrel, in order to size each end of the can-body,) mandrels, or horns for the can-body, and clamping knives or blades, I have not deemed it necessary to describe each specifically, for each being an exact reproduction of the other the foregoing description of one and its connecting mechanism will answer for the others.

To one side of the machine I locate the body-blank feed mechanism or devices, as will be seen by reference to Figs. 2 and 4. In order to add to the efficiency of the machine and increase the rapidity thereof, I provide two feed devices, thereby feeding to the machine two can-body blanks at once, consequently increasing the capacity of the machine. Both feed devices and connecting mechanism being the same as to working and construction, I do not consider it necessary to describe each separately, but let that of one suffice for the other.

The feed mechanism, likewise the forming and delivering mechanism for the can-body blanks, will be found and more readily understood by reference to Sheets 2, 3, 4, 13, 14, 15, 16, 17, and 18 of the drawings.

The frame or support for the feed mechanism consists of the uprights 83, which are bolted to the base of the machine, the outwardly-extending rods $83'$ and the diagonal brace-rods $83^2$. Through the plates $83^a$, which form a part of the uprights 83, Figs. 2 and 24, Sheets 2 and 13 of the drawings, extends the short shaft $83^b$, while through the end connections of the rods $83'$ and $83^2$ extends the cross-shaft $83^4$. Upon each of these shafts, between the rods $83'$, I rigidly secure the gear-wheels $83^5$ $83^6$. Over these gear-wheels travel the sprocket-chains $83^c$, which are connected by the blades $83^d$, said blades being placed such a distance apart as equals the width of the can-body blank, between which the same is placed. These sprocket-chains constitute the feed conveyer chain or belt of the feed mechanism, which, at the same time, serves to impart the motion of the wheels $83^5$ to wheels $83^6$, secured to the cross-shaft $83^4$, Figs. 24 and 25. Motion is imparted to wheels $83^5$ by cross-shaft $83^b$, which derives its motion from sprocket-wheel 84, secured to outer end portion of cross-shaft 84', suspended between shafts $83^b$ $83^4$, by hangers $84^2$, depending from the rods 83', Figs. 24 and 26, Sheets 13 and 14 of the drawings. The sprocket-wheel 84 is connected to sprocket-wheel $84^3$, rigidly secured to the outer end of cross-shaft $83^b$ by sprocket-chain $84^4$. Cross-shaft 84' derives its motion from longitudinal shaft $84^a$, working in bearings $84^b$ of standards $84^{c'}$, secured to base-plate of the seamer. This shaft is connected to shaft $84^c$, Figs. 2 and 7, by sprocket-chain $84^d$, which works over sprocket-wheel $84^e$, secured to shaft $84^a$, and sprocket-wheel $84^f$. Consequently the motion of shaft $84^c$, which receives its motion from the hereinafter-described mechanism, is transmitted to shaft $84^a$, which, in turn, is imparted to cross-shaft 84', Figs. 24 and 26, by means of the sprocket-chain 85, which works over sprocket-wheel $84^x$, rigidly secured to shaft $84^a$ and sprocket-wheel $85^2$, loosely secured to the outer end of cross-shaft $83^4$, being held thereon by collar $85^6$. This sprocket-wheel constitutes an idler. The sprocket-chain 85 during its travel engages with the lower teeth of the sprocket-wheel $85^3$, rigidly secured to the outer end of cross-shaft 84', and imparts motion thereto, which motion is transmitted to the cross-shaft $83^b$ by the hereinbefore-described mechanism.

While the feed conveyer chains or belts travel over the sprocket or gear wheels $83^5$ $83^6$, they also travel within the supplemental frame supported above the feed frame or supports by means of the brackets $85^a$, which are secured to the side rods 83'. This supplemental frame is composed of the side plates $85^b$, cross-pieces $85^c$, and central plate $85^d$. The side plates, it will be noticed, by reference to Fig. 26, Sheet 14, are somewhat wider at their outer portions, or from point $x$, than at the inner ends. The side plates are provided with upturned side flanges $85^e$, which serve as a guide for the can-body blanks as carried forward. The distance between the side flanges, beyond the point $x$, toward the machine, is the length of the can-body. The object in making the frame wider at its outer portion than the length of the can-body blank is that exactness in placing the sheet metal may not be required, for by thus constructing the frame the plates or sheets of metal may be hurriedly placed within the frame out of alinement and the same will be placed in true alinement as carried forward by engaging the faces of the contracted portions of the side flanges. This is of importance where necessity requires the placing of the can-body blanks within the frame with rapidity. As the can-body blanks are placed within the frame, the placing of which is usually performed by a boy stationed at that side of the machine, the endless conveyer chains or belts carry the same forward toward the machine.

As will be observed by reference to Fig. 25, Sheet 13, the center portion of the blades or paddles $83^d$ is cut away, so as to fit over the longitudinal strip or plate $85^d$ of the supplemental frame. The can-body blanks rest upon the side pieces or plates $85^b$ and center piece $85^d$, and are engaged by the blades or paddles $83^d$ as the conveyer chains or belts are moved forward.

In order to free the can-body blanks of all burs or rough edges prior to being delivered to the forming mechanism, so that when formed the can-body will be free of all defects, I locate at the inner end of the feed-frame the rolls 86 86', one placed above the other and between which the can-body blanks pass as fed to the reciprocating or slide plates $86^2$ $86^3$, there being two slide-plates in my machine, one for each feed mechanism, Fig. 4. These rolls constitute the feed-rolls. The upper roll is supported above the lower roll by means of the arms $86^4$, within which the axles $86^a$ $86^b$ are journaled, said arms being movably secured to projecting ears $86^c$ by means of pins $86^d$. By means of the swinging arms $86^4$, the upper roll is permitted a slight vertical movement, which permits metal of varying thickness to be fed between the rolls. Through an opening cut in the swinging arms is fitted the pin $86^e$, the lower end of which is screw-threaded and screws into a screw-threaded opening in the top of the plates $83^a$. In order to maintain the swinging arm downward, so as to cause the upper roll to bear firmly upon the sheet of metal fed between the upper and lower rolls, I locate, between the enlarged head of the pins $86^e$ and the upper face of the swinging arms $86^4$, the spiral spring $86^5$, which exerts a constant downward pressure upon the swinging arms. The opening of the swinging arms through which the pins $86^e$ pass is sufficient to enable the arms to move up and down so as to permit of the upper roll moving away from or toward the lower roll as variation in the thickness of the metal fed between the rolls may necessitate.

The axles or journals 87 87' of the roll 86 rest within bearings formed in the upper part of the frame $87^2$, Fig. 27. The roll 86 receives motion through the medium of the pinion $87^3$, secured to the shaft or journal 87, which intermeshes with the pinion $87^5$, secured to the journal or shaft $86^b$ of the roll 86', Fig. 27. Motion is imparted to upper roll by means of belt-wheel $87^4$, secured to axle $86^b$, which is driven by means of a belt (not shown) which receives its motion from an overhead pulley. (Not shown.) The rotation of the upper roll is transmitted to the lower roll by the pinions before described.

While I have shown the roll 86' provided with a raised curved lip at its ends and the roll 86 with inwardly-curved ends, as shown at 87ª 87ᵇ, in order to slightly curve the ends of the body-blank as passed therebetween so as to insure the ends overlapping when passed through the forming mechanism, the same is not essential, for I have ascertained from practical working of a machine, built in accordance with my invention, that the ends of the body-blank will overlap each other perfectly, after having passed through the forming mechanism, whether the ends thereof be slightly curved by the rolls 86 86', or left straight. These rolls not only free the can-body blanks of burs or rough edges, but also remove all irregularities from the metal.

As the can-body blanks pass from between the rotating pressure-rolls 86 86' of the feed devices, they are deposited upon the reciprocating slide-plates $86^2$ $86^3$, passing beneath the guide-strips $87^c$, bolted or otherwise secured to the frame $87^2$, which guide-strips maintain the can-body in place upon the reciprocating slide-plates. These plates slide within the dovetailed groove $87^e$, cut within the upper face of the frame $87^2$. The forward end of the can-body blanks when placed upon the slide-plates project beyond the end of said plates, so as to be grasped between the feed-rolls of the forming devices when the slide-plates are moved forward. The rear end of the can-body blanks is engaged by the stud 88, upwardly projecting from the slide-plates. This stud engaging the end of the can-body blanks causes the same to move forward with the travel of the slide-plates. The slide-plate $86^2$ has a reciprocating motion imparted thereto through the medium of the lever 88', Fig. 24, the lower end of which lever is fulcrumed to the supporting-rod $84^9$ by the pin $84^{12}$. The upper end of said lever is movably connected between the ears $88^h$, secured to the under face of the slide-plate, near the outer end thereof, by the pin $88^{12}$. From this lever outwardly extends the pin $88^2$, carrying the roll $88^5$, which works within the eccentric groove $88^3$ of the cam $88^4$, secured upon the shaft $84^a$, Figs. 4 and 26. As this cam is carried around by the rotation of the shaft $84^a$, the pin $88^2$ travels within the eccentric groove $88^3$, and causes a reciprocating motion to be given the lever 88', which is imparted to the slide-plate $86^2$. Slide-plate $86^3$ is reciprocated in a like manner by the rotation of the cam $88^a$, also secured upon the shaft $84^a$.

Connection is made between the slide-plate $86^3$ and the fulcrumed lever $88^b$ by connecting-rod $88^c$. The upper end of this connecting-rod is secured to the outer end of the rod $88^{14}$ by the pin $88^{16}$, Fig. 26, while its lower end is connected to the upper end of the fulcrumed lever $88^b$ by the pin $88^{17}$. Inner end of the rod $88^{14}$ is fastened to the outer end of the slide-plate $86^3$, as shown, Fig. 4. To the lower end of the lever $88^b$ is fulcrumed the supporting-rod $84^9$ by the pin $89^{12}$, Fig. 2. From this lever, a short distance above its fulcrumed point, projects the pin $88^f$, to which is secured the roll $88^d$, which works within the eccentric groove $88^e$ of the cam $88^a$. Inner end of the supporting-rod is fastened to one of the uprights 83 by bolts $89^{15}$, Fig. 24, and its outer end is fastened to the support $89^{13}$, Fig. 2, which holds same a distance above the floor or ground. The cams $88^4$ and $88^a$ are so arranged in relation to each other that as one slide-plate is moved forward the other travels in an opposite direction. By thus causing one plate to move forward while the other is moved backward, I provide for an uninterrupted feed of the can-body blanks. Consequently neither feed device is kept waiting; for the travel of the conveyer-belts thereof is so arranged as to deposit can-body blanks alternately upon the reciprocating plates.

As before stated, the shaft $84^a$ is driven by shaft $84^c$. This shaft derives its motion from the central drive-shaft $11^a$, working in bearing $11^f$, Fig. 7, which shaft is driven by the crown-pinion $11^g$, which intermeshes with crown-wheel 10. Upon this shaft is located the gear-wheel 89, which engages with the gear-wheel 89', secured upon the shaft $84^c$, through the medium of the pinion $89^2$, the axle $89^3$ of which works within bearings of standards $89^4$, Figs. 2 and 31. To the shaft $84^c$ I secure a cam $89^5$, having an eccentric groove $89^6$ cut therein, which cam, with the rotation of said shaft, operates certain hereinafter-described solder feed and fluxing mechanism, while at each end of the shaft is connected a crank-cam $89^a$ $89^b$, which imparts a horizontal reciprocating movement to the forming devices in order to move the same toward or from the horn or mandrel, as hereinafter described. These crank-arms or cams are so arranged that while one, with the rotation of the shaft $84^c$, moves one of the forming devices toward the horn or mandrel for the purpose of placing a rolled or unsoldered can-body blank, the crank-arms secured to the other end of the shaft will impart an opposite movement to the other forming device, so as to carry the same away from the horn or mandrel in order to place same in position to receive the next can-body blank and roll same into the required can-body shape, as will be more fully described hereinafter.

So as to more readily understand the working of the forming and delivering mechanism, attention is more especially directed to the illustration thereof set forth in views contained in Sheets 2, 15, 16, 17, and 18 of the drawings.

I make employment in the present machine of two forming devices, which alternately receive a can-body blank, roll or form the same into an unsoldered can-body, and automatically deliver or place the can-body thus formed upon one of the horns or mandrels of the machine in order that the body may have the side seam thereof soldered. Each forming device being the same in construction and working, I shall consider the description of one as being sufficient for both, for, with the exception of the mechanism for imparting longitudinal reciprocal motion to the carriage of the devices, the operating mechanism and parts of one are the counterparts of the other.

Each forming device I locate at one side of the feed mechanism, as will be seen by reference to Figs. 3 and 4, and the same consists of the reciprocating carriages 90 90', to which I bolt the outer frame 90², Figs. 28 and 34. I have made employment of different numerals to designate the reciprocating carriage of each device, this being done to more readily refer to the movement of each hereinafter. The carriages and connecting-frame 90² slide or reciprocate upon the longitudinal support or frame 90³ and bracket 90⁴, projecting from the support, the V-shaped toe 90⁵ of the carriage fitting within the dovetailed channel 90⁶ of the support, and toe 90⁷ of the frame 90² fitting within the channel 90⁸ of the bracket 90⁴. Considering the connecting-frame and carriage as one, the carriage may be said to move or reciprocate within a dovetailed groove cut within the support 90³, provided we consider the support and bracket as a single structure. Within the upper portion of the carriages I cut an enlarged circular chamber, the top and bottom being cut away, as shown in Fig. 32, so as to provide the semicircular wall 90ᵃ 90ᵇ. Within the chamber thus formed is inserted the circular plate 90ᶜ, within which is cut the opening 90ᵈ. The cutting of this opening forms two arms 90ᵉ, so to speak, which partly inclose the periphery of the lower forming-roll 91. From the circular plate 90ᶜ, which I shall hereinafter refer to as the "back" plate, forwardly project the clamp-plates 91' 91², which plates are so curved as to conform to the contour of the inner curved walls 90ᵃ 90ᵇ, being that of a circle. To the inner face of the back plate I bolt or otherwise secure the mandrel-cup 91³. This mandrel-cup is so secured as to leave a slight distance between its outer wall and inner wall of the clamp-plates, which space forms a passage-way 91⁴ for the sheet metal out of which the can-body is formed. This mandrel-cup is half-moon in shape, which provides a curved or arc-shaped passage-way for the sheet metal forced therein. The clamp-plates and cup are so arranged as to bring the passage-way in line with the face of the seamer-horns 76ᵃ, and the mandrel-cup is of such a diameter as to cause the formation of a can-body therearound whose internal diameter will be such as to cause the same to fit snugly over the horn or mandrel when placed thereon.

The back plate 90ᶜ and clamp-plates 91' and 91² I preferably make in one casting, Fig. 35. Between the depending ears 91ᵃ of the back plate, I fulcrum the clamp-plate 91ᵇ. This plate constitutes the bottom or movable clamp-plate, which, when raised, completes the arc of the clamps. The outer end of this clamp-plate has secured thereto the upwardly-extending shoulder 91ᶜ. The normal position of this clamp-plate is open, it being held so by the resiliency of the spring 91ᵈ, which forms connection between the plunger-rod 92 and pin 92', projecting from the outer end of the said clamp-plate. The inner end of the plunger-rod is secured to the back plate 90ᶜ, while the outer portion extends through the cross-head 92².

From the frame 90² outwardly extend the arms 92³, the outer ends of which are connected to the cross-head 92², so as to impart the reciprocating movement of the carriage to the said cross-head, which movement is given to the carriage by the hereinafter-described mechanism. To the outer ends of these arms I fasten the lower ends of the yoke-plate 92⁴, Fig. 30.

As the plunger-rod of the forming-mandrel moves in or out, by means of the rocker-arms 92ᵃ 92ʰ, as will be more fully described, the back plate, clamp-plates, and mandrel-cup will be likewise carried, for the clamp-plates and back plate are not rigidly secured within the carriage of the forming device, but merely placed therein so as to permit of being moved back and forth. As moved inward the can-body is carried thereby and placed upon the mandrel or horn, after which the outward movement of the plunger-rod withdraws the back plate, clamp-plates, and mandrel-cup so as to leave the rolled can-body upon the mandrel or horn. Hereinafter I shall refer to the clamp-plates, back plate, and mandrel-cup as the "forming-mandrel," for it is by means of these devices that the can-body is formed into proper shape. As the forming-mandrel is moved in or out it is necessary that the lower clamp section or plate be raised and lowered so as to hold the rolled can-body firmly against the mandrel-cup as the same is carried forward, and release the rolled can-body as the forming-mandrel is withdrawn from the horn or mandrel of the seaming-machine. This is necessary, else the rolled can-body would be liable to slip with the inward and outward movement of the forming-mandrel. This raising and lowering of the lower clamp section or plate 91ᵇ is accomplished through the medium of the eccentric cam 92ᵇ, fastened to the shaft 92ᶜ, secured between the lower end of plates 92ᵈ, the upper ends of said plates being secured to the bolts 92ᵉ, which connects the inner ends of the rods 92ᶠ with the ears 93, which project from the outer face of the back plate of the forming-mandrel, Figs. 33, 34, and 35. The outer ends of these rods I connect to the collar 93', as shown by Figs. 28 and 31 of the drawings. This collar is loosely fastened upon the plunger-rod 92 in order that the said rod may have a free rotatable movement therein. The manner of connecting the arms 92ᶠ with the shaft 92ᶜ, forms a toggle-joint connection, whereby the first inward movement of the rod 92 causes the arms 92ᵈ to throw the cam 92ᵇ so as to impinge against the inner surface of the shoulder $91^c$, which throws the outer end of the clamp plate or section $91^b$ downward, causing the inner end to move upward in order to press the can-body held within the forming device firmly against the face of the mandrel-cup. The rolled can-body is thus held during the entire inward stroke of the plunger-rod, or until the rolled can-body has been placed upon the horn or mandrel. As the plunger-rod begins its back stroke or its move outward, the connecting-rods $92^f$ impart an opposite throw to the eccentric cam $92^b$, which causes the cam to move from engagement with the shoulder $91^c$. The resiliency of the spring $91^d$ will move the outer end of the clamp plate or section $91^b$ upward, thereby lowering the inner portion so as to release the can-body and permit the free withdrawal of the forming-mandrel from the horn without disturbing the placed can-body. As the plunger-rod moves its full inward stroke it is desirable that a slight turn be imparted thereto, so as to slightly twist or turn the forming-mandrel when moved inward, so as to place the rolled can-body blank upon the mandrel or horn of the seaming-machine, so as to insure the lap edge of the rolled can-body coming beneath the clamp blade or knife $78^2$. This movement or slight turn of the forming-mandrel is accomplished in the following manner: As the plunger-rod 92, which carries the forming-mandrel at its inner end, is about to complete its full inward stroke, as before described, the pin $93^2$, projecting from the collar $93^3$, rigidly secured upon the outer end of the plunger-rod 92, moves within the eccentric groove $93^4$ cut within the strap or plate $93^5$, projecting a short distance beyond the cross-head $92^2$. As the pin or stud $93^2$ moves or travels within the eccentric groove $93^4$, a slight turn is imparted to the moving plunger-rod, which in turn gives a corresponding twist to the forming-mandrel, secured to the inner end of the plunger-rod, which causes the lap edge of the can-body to be placed directly under the clamp blade or knife $78^2$.

Rocker-arm $92^a$ works within bearings of the supports $93^b$ $93^c$, the outer end of said arm having an elongated opening $93^d$ cut therein, within which a slide-block $93^e$ is secured by means of the set-screw $93^f$, through which slide-block the bolt $93^h$ extends, which bolt connects the rocker-arm with the reciprocating plate 94, the bolt $93^h$ being secured to the reciprocating plate 94 by means of the face-plates $94'$, Figs. 28 and 30. The upper portion of this reciprocating plate terminates in the yoke $94^2$, and the lower end in yoke $94^3$. From the base-plate of the machine outwardly extend the brackets $94^4$, to which are secured the upwardly-projecting arms $94^5$ by means of the bolts $94^a$, which pass through the elongated slot $94^b$ of the said arms. Through the upper portion of these arms extends the cross-shaft $94^c$, to which is secured the lower end of the arms $94^d$, which arms are connected to the arms of the yoke $94^3$ by means of the bolts $94^e$, which pass through the elongated slots $94^f$. By this manner of securing the arms $94^5$ and $94^d$ to the bracket $94^4$ and yoke $94^3$, I am enabled to compensate for wear. Cross-head $92^2$, which supports the plunger-rod 92 and connecting-rods $92^f$, Fig. 28, works upon the shaft $94^a$, which connects upper ends of yoke $94^2$. This cross-head slides back and forth with the reciprocating movement of the carriage of the forming device.

The inner ends of the rocker-arms $92^a$ $92^h$ terminate in a cross-head 95 $95'$, Figs. 5 and 7.

It will be noticed that I employ different numerals to indicate the rocker-arms, although each works in the same manner. I do this in order that the movement of each may be referred to specifically, for while one moves in the other is forced outward in order that an opposite throw may be imparted to the plunger-rod of each forming device, for as one forming-mandrel is carried inward the other moves outward. The cross-head of each rocker-arm is connected to a second cross-head $95^2$ $95^3$ by the rods $95^4$, so as to leave a space therebetween, within which revolves the crank-cam secured to each end of the shaft $84^c$. In order to impart a hesitating movement to the rocker-arm, for the purpose hereinafter set forth, I secure to the outer portion of each of the crank-arms $89^a$ and $89^b$ a bearing-plate, which plate is approximately triangular in shape and is set at such an angle that its bearing-face engages with the cross-heads at different points from the crank-cams. By means of this plate the crank-cams $89^a$ and $89^b$ may be said to be provided with two bearing-faces $95^a$ $95^b$. The face $95^a$ of the crank-cam $89^a$ engages the cross-head 95 during its rotary travel in order to force the rocker-arm $92^a$ outward, which imparts a similar movement to the plunger-rod, while the face $95^b$ engages the flange $95^c$ of the cross-head $95^2$ in order to draw the rocker-arm $92^a$ inward. As the rocker-arm $92^a$ is being forced outward the rocker-arm $92^h$ is being drawn inward by the bearing-face $95^b$ of the crank-cam $89^b$, engaging the flange $95^b$ of the cross-head $95^3$. The hesitating movement given the rocker-arm and plunger-rod carried thereby may be readily understood by reference to Fig. 29 of the drawings. By this figure it will be observed that the rocker-arm is at its full outer stroke, the cross-head 95 being engaged by the bearing-face $95^a$ at the farthest distance from the shaft $84^c$. The rocker-arm will now remain at rest until the crank-cam has traveled such a distance as will bring the bearing-face $95^b$ into engagement with the side flange $95^c$ of the cross-head $95^2$. This hesitation of the plunger-rod is a necessity, for when thrown its full outward stroke, it must remain at rest a sufficient length of time to enable the sheet of metal forming the can-body blank to be rolled within the forming-mandrel of the forming device, and when given its full inward throw or movement, which places the rolled can-body upon the horn, it must remain at rest a given time in order to enable the clamp plate, blade, or knife $78^2$ to descend and grasp the lap edge of the rolled can-body placed upon the horns, in order that the displacement of the rolled can-body may not occur as the forming-mandrel is withdrawn from the horn or mandrel of the machine.

From the cross-head $95^2$ extends the rod $95^5$, which slides within bearing of support $95^6$. This rod maintains the cross-heads and rocker-arm in true line and prevents possible unevenness in the throw of the rocker-arm $92^a$.

Within the upper portion of each movable carriage of the forming devices I locate the forming-rolls 91 96, which work within bearing-boxes $96'$ $96^2$, located between the arms $96^3$, projecting from the movable carriage, Figs. 28, 32, and 34. These arms are prevented from spreading by means of the tie-rods $96^4$. The roll 96 is located directly above the roll 91, and between the faces of these rolls the sheet of metal or can-body blank is delivered by the reciprocating slide-plates $86^2$ $86^3$, which receive the can-body blank from the feed mechanism. The end of the can-body blank is placed between the surfaces of the forming-rolls when the side plates make a full forward stroke, which is accomplished by means of the mechanism previously described. The forming-rolls lie in a plane parallel with the movable carriage of the forming mechanism, Fig. 34. The forming-rolls are held in place by means of the screw-bolts $96^9$, which extend through the retaining-plate $96^5$, secured to the arms $96^3$ of the carriage. These bolts permit the upper roll to be adjusted toward or from the lower roll in order to take up wear. Rotary motion is imparted to the forming-rolls through the medium of the intermeshing pinions $96^a$ $96^b$, secured to the outer end of shafts $96^c$ $96^d$, Fig. 34. The upper pinion is engaged by pinion $96^e$, secured to the inner end of shaft $96^h$, which shaft works within bearings of yoke or arch plates $92^4$ and $96^k$, Fig. 28. Pinion $96^e$ is driven by rotation of shaft $96^h$, motion to which is imparted by means of belt (not shown) working over belt-pulley $96^f$, secured to the shaft $96^h$, which belt receives its motion from any suitable machinery.

In front of each set of forming-rolls I locate the deflecting-plate 97, the inner end of which lies between the faces of said rolls, but not in contact therewith. This plate is held in true alinement by plate $97'$ and is moved in or out, as required, by means of adjusting-screw $97^2$, which works through the upper portion of bracket $97^3$, bolted to the front face of each movable carriage, Fig. 32.

As the sheet of metal or can-body blank is carried between the rolls 91 96 the forward edge thereof is forced beneath the end of plate 97, which deflects the same and causes the blank, as carried forward, to enter within the passage-way $91^4$. As the can-body blank travels within this passage-way the same is curled or rolled around the under face of the mandrel-cup $91^3$, so as to give the proper shape to the can-body. By rolling or primarily forming the can-body prior to delivering same to the mandrel or horn the spring is removed from the metal, which, after the side seam of the can-body has been soldred, releases the solder of the side seam from the strain exerted thereon by the effort of the metal to spring away or tear itself apart. Besides this, rolling of the can-body blank permits the formation of an absolutely cylindrical can-body.

Inasmuch as the horns or mandrels of the seaming-machine which receive the rolled can-bodies are secured to a continuously-traveling chain or belt, driven by the vertical drive shaft 6, as heretofore fully described, it becomes necessary that during operation of placing the rolled can-body upon one of the traveling horns or mandrels by the inward movement of the forming-mandrel the entire forming mechanism be given a movement longitudinally of the machine while the forming-mandrel moves inward or toward the horns or mandrels and during the outward movement away from the horn. This longitudinal or reciprocating movement of the forming mechanism is accomplished by means of the heart-shaped cam $97^4$, secured to the outer end of the shaft $97^5$, which shaft works within bearings of supports $97^6$ $97^7$. The cam $97^4$ rotates within cam box or frame $97^a$, bolted to and depending from the under face of frame $90^2$, Figs. 28 and 30. This frame being connected to carriage 90 of the first forming device it is obvious that as the bearing-faces of the heart-shaped cam $97^4$, during the course of its rotation, engages with the sides of the depending frame $97^a$ a longitudinal reciprocal movement will be imparted to the carriage 90, which carries the entire forming mechanism. The stroke of this cam and its speed is so regulated that the travel of the forming mechanism will be in conformity with that of the moving horn or mandrels upon which the rolled can-body is to be deposited. It will be understood that as the carriage of the forming mechanism is moving longitudinally the forming-mandrel is being carried toward or from the mandrels or horn by the inward or outward travel of the plunger-rod 92, which has reciprocal motion imparted thereto by the rocker-arm $92^a$, through the medium of the before-described mechanism.

The shaft $97^5$ has rotary motion given thereto by the gear-wheel $97^b$, secured thereon, intermeshing with gear $97^c$, fastened to cross-shaft $97^d$, which works in bearings of standards $97^e$ $97^f$. This shaft is driven by the crown-wheel 98, secured to the central shaft $11^a$, engaging with crown-pinion $97^h$, which pinion is fastened to inner end of cross-shaft $97^d$, Figs. 7 and 31. It will thus be seen that to the forming mechanism I impart a longitudinal and horizontal reciprocal movement.

The carriages of the forming devices while having a longitudinal reciprocal motion imparted thereto must travel in opposite directions—that is, as the carriage 90 moves forward the carriage 90' is drawn backward, in order that the forming devices may be brought into position to receive the can-body blanks from the slide-plates 86² 86³. While this movement may be derived in various ways, I have ascertained that the simplest manner is to connect the forward carriage 90' directly with the sliding carriage 90 by means of the connecting-rod 98', the inner end of which is secured to the frame or cam-box 97ª, Figs. 4, 30, and 31. This rod is held in position by means of guide-strap 98². It will be seen by reference to Figs. 3 and 4 that the outer end of this connecting-rod is provided with a series of teeth, so as to form a rack-bar portion 98³. As the carriage 90 reciprocates longitudinally the connecting-rod 98' is moved forward and backward therewith, and the motion thereof is transmitted to the carriage 90' through the medium of the pinion 98⁴, the teeth of which engage the teeth of the rack portion of the rod 98' and those of the rack-plate 98ª, secured to the outer face of the frame of the carriage 90', Fig. 4. As the connecting-rod 98' is moved forward the pinion 98⁴ will be rotated to the right, which will cause the carriage 90' to move backward. When the said connecting-rod is carried backward, upon its return stroke, the carriage 90' will be moved forward. It will thus be seen that the carriages 90 and 90' reciprocate in opposite directions.

Within the face of the reciprocating carriages I cut a series of longitudinal grooves 98ᶜ, within which are fitted the plates or strips 98ᵇ, the forward end of which rest within the grooves 98ᵈ, cut within the face of the roll 91. The end of these strips or plates projecting below the surface of the roll 91 overcomes the possibility of the can-body blank being carried beyond a certain point while being rolled or crimped within the forming-mandrel. Owing to the rapidity with which the can-body blank is rolled and fed within the forming-mandrel, the body-blank would be apt to be forced above the forming-mandrel and re-enter between the forming-rolls, if some such device as the plates described be not interposed to provide against the body-blanks being carried beyond a certain distance.

After the rolled can-body has been placed upon one of the horns or mandrels of the machine and the forming-mandrel withdrawn, the endless carrier belt or chain will have moved or traveled such a distance as to cause the movable gage-clamp to be thrown upward into line with the mandrels or horn and inward, so as to firmly grasp the can-body, through the medium of the cam mechanism heretofore described, after which the continued forward travel of the endless carrier chain or belt places the horn or mandrel, carrying the clamped or sized can-body, in front of the solder-feed mechanism, so as to receive the necessary solder, and also have the flux applied thereto, prior to moving forward such distance as to be engaged by the soldering-iron.

In front of the can-body-feed mechanism, or near the forward end of the machine, I locate the solder-feed and flux-supplying mechanism, which mechanism is so arranged, preferably, as to apply solder to two of the can-bodies, carried forward by the endless carrier belt or chain simultaneously, and to deposit the flux likewise upon two can-bodies. By preference I make employment of wire-solder-feed mechanism.

Within a dovetail groove cut in the upper face of the frame 99, which frame may constitute a continuation of the frame 90³, works the slide-frame 99', which frame is connected to the carriage 90' by rod 99². Consequently as said carriage is given a longitudinal reciprocating movement the frame 99' will be likewise moved. From the frame 99' upwardly projects the hollow sleeve 104⁷, within which sleeve works the vertical rod 99⁷, said rod terminating in a T-shaped head 99⁸, which is bolted or secured to the under face of the bed-plate 99⁴, which plate is cast with the inwardly-projecting arms 99⁶. Within a horizontal groove cut within the under face of the bed-plate 99⁴ works the slide-plate 99³, the lower face of said plate resting upon the T-shaped head of the vertical rod 99⁷. This slide-plate is provided with the inwardly-extending arms 99⁸, to which I attach the flux-brush holders or frames 99ª, which carry the flux-applying brushes 99ᵇ, which brushes are raised so as to dip within the flux bath contained within the flux-receptacles 99ᶜ in order to receive flux, and afterward lowered so as to apply the flux to the can-bodies (held upon the horns or mandrels) with the vertical movement of the rod 99⁷, which is raised and lowered through the medium of the hereinafter-described mechanism. The flux-receptacles are secured to the top plate 2, above the endless traveling chain or belt carrying the horns or mandrels, by means of the brackets 99ᵈ, and they receive their supply of flux from the flux-reservoir 99ᵉ, placed at any suitable point, through the supply-pipes 99ʰ, the flow of flux being controlled by stop-cock 99ᵏ.

The wire solder is fed to the can-bodies through the tubes 100 and 100', the inner tube 100' being in line with inner end of tube 100. I leave a space between the solder-tubes, Fig. 39, in order that short pieces of solder may be removed when the end of a length of solder is reached. When a piece of solder the proper length projects beyond the tube 100', the same is cut off, so as to drop or fall upon the can-body, by means of the knives 100². These knives work upon the outer end of arms 99⁵, and are held in place by means of plates 100³, Fig. 41, through which plates the pin or stud 100⁴, upwardly projecting from the knives, extends. These knives are moved in or out, so as to cause the cutting edge $100^5$ to work back and forth over the face of solder-tube $100'$, in order to cut or clip the solder, by means of the levers $100^6$, fulcrumed to the arms $99^5$ by pin $100^7$. The inner end of said levers rest within a socket $100^a$, cut in the knives $100^2$. By means of the guide-strips $100^b$, which bear upon the fulcrumed lever, the said levers are prevented from becoming displaced. Within the arms $99^5$ of the bed-plate I cut the elongated slots $100^c$, through which extends the pin $100^d$, the lower or projecting end of which is enlarged, so as to provide a shoulder $100^e$. This pin or stud extends through outer end of the fulcrumed levers and is secured thereto by means of nut 101. As the bed-plate is carried forward, with the movement of the frame $99'$, the downwardly-projecting studs or pins $100^d$ engage with the fixed cams $101'$, and will be held by said cams during the forward travel of the frame $99'$ until released from engagement therewith by the upward movement of the bed-plate $99^4$, as hereinafter described. As the bed-plate and frame move forward the pins or studs travel or work within the elongated slots $100^c$. The outer end of the fulcrumed levers is thrown to the right, which forces the inner end in an opposite direction, causing the edge of the cutting-knives to move in front of the inner end of the solder-tube $100'$, so as to cut or clip the solder and permit the same to be deposited upon the can-bodies. The moment the bed-plate $99^4$ moves upward far enough to release the pins or studs from contact with the cams $101'$, which are secured to brackets upwardly extending from the frame $101^2$ of support 99, Figs. 38 and 39, the resiliency of springs $101^3$, which connect the upper end of pins or studs $100^d$ with pins $101^4$, projecting from the bed-plate $99^4$, impart an opposite throw to the fulcrumed levers than that given by the cams $101'$, which causes the cutting edge of the knives to move away from the ends of the solder-tube in order to give a free outlet for the next piece or strip of solder. As the bed-plate moves forward with the pins or studs $100^d$ into engagement with the cams $101'$, which causes the cutting-knives $100^2$ to cut the solder, the slide-plate $99^3$ will be reciprocated in and out, so as to cause the flux-brushes to move over the seam of the can-bodies. This inward and outward movement of the slide-plate is accomplished by means of the stud or roll M, downwardly projecting or extending from the outer end of said plate, moving within the inclined groove $M^2$, cut within the cam-plate $M'$, Fig. 38. As the roll or stud travels or moves within this inclined groove the slide-plate will be moved in or out, which, carrying the flux-brushes therewith, causes the same to move over the seam of the can-bodies and apply the flux thereto. It will thus be noticed that the flux-brushes not only move forward and backward with the travel of the slide-frame $99'$, but during such movement are reciprocated inward and outward. This slide-plate is also raised and lowered, so as to carry the flux-brushes up and down, by the vertical movement of the rod $99^7$. Hence said slide-plate may be said to have a triplicate movement.

The wire solder is fed or conveyed through the solder-tubes to the machine by the rotation of the feed-rolls $101^4$ $101^5$, secured to the outer end of the shafts $101^a$ $101^b$, the rolls $101^4$ being secured to shaft $101^a$ and rolls $101^5$ to shaft $101^b$. These rolls have the groove provided with transverse corrugations $101^c$ cut within the periphery thereof. As the said rolls revolve the wire solder is drawn therebetween and forced through the solder-tubes. When the periphery of the rolls are brought together, the annular corrugated grooves form an opening through which the solder passes, but the diameter of this opening is less than that of the wire solder. Consequently the corrugated faces of the grooves engage the wire and act as teeth by which to draw the same inward.

The shafts carrying the solder-feed rolls work within bearings formed in the outer face of the arms $99^6$ of the bed-plate $99^4$, being held in place by means of face-plates $101^d$. Upon the lower shaft is secured the pinion 102, which meshes with pinion $102'$, secured to the upper shaft, Fig. 36, so as to impart the rotation of the lower shaft to the upper shaft in order to drive the solder-feed rolls. On the shaft $101^b$ is loosely fitted the sleeve $102^2$, which sleeve carries the disk $102^3$ and rack-pinion $102^4$, Fig. 37. To the outer face of disk $102^3$ is secured the pawl $102^5$, which when thrown into locked engagement with ratchet-wheel $102^a$ imparts the motion or rotation of the rack-pinion to said ratchet-wheel. This ratchet-wheel is secured to the sleeve $102^b$, feathered or otherwise secured to the shaft $101^b$. Consequently when the ratchet-wheel $102^a$ is rotated the shaft $101^b$ is likewise moved. The pawl $102^5$ is held down by the pressure of spring $102^c$, also secured to outer face of disk $102^3$, Fig. 44, the free end of which spring bears upon the free end of the pawl. As the bed-plate $99^4$ is raised and lowered rack-pinion $102^4$ engages with the teeth of rack-bar 103. The downward movement of the bed-plate causes the rack-pinion, by engagement with the rack-plate, to have a right-hand rotation imparted thereto, which motion is transmitted to the shaft $101^b$ by the pawl $102^5$, engaging with the ratchet-wheel $102^a$. This ratchet-wheel being secured to the sleeve $102^b$, feathered or otherwise secured to the shaft $101^b$, it is obvious that the movement of the ratchet-wheel is conveyed to the shaft which rotates the feed-rolls $101^5$. The motion of the shaft $101^b$ is transmitted to the upper shaft and feed-rolls $101^4$ through the medium of the pinions 102 $102'$. As the bed-plate is raised an opposite rotation is imparted to the rack-pinion, which causes the pawl to ride loosely over the ratchet-wheel.

Hence this rotation of the rack-pinion is not imparted to the shaft $101^a$. It is not desirable that the wire solder be fed through the solder-tubes during the entire downward movement of the bed-plate, for this would supply to the can-body held upon the seamer-horn a strip of solder too long. Consequently in order to control the feed of the solder I provide the disk $103'$, which is loosely secured to the sleeve $102^b$ and does not rotate therewith, said disk being held rigid by means of the set-screw $103^2$, which works within an elongated opening $103^3$, cut through the bracket $103^3$, projecting upwardly from the frame $103^4$. The end of the set-screw $103^2$ screws within a screw-threaded seat or socket (not shown) in the periphery of the disk $103'$. When the set-screw $103^2$ is screwed tightly up, the under face of the head thereof impinges firmly against the upper face of the bracket $103^3$ and holds the disk $103'$ rigid. To the inner face of this disk I secure the cam $103^a$, with which the lug $102^9$, projecting from the pawl $102^5$, engages as the disk $102^3$ is rotated through the medium of the rack-pinion during the downward movement of the bed-plate $99^4$. As the lug $102^9$ of the pawl rides upon the face of this fixed cam the same is released from engagement with the ratchet-wheel $102^a$. The moment the pawl is released rotation of the shaft $101^b$ ceases. Consequently the feed of the solder stops, although the bed-plate continues its downward movement. By releasing the set-screw $103^2$ the disk $103'$ may be turned in either direction, by hand, so as to adjust the position of the cam $103^a$ for the purpose of controlling the feed of the solder, that is, give a long or short feed thereto.

The bed-plate $99^4$ is raised or lowered by the lift-rod 104, which rod works within the hollow guide-plate $104'$, bolted to the frame 99, Figs. 36 and 38. Within the face of bracket $104^2$, inwardly projecting from the lift-rod, Fig. 38, is cut the channel or groove $104^3$, within which fits and works the roll $104^4$, secured to the pin $104^5$, projecting from the vertically-movable rod $99^7$, said pin working within an elongated slot $104^6$, cut in the face of the sleeve $104^7$. This roll travels back and forth within the groove or channel $104^3$ during the longitudinal reciprocal movement of the frame $99'$, said groove serving as a guide to hold the bed-frame in true line during such movement of the frame $99'$. The roll $104^4$, fitting within the channel $104^3$, acts as a support for the vertical movable rod. The outer portion of the bed-plate $99^4$ is supported by the flange $104^a$ of the bracket $103^4$, which bears upon the roll $104^b$, secured to a pin projecting outwardly from the lift-rod 104. By means of the stud or pin $104^c$, projecting from the lift-rod above the roll $104^b$, a guideway is formed for the flange $104^a$, which prevents the tilting of the bed-plate as carried back and forth by the movement of the reciprocating frame $99'$. As the lift-rod 104 is raised the roll $104^b$ bears against the under face of flange $104^a$ and lower wall of the channel or groove $104^3$ against the under face of roll $104^4$, and raises the bracket 103 and rod $99^7$, which causes the bed-plate to move upward. As the lift-rod lowers the bed-plate will move downward by gravity. This lift-rod is raised and lowered by means of the lever 105, which is secured to the rock-shaft $105'$, supported above the base-plate of the machine by brackets $105^2$. The outer end of the lever 105 is connected to lower end of lift-rod by pin $105^3$. The inner end of said lever has the counterbalance-weight $105^4$ secured thereon, which weight just about counterbalances the weight of the bed-plate $99^4$, so as to require the utilization of only a small amount of power to raise the lift-rod and its connecting parts. Lever 105 is secured to the forward end of the rock-shaft, the crank-arm $105^8$ being secured to the opposite end. The free end of this crank-arm extends within the groove $89^6$ of the eccentric cam $89^5$, which crank-arm is thrown up or down, so as to impart a rocking movement to the shaft $105'$ as the eccentric cam $89^5$ is carried around by the rotation of the shaft $84^c$, to which it is secured, said shaft deriving its motion from the central shaft $11^a$ through the medium of the hereinbefore-described mechanism. As this eccentric cam is rotated the crank-arm $105^8$ travels within the eccentric groove $89^6$ and is moved up and down, and thus imparts a rocking movement to the shaft $105'$, which throws the outer end of the lever 105 up and down, and inasmuch as this lever is connected to lower end of lift-rod 104 it is obvious that said lift-rod is raised and lowered with the movement of the lever 105, the movement of which carries the bed-plate $99^4$ therewith, as before described. The movement of the eccentric cam $89^5$ is so timed that the bed-plate $99^4$ does not begin to rise until after the slide-frame $99'$ has moved nearly its full forward stroke. It is necessary that the bed-plate be raised as the slide-frame is drawn backward in order that the flux-brushes $99^b$ may be brought into line with the flux-holding receptacles $99^c$. As the bed-plate continues its travel while elevated, the flux-brushes are drawn over the flux-receptacles, dipping into the bath of flux while being drawn over the receptacles. After the bed-plate has traveled backward sufficiently far to carry the flux-brushes beyond the flux-receptacles, the eccentric cam will be in such position as to, by its travel, cause the bed-plate to gradually lower, in order that the flux-brushes may be brought into line with the can-bodies held upon the traveling horn or mandrel. The operation of thus applying the solder and flux is the same as that previously described. It will thus be observed that the bed-plate is moved back and forth by the longitudinal reciprocal movement of the slide-frame, which movement is necessary that the bed-plate may travel forward in unison with the movement of the mandrel or horn during the operation of applying the solder and flux to the can-bodies carried by the horns or mandrels and that the entire plate, solder mechanism, and flux mechanism be brought back into position after having applied the solder and flux. The slide-plate 99³ is moved in and out or toward and from the mandrel or horn during the forward travel of the bed-plate, so as to cause the flux-brushes to move back and forth over the lap-joint of the can-bodies carried by the mandrel or horn, which insures the proper depositing of the flux, and it has a vertical movement, whereby the flux-brushes are brought into line with the flux-receptacles upon the back travel of the bed-plate and lowered, so as to be in line with the mandrel or horns after having been carried through the flux bath.

By Fig. 38 of Sheet 20 of the drawings I have shown the eccentric cam 89⁵ in dotted lines merely for the purpose of illustrating more clearly the shape thereof, the exact position which the said cam bears to the rock-shaft 105' being shown by Fig. 36 of the drawings.

The rack-bar 103, with which the rack-pinion 102⁴ engages, is held in place by means of the face-plates 105ᵃ, Figs. 36 and 38, being prevented from displacement by pin 105ᵇ, which enters the slot 105ᶜ, cut in the face of said rod. From the lower end of this rod inwardly projects a pin, which carries the roll 105ᵈ. This roll works within the longitudinal channel or groove 105ᵉ, cut within the bracket 105ʰ, secured to the support 99. By means of this roll the rack-rod is held from moving up or down as the bed-plate is raised and lowered.

After the mandrel or horn is carried beyond the solder and flux applying mechanism, by the travel of the endless carrier chain or belt, the same is carried beneath the soldering-irons, which are lowered so as to bear upon the lap-seam of the can-bodies secured over the horns or mandrels. The soldering-irons continue to bear upon the can-body and reciprocate back and forth thereover until raised from contact therewith by the roll 68ʰ, moving upon the inclined portion of cam 68ᵃ, or between points $a$ $a'$, Figs. 1 and 13, which causes the soldering-irons to move upward or from contact with the can-bodies, as hereinbefore fully described.

As the horns or mandrels, with the can-bodies held thereon, pass beyond the soldering-irons, they are carried toward the extractor device, which removes the soldered can-bodies from the horns or mandrels. During the movement of the horns or mandrels toward the extractor mechanism (located at an opposite side of the machine to that of the can-body-blank feed mechanism) by the travel of the endless carrier belt or chain the turnstile-cam 80 engages with the fixed cam 81', so as to throw the shaft 79² outward, the movement of which carries the clamp or gage-plate 76' away from the can-body, after which the arm 78ᵉ engages with fixed cam 79³, which throws the movable clamp or gage-plate 76' downward at right angle to the horn or mandrel, as hereinbefore fully described.

To the base-plate 1, at a point opposite the feed mechanism for the can-body blanks, I secure the support or frame plates 106, which serve as a support for the extractor mechanism. These frame or support plates are united by the cross-bars 106', the upper ends of which are enlarged or T-shaped, as shown at 106², so as to provide a bearing for the longitudinal slidable frame 106³, within the under face of which is cut a dovetail guide groove or channel 106⁴, into which the T-shaped heads of the bars 106' fit. This slide-frame has longitudinal movement imparted thereto through the medium of the crank-cam 106ᵃ, which works or rotates within cam-box 106ᵇ, secured to and depending from the under face of the slidable frame 106³. As the crank-cam, during its rotary travel, engages with the sides of the cam-box, the slidable frame is forced back and forth. This crank-cam is secured to outer end of shaft 106ᶜ, which works in bearings 106ᵈ 106ᵉ, Fig. 46. To this shaft is secured the gear-wheel 107, which intermeshes with gear-wheel 107', fastened to outer end portion of shaft 107², said shaft working in bearings 107³ 107⁴. This shaft derives its motion from the central shaft 11ᵃ, through the medium of bevel-pinion 107⁵, secured to its inner end, which intermeshes with bevel-gear 98, Fig. 7. In this manner the rotary movement of the central shaft is transmitted to crank-cam 106ᵃ in order to impart longitudinal reciprocal movement to the slidable frame 106³.

To the slide-frame 106³ I secure the plates or side pieces 107ᵃ, within the inner face of each being cut the V-shaped channel 107ᵇ. These plates or side pieces form a guide for the horizontal slidable frame 108, the shoulders 108' of which rest within the V-shaped channels or grooves of the side pieces or plates 107ᵃ. The slide-frame or table 108 is given a horizontal movement or thrown inward and outward by the reciprocal movement of the crank-rods 108², keyed to the cross-shaft 108³, which shaft extends through the brackets 108⁴, outwardly projecting from the frames 106. The upper arms of the crank-rods are connected to shaft 108ᵃ, which shaft is connected to cross-head 108ᵇ by connecting rod or strap 108ᶜ. The inner end of this rod or strap is secured to the cross-head 108ᵇ, while the outer end is movably connected to shaft 108ᵃ, upon which it slides back and forth with the movement of the slide-frame 106³. This connecting rod or strap works between the walls of the guide-plate 108ᵉ, upwardly projecting from the outer end of the slidable frame 108, which guide-plate serves to maintain the connecting-strap in true line and release the inner end thereof of undue strain during the longitudinal reciprocal movement of the slide frame or plate $106^3$, which carries the slidable plate or frame 108 therewith.

The lower arms of crank-rods $108^2$ I secure to shaft 109, which shaft is connected to crank-arms $109'$, fastened to ends of shaft $109^2$ by means of straps or pitmen $109^3$. As the crank-arms are carried around, by the rotation of shaft $109^2$, a reciprocating movement is imparted to crank-rod $108^2$ through the medium of the connecting straps or pitmen $109^3$, which causes the slidable frame 108 to move in and out.

The connecting straps or pitmen carry the bearing-boxes $109^4$, within which ends of shaft 109 work. These bearing-boxes may be adjusted up or down by means of the set-screws $109^a$, the adjustment of which lengthens or shortens the stroke of the crank-rod $108^2$.

Rotary motion is imparted to shaft $109^2$ from central shaft $11^a$ through the medium of a train of gears, the inner gear 110 intermeshing with gear 89, secured upon the central shaft $11^a$, and the outer gear $110'$ meshing with gear-wheel $110^2$, secured upon shaft $109^2$, Fig. 7.

The cross-head $108^b$ is connected by pins $110^3$ to slide-rods $110^4$, which have a limited inward and outward movement upon the slidable frame 108.

To the upper face of the slide frame or plate 108 is secured, by pins or bolts $110^a$, the cross rods or plates $110^b$ $110^c$ $110^e$, being held a slight distance thereabove by thimbles $110^d$. The ends of cross rod or plate $110^c$ rest within the seats $110^h$, cut in upper face of slide-rods $110^4$, Fig. 46. This seat being of greater length than the width of the cross strap, rod, or plate, it is obvious that a limited inward or outward movement of the slide-rods is permitted independent of the slide-frame 108. To the upper face of the slide-frame I bolt the plates 111, which plates are cut away, so as to form arms $111^a$, which project a slight distance in advance of the said slide-plate. The arms of these plates fit, when the slide-frame has moved its full inward distance, inside the can-body held upon the horn or mandrel. Between the arms of the plates 111 works the push-rod $111^2$, to the outer end of which is secured the cross-plate $111^3$. This plate bears against the end of the can-body and serves to force the can-body from off the arms $111^a$ after the body has been withdrawn from the mandrel or horns and the nipper-arms have been released upon the inward movement of the slidable frame, as hereinafter more fully described.

Between the upper face of the slide-frame 108 and under face of the cross plates or straps connected thereto work what I term the "nipper-arms" 112 $112'$, which are connected together by lever $112^2$ and lever $112^3$, the inner end of the levers being secured to nipper-arms 112 and $112'$ by pins $112^4$ and outer end of lever $112^2$ to outer end of lever $112^3$ by pin $112^5$. The inner ends of the nipper-arms project beyond the slide-frame 108, the same as arms $111^a$, said nipper-arms being located at each side of the plate 111. These nipper-arms are connected, near their outer ends, to the slide plate or rod $112^a$ by short levers $112^b$ $112^c$, the outer ends of said levers being secured to the nipper-arms by pin $112^d$ and the inner ends to the slide plate or rod by pin $112^e$. This manner of securing the nipper-arms to the slide-rods $110^4$ and slide-rod $112^a$ by a series of levers forms a lazy-tongs connection, the nipper-arms being forced forward and backward and the inner ends in and out, so as to grasp a can-body and release the same with the opening and closing of the outer pair of levers, the nipper-arms being thus advanced or moved forward and closed at the same time. The outer end of each nipper-arm is provided with an inwardly-projecting shoulder 113, and the end of arms $111^a$ with outwardly-projecting shoulder $113'$. When the slide-frame 108 has moved its full outward distance, the can-body will be grasped or held between the face of these shoulders, the shoulder $113'$ bearing against the inner surface of the can-body and shoulder 113 against the outer surface.

As the cross-head is thrown forward or toward the horn or mandrel, the slide-rods $110^4$ are moved likewise a short distance independent of the slidable frame 108. This movement of the slide-rods causes the levers $112^2$ $112^3$ to straighten out, which throws the inner end of the nipper-arms slightly inward, so as to leave only sufficient space between the face of shoulders 113 of the nipper-arms and the shoulders $113'$ of the arms $111^a$ to receive the end of the can-body therebetween. The continued forward movement of the slide plates or rod $110^4$ causes the shoulders $113^2$ of the seats $110^h$ of said rods to engage with cross-rod $110^c$ and carry the entire slidable frame 108 inward its full distance, which places the projecting ends or arms $111^a$ of plate 111 within or inside the can-body, the wall of the can-body entering between the shoulders 113 of the slide-rods, and $113'$ of the arms $111^a$, Figs. 50 and 51. The inward movement of the slidable plate 108 carries the slide-rods $112^a$ therewith until the pin or stud $113^3$ engages with the projection $113^a$, Fig. 46, secured to flanges $107^a$ of slide-frame $106^3$. The strain exerted upon the slide-rods by the continued movement of the slidable frame 108, after the stud $113^3$ engages with the cam-plate $113^a$, forces the levers $112^b$ $112^c$ to move outward, which moves the outer end of the gripper-arms apart, throwing the inner ends together, the arms turning upon their fulcrum points or pins $112^4$, causing the can-body to be lightly grasped between the end of the nipper-arms and end of plate 111. As the slidable frame is moved inward, so as to place the end of the can-body between the nipper-arms and end of plate 111, the slide-plate $111^2$ is moved outward by cross plate or head $111^3$, engaging with the end of the can-body.

Inasmuch as the mandrel or seamer-horns, carrying the can-bodies, have continuous longitudinal rotary motion, it is a necessity that the extractor mechanism have a longitudinal reciprocal movement, in order that the horizontal reciprocal frame may be carried along or in unison with the horn while the can-body is being extracted from the horn or mandrel, and be returned to its former position after a can-body has been extracted and discharged. This movement of the horizontally-reciprocating slidable frame, which carries therewith the extracting devices for the can-bodies, is accomplished through the medium of the slide-frame $106^3$, which is moved back and forth by the rotation of the crank-cam $106^a$, as heretofore described.

In Fig. 48 of the drawings I have shown the position of the nipper-arms and connecting parts after the can-body has been withdrawn from the mandrel and released from between the said nipper-arms; while in Fig. 49 the position of said arms is illustrated after the cross-head $108^b$ has made its full inward stroke.

The moment the can-body has been grasped by the nipper-arms the slidable frame 108 begins to move outward or away from the horn or mandrel, being carried laterally by the longitudinal movement of the slide-frame $106^3$. As the said frame 108 is moved outward, the nipper-arms, carried thereby, remove or withdraw the can-body from off the horn or mandrel and deposit the same within the runway or chute $113''$, from which the can-bodies are conveyed to the heading-machine or any suitable place of deposit. Prior to the nipper-arms being carried outward, the knife-blade $78^2$ is raised from contact with the can-body by the roll $78^c$, secured to the end of knife-rod $78'$, being moved under the face of the incline of the fixed cam $82'$, Fig. 56.

As the nipper-arms move outward to remove the can-bodies from the mandrel or horn, the pin or stud $113^3$ contacts with stop-plate $113^4$, upwardly projecting from outer end of frame $106^3$, just before the slidable frame 108 has moved its full outward distance, and causes the slide-rod $112^a$ to cease its movement. As the frame 108 continues its travel for a short distance beyond this stop-plate $113^4$, it is obvious that the pressure exerted upon the slide-rod $112^a$ causes the levers $112^b$ $112^c$ to close in or shut, which draws the outer ends of the gripper-arms toward each other and separates the opposite ends, which releases the same from engagement with the can-body. The slidable frame continuing its movement after the slide-rod $112^a$ has been brought to a rest causes the free end thereof to engage the inner end of push-rod $111^2$. As the cross plate or head $111^3$ of the rod $111^2$ bears against the outer end of the can-body, it is apparent that as the slidable frame continues its outward movement the cross head or plate prevents the can-body from being carried therewith. This cross head or plate remaining stationary during this movement of the sliding frame and bearing against the end of the can-body causes the can-body to move from off the arms of the plate 111 and to drop into the discharge chute or runway $113''$.

It must be borne in mind that the speed of the driving mechanism for the slide-plate $106^3$ and 108 is so regulated that while the plate $106^3$ is being reciprocated longitudinally the plate 108 is moved toward or from the seamer-horns or mandrels. If a templet be taken of the movement of the slidable plate 108, the outline described will be found to be elliptical.

I make employment in the present machine of two sets of extracting devices, so as to remove two can-bodies from the horns or mandrels at the same time, thus increasing the output of the machine.

The moment the can-bodies have been extracted and discharged from the extractor mechanism, the slidable plates are immediately moved forward and inward, so as to cause the nipper-arms to grasp the can-bodies held upon the following traveling mandrels or horns.

While I have described the operation of the different features of my machine independently of each other and successively, it is not my desire that the working of the machine be understood as being intermittent, for such is not the case. Each feature is worked automatically and successively, and at no time during the working of the machine do the can-body-carrying horns or mandrels come to a standstill, but move with the endless traveling carrier chain or belt, to which they are secured.

I am aware that minor changes may be made in the arrangement of parts and details of construction herein shown and described without necessitating a departure from the nature and scope of my invention. Consequently I do not wish to be understood as confining myself to the specific construction and arrangement of the described parts.

As far as I am aware, I am the first to construct and devise a device for the soldering of can-bodies wherein the can-body blank is received and primarily formed prior to being delivered to the mandrels or horns, which receive the formed and unsoldered can-body blanks and convey the same, properly clamped and sized, to a movable solder-feed and flux-applying mechanism, by which the can is conveyed, in its clamped position, to continuously-moving soldering mechanism and thence to a continuously-moving extractor device, which removes the soldered can-bodies from the moving mandrels or horns and deposits the same within a suitable discharge-chute, the several parts working automatically, continuously, and successively.

I am well aware that by slight modification in the construction of my primary forming device the same may be utilized to form a can-body blank into a square or other shaped unsoldered can-body and automatically deliver the same to the moving mandrels or horns of the soldering-machine.

Briefly stated, the operation of the foregoing machine may be described as follows: The can-body blank as carried by the feed mechanism toward the seaming-machine is delivered to the primary forming device, which receives the blank sheet of metal and rolls the same, so as to remove the spring from the metal and partially form the can-body. The partially-formed can-body is then moved or conveyed toward the seaming-machine and placed upon one of the moving horns or mandrels carried by the endless traveling carrier chain or belt. When the can-body is placed upon the horn or mandrel, the clamp blade or knife is lowered, so as to bear upon the lap edge of the can-body and hold the same firmly down during the process of soldering. As the horn or mandrel with the can-body thereon is carried toward the flux and solder applying mechanism the gage or clamp plate engages the end of the can-body and gages or trues the same. The clamped and gaged can-body is then carried toward the soldering-irons, the necessary flux and solder being applied to the seam of the can-body as carried past the solder and flux applying mechanism. In my machine a number of horizontally rotary soldering-irons are employed, which irons bear upon the can-body as carried by the endless chain or carrier. These soldering-irons while bearing upon the clamped can-bodies have a reciprocating movement imparted thereto, which sweats the solder between the lap ends of the can-body, the said soldering-irons bearing upon the can-bodies during only a portion of their horizontally-rotary travel. During the travel of the horn or mandrel from the soldering-irons toward the extractor mechanism, the gage or clamp plate is moved away from the can-body and lowered, and the clamping blade or knife is raised, so as to leave the soldered can-body loose upon the horn or mandrel. As carried past the extractor mechanism the end of the soldered can-body is grasped by the nipper-arms of the extractor mechanism and removed from the horn or mandrel as the extractor mechanism is moved away from the seaming-machine. The soldered can-body is then removed from the nipper-arms and dropped within a discharge runway or chute.

Having thus described my invention, what I claim as new, and desire to secure protection in by Letters Patent, is—

1. In a can-body-soldering machine, the combination with the moving horns or mandrels, of the feed device for can-body blanks, a primary forming device which receives the blanks from the feed device and rolls the same so as to provide partially-formed can-bodies and mechanism for delivering the rolled can-body blanks to the horns or mandrels.

2. In a can-body-soldering machine, the combination with the moving horns or mandrels, of a primary forming device which receives the can-body blanks and rolls the same so as to remove the spring therefrom and provide partially-formed bodies, and mechanism for delivering the partially-formed bodies from the forming device to the horns or mandrels.

3. In a can-body-soldering machine, the combination with the longitudinally-traveling horns or mandrels, of the feed device for the can-body blanks, a movable forming device which receives the can-body blanks from the feed device and rolls the same, so as to provide partially-formed can-bodies, mechanism for conveying the blanks from the feed device to the forming device, and mechanism for delivering the partially-formed can-bodies from the forming device to the horns or mandrels.

4. In a soldering-machine, the combination with the continuously-traveling horns or mandrels, of a device for receiving the can-body blank and rolling the same so as to remove the spring from the metal and provide an unfastened or partially-formed can-body, and mechanism for delivering the partially-formed can-body from the forming device to a horn or mandrel.

5. In a can-soldering machine, the combination with the continuously-moving mandrels or horns, of mechanism for supplying can-bodies to the traveling mandrels or horns during their continuous movement, and the continuously and horizontally moving soldering-irons which bear upon the can-body during a portion of the travel of the horns or mandrels.

6. In a soldering-machine, the combination with the longitudinally and continuously moving horns or mandrels, of the soldering-irons moving continuously in a horizontal circle which bear upon the can-bodies during a portion of the longitudinal travel of the horns or mandrels and mechanism for imparting a reciprocating movement to the soldering-irons during the horizontal travel thereof.

7. In a soldering-machine, the combination with the longitudinally and continuously moving horns or mandrels of the soldering-irons moving continuously in a horizontal circle and the movable solder-supplying mechanism.

8. In a soldering-machine, the combination with the longitudinally and continuously moving mandrels or horns, of mechanism for supplying can-bodies to the said horns or mandrels during the continuous movement thereof, the horizontally and continuously moving soldering-irons which bear upon the can-body during a portion of the longitudinal travel of the horns or mandrels, and mechanism for imparting a reciprocating movement to the soldering-irons while they bear upon the can-bodies.

9. In a soldering-machine, the combination with the horns or mandrels of mechanism for imparting continuous longitudinal travel thereto, primary forming mechanism which receives the can-body blanks and rolls the same so as to remove the spring therefrom and provide unfastened can-bodies, mechanism for delivering the bodies thus formed to the horns or mandrels, and the horizontally and continuously moving soldering-irons which bear upon the can-bodies during a portion of the longitudinal travel of the horns or mandrels.

10. In a soldering-machine, the combination with the longitudinally and continuously moving horns or mandrels, of mechanism for receiving the can-body blanks and rolling or forming the same so as to form partially-formed or unfastened can-bodies, devices for imparting longitudinal movement to the forming mechanism so as to cause the same to move in unison with the mandrels and a horizontal movement thereto so as to deliver the partially-formed bodies to the traveling mandrels, and the horizontally and continuously moving soldering-irons which bear upon the can-bodies during a portion of the longitudinal travel of the mandrels or horns.

11. In a soldering-machine, the combination with the longitudinally and continuously moving horns or mandrels, of a longitudinally and horizontally reciprocating can-body-feed device, and continuously horizontally moving soldering-irons which bear upon the can-bodies during a portion of the longitudinal travel of the horns or mandrels.

12. In a soldering-machine, the combination with the longitudinally and continuously moving horns or mandrels, of a longitudinally and horizontally reciprocating device for forming the can-body blanks and delivering the same to the mandrels or horns while in motion, horizontally and continuously moving soldering-irons which bear upon the can-bodies during a portion of the longitudinal movement of the horns or mandrels, and mechanism for imparting a reciprocating motion to the soldering-irons while in contact with the can-bodies.

13. In a soldering-machine, the combination with the horns or mandrels, of mechanism for imparting longitudinal travel thereto, the soldering-irons, mechanism for imparting a horizontal movement thereto, devices for reciprocating the soldering-irons while bearing upon the can-bodies during a portion of the longitudinal travel of the horns or mandrels, and the longitudinally and horizontally reciprocating device for forming the can-body blanks and delivering the formed or unfastened can-bodies to the traveling horns or mandrels.

14. In a soldering-machine, the combination with the moving mandrels or horns, of an independent device which receives the can-body blanks and rolls the same so as to remove the spring from the metal and automatically delivers the rolled can-body blanks to the mandrels of the machine.

15. The combination in a soldering-machine, of a device for receiving the can-body blanks, rolling the same so as take the spring from the metal and provide unsoldered or unfastened bodies, and of mechanism for automatically delivering the partially-formed can-bodies to the soldering mechanism.

16. In a can-body-soldering machine, the combination with the movable horns or mandrels, of a movable device for receiving the can-body blanks and rolling the same so as to remove the spring from the metal and provide partially-formed can-bodies, and of mechanism for delivering the partially-formed can-bodies to the movable horns or mandrels.

17. In a soldering-machine, the combination with the traveling horns or mandrels, of the feed device for the can-body blanks, a device for receiving the can-body blanks from the can-body-blank feed, rolling the blanks so as to relieve the metal from the spring thereof and provide unsoldered can-bodies, and mechanism for delivering the rolled can-bodies to the horns or mandrels.

18. The combination with a soldering-machine of a movable device for receiving the can-body blank and rolling the same so as to relieve the metal of its spring and provide an unfastened or partially-formed can-body and of mechanism for delivering the partially-formed can-body to the seamer-horn.

19. In a soldering-machine, the combination with the longitudinally and continuously moving horns or mandrels, of mechanism for delivering the can-body blanks to the horns or mandrels, the solder-feed, longitudinally and horizontally reciprocating flux-applying device, and the horizontally and continuously moving soldering-irons.

20. In a soldering-machine, the combination with the longitudinally and continuously moving horns or mandrels, of the longitudinally-reciprocating solder-feed mechanism, the horizontally and longitudinally reciprocating flux-applying device, and the horizontally and continuously moving soldering-irons.

21. In a soldering-machine, the combination with the longitudinally and continuously moving horns or mandrels of the longitudinally-reciprocating solder-feed mechanism, the horizontally and longitudinally reciprocating flux-applying device, horizontally and continuously moving soldering-irons adapted to bear upon the can-bodies during a portion of the longitudinal movement of the horns or mandrels, and devices for imparting a reciprocating movement to the soldering-irons while resting upon the can-bodies.

22. In a soldering-machine, the combination with the longitudinally-traveling horns or mandrels, of a device for receiving the can-body blanks, forming or rolling the same so as to remove the spring from the metal and delivering the rolled bodies to the said horns or mandrels, the longitudinally-reciprocating solder-feed mechanism, the flux-applying device, and the horizontally-moving soldering-irons.

23. In a soldering-machine, the combination with the longitudinally and continuously moving horns or mandrels, of the primary can-body-forming device which receives the can-body blanks, forms or rolls the same and delivers the formed bodies to the traveling horns or mandrels, mechanism for imparting a longitudinally-reciprocating motion to the primary forming device, the longitudinally-reciprocating solder-feed mechanism, and the horizontally and continuously moving soldering-irons.

24. In a soldering-machine, the combination with the longitudinally and continuously moving horns or mandrels, of the flux-applying device, mechanism for imparting a longitudinally and horizontally reciprocating movement to the flux-applying device, the soldering-irons, and mechanism for horizontally moving the soldering-irons.

25. In a soldering-machine, the combination with the continuously-moving mandrels or horns, of the feed mechanism for the can-body blanks, and the continuously longitudinally and horizontally moving extracting device for the soldered can-bodies.

26. In a soldering-machine for can-bodies, the combination with the longitudinally and continuously moving mandrels or horns, of the feed mechanism for supplying can-body blanks to the mandrels or horns, the horizontally and continuously moving soldering-irons, and the longitudinally and horizontally continuously moving extracting device for the can-bodies.

27. In a soldering-machine, the combination, with the continuously-moving mandrels, of an independent and continuously, longitudinally and horizontally moving extracting device located at one side of the machine and of mechanism for imparting continuous movement to the extracting device.

28. In a soldering-machine, the combination with the continuously-moving horns or mandrels, of the feed mechanism for the can-body blanks, movable solder-feed mechanism, flux-applying device, continuously-moving soldering-irons, and the movable extracting device for removing the soldered can-bodies from the horns or mandrels.

29. In a soldering-machine, the combination with the continuously-moving horns or mandrels, of a device for receiving the can-body blanks, rolling or forming the same so as to remove the spring from the metal and provide partially-formed can-bodies and delivering the rolled or formed can-body blanks upon the traveling mandrels or horns.

30. In a soldering-machine, the combination with the longitudinally and continuously moving horns or mandrels, of mechanism for receiving the can-body blanks, rolling the same so as to remove the spring therefrom and form unfastened can-bodies, and delivering the rolled can-body blanks to the traveling horns or mandrels, and the horizontally and continuously moving soldering-irons.

31. In a soldering-machine, the combination with the horns or mandrels, of devices which receive the can-body blanks, roll the same so as to remove the spring therefrom and form rolled but unfastened can-bodies, and deliver the rolled bodies to the horns or mandrels, the solder-feed mechanism, and the moving soldering-irons.

32. In a soldering-machine, the combination with the continuously-moving horns or mandrels, of mechanism which receives the can-body blanks, rolls the same so as to remove the spring from the metal and provide rolled but unfastened can-bodies and delivers the rolled can-bodies to the traveling horns or mandrels, the movable solder-feed mechanism, and the continuously-moving solder-irons.

33. In a soldering-machine, the combination with the feed mechanism for the can-body blanks, of a device which receives the can-body blanks from the said feed mechanism and rolls the same so as to remove the spring therefrom and provide unfastened can-bodies, and a movable device for conveying the body-blanks from the feed mechanism to the rolling device.

34. In a soldering-machine, the combination with the moving horns or mandrels, of feed mechanism for the can-body blanks, a forming device for receiving the can-body blanks, rolling the same so as to remove the spring from the metal and provide rolled unfastened can-bodies and delivering the rolled can-bodies to the moving horns or mandrels, a movable device for conveying the can-body blanks from the feed mechanism to the forming device, the solder-applying mechanism, and the moving soldering-irons.

35. In a soldering-machine, the combination with the continuously-moving mandrels or horns, of the movable solder-supplying mechanism, devices for imparting longitudinal and horizontal movement to the solder-supplying mechanism, and the continuously-moving soldering devices.

36. In a soldering-machine, the combination with the longitudinally and continuously moving mandrels or horns, of the movable solder-supplying mechanism, devices for imparting a reciprocating movement to the solder-supplying mechanism, and the moving soldering devices.

37. In a soldering-machine, the combination with the moving mandrels or horns, of the horizontally and longitudinally moving solder-supplying mechanism, and the continuously-moving soldering-irons.

38. In a soldering-machine, the combination with the longitudinally and continuously moving mandrels, of the movable solder-supplying mechanism, devices for imparting a longitudinal and horizontal movement to the soldering-supplying mechanism and the horizontally and continuously moving soldering-irons.

39. In a soldering-machine, the combination with the longitudinally and continuously moving mandrels or horns, of the longitudinally and continuously reciprocating solder-supplying mechanism, and the horizontally and continuously moving soldering mechanism.

40. In a soldering-machine, the combination with the longitudinally and continuously moving horns or mandrels, of the horizontally and longitudinally movable solder-supplying mechanism, the horizontally and continuously moving soldering mechanism, and a device for reciprocating the soldering-irons during a portion of the horizontal movement of the soldering mechanism.

41. In a soldering-machine, the combination with the mandrels or horns moving continuously in a longitudinal circle, of the movable solder-supplying mechanism, and the reciprocating and horizontally-moving soldering devices.

42. In a soldering-machine, the combination with a series of mandrels or horns having a continuous, longitudinal movement, of the movable solder-supplying mechanism, and a series of soldering devices having a continuous, horizontal movement.

43. In a soldering-machine, the combination with the longitudinally and continuously moving mandrels or horns, of the horizontally and continuously moving soldering devices, the movable flux and movable solder supplying mechanism, and devices for regulating the feed of the solder, and imparting a reciprocating movement to the flux-supplying mechanism.

44. In a soldering-machine, the combination with the longitudinally and continuously moving mandrels or horns, of mechanism for receiving the can-body blanks, rolling the same so as to remove the spring from the metal and delivering the rolled can-body blanks to the mandrels, the movable solder-supplying mechanism, and the horizontally and continuously moving soldering mechanism.

45. In a soldering-machine, the combination with the movable mandrels or horns, of mechanism for receiving the body-blanks and rolling the same so as to remove the spring therefrom and delivering the rolled bodies to the mandrels or horns, movable solder-supplying mechanism, and the movable soldering mechanism.

46. In a soldering-machine, the combination with the longitudinally-moving mandrels or horns, of mechanism for receiving the can-body blanks and rolling the same so as to remove the spring therefrom and delivering the rolled body-blanks to the moving mandrels or horns, movable solder-supplying mechanism, and the horizontally-moving soldering mechanism.

47. In a soldering-machine, the combination with the movable mandrels or horns, of mechanism for receiving the blank sheets of metal, rolling the same to remove the spring therefrom and delivering the rolled bodies to the mandrels, movable solder-supplying mechanism, movable flux-applying device, and the movable soldering mechanism.

48. In a soldering-machine, the combination with the movable mandrel or horn, of mechanism for receiving a blank sheet of metal, rolling the same so as to remove the spring from the metal and delivering the rolled body to the mandrel, solder-supplying device, movable soldering mechanism, and a device for automatically removing the soldered body from the mandrel.

49. In a soldering-machine, the combination with the movable mandrel or horn, of mechanism for receiving a body-blank, rolling the same so as to remove the spring therefrom and delivering the rolled body to the mandrel, the solder-feed mechanism, reciprocating flux-applying device, the soldering mechanism, and the extracting mechanism for removing the soldered body from the mandrel.

50. In a soldering-machine, the combination with the longitudinally and continuously moving mandrels or horns, of the feed mechanism for the can-body blanks, the horizontally and continuously moving soldering mechanism, and the continuously-moving extracting device for removing the bodies from the mandrels or horns.

51. In a soldering-machine, the combination with the longitudinally and continuously moving mandrels or horns, of mechanism for receiving the blank sheets of metal, rolling the same and delivering the rolled blanks to the continuously-moving mandrels or horns, the horizontally and continuously moving soldering mechanism, and devices for automatically removing the soldered bodies from the continuously-moving mandrels or horns.

52. The combination with the longitudinally and continuously moving mandrels or horns, of the feed mechanism for the body-blanks, the solder-applying mechanism, the horizontally and continuously moving soldering mechanism, the extracting device for removing the soldered bodies from the moving mandrels or horns, and mechanism for imparting a longitudinally and a horizontally reciprocating movement to the extracting device.

53. The combination with the longitudinally and continuously moving mandrels or horns, of the movable solder-supplying mechanism, the horizontally and continuously moving soldering mechanism, and the continuously-moving body-extracting device.

54. In a soldering-machine, the combination, with the continuously-moving mandrels, of a continuously-moving extracting device located to one side of the mandrels and of mechanism for imparting a longitudinally and horizontally reciprocating movement to the extracting device.

55. The combination with a soldering-machine, of the moving horns or mandrels, and an automatically-operated device which receives the body-blanks, rolls the same so as to remove the spring from the metal and delivers the rolled body-blanks to the moving mandrels or horns.

56. The combination with a soldering-machine, of the horns or mandrels, mechanism for imparting continuous movement thereto, and an automatically and continuously operated device, which receives the body-blanks, rolls the same to remove the spring from the metal and delivers the rolled body-blanks to the horns or mandrels.

57. In a soldering-machine, the combination with the endless carrier, mechanism for imparting substantially an elliptical movement thereto, of a series of mandrels or horns secured to the endless carrier and carried thereby, mechanism for receiving the can-body blanks, rolling the same so as remove the spring therefrom and delivering the rolled body-blanks to the mandrels or horns, the solder-feed devices, the soldering mechanism, and the extracting device for removing the soldered bodies from the mandrels or horns.

58. In a can-soldering machine, the combination with the endless carrier, of the mechanism for imparting continuous movement thereto, a series of horns or mandrels secured to and carried by the endless carrier, the soldering mechanism moving continuously in a horizontal circle which bears upon the horns or mandrels during a portion of its horizontal movement and of devices for imparting a reciprocating movement to the soldering mechanism while bearing upon the horns or mandrels.

59. In a can-body-soldering machine, the combination with the continuously-moving horns or mandrels, of the mechanism for supplying can-body blanks thereto, the continuously-moving soldering mechanism, the extracting device which engages the end of the soldered can-bodies and automatically removes the same from the moving horns or mandrels and of mechanism for horizontally and longitudinally reciprocating the extracting device.

60. In a soldering-machine, the combination with the endless carrier, of a series of mandrels or horns secured thereto and carried thereby, the reciprocating solder-feed device, and the continuously-moving soldering mechanism.

61. In a soldering-machine, the combination with the endless carrier, of the mandrels or horns secured thereto and carried thereby, the reciprocating solder-feed device, the continuously-moving soldering mechanism, and the continuously-moving extractor for removing the soldered bodies from the mandrels.

62. In a soldering-machine, the combination with the endless carrier chain or belt having a series of mandrels or horns secured thereto, of the reciprocating solder-applying mechanism, reciprocating device for applying the flux to the bodies carried by the mandrels, the reciprocating and continuously-moving soldering mechanism, and the continuously-moving extractor device for removing the soldered bodies.

63. In a can-body-soldering machine, the combination with the continuously-moving endless carrier, of the mandrels or horns secured to and carried thereby, the soldering mechanism moving continuously in a horizontal circle said mechanism bearing upon the mandrels or horns during a portion of the horizontal movement, devices for reciprocating the soldering mechanism while bearing upon the mandrels or horns, the extracting device which engages the end of the soldered can-bodies and automatically removes the same from the mandrels or horns, and of mechanism for horizontally and longitudinally reciprocating the extracting device.

64. In a soldering-machine, the combination with the continuously-moving endless carrier belt or chain, of the mandrels or horns secured thereto and carried thereby, the reciprocating soldering mechanism, and the reciprocating flux-applying mechanism.

65. In a soldering-machine, the combination with the continuously-moving endless carrier belt or chain, of the mandrels or horns secured thereto and carried thereby, and the longitudinally and horizontally reciprocating solder and flux applying mechanism.

66. In a soldering-machine, the combination with the continuously-moving carrier chain or belt of the mandrels or horns secured thereto and carried thereby, the reciprocating solder and the reciprocating flux applying mechanism and the reciprocating and horizontally rotary-moving soldering mechanism.

67. In a soldering-machine, the combination with the continuously-moving endless carrier chain or belt, of mandrels or horns secured thereto and carried thereby, the continuously longitudinally-reciprocating solder-feed, the continuously-moving flux-applying mechanism, the horizontally and continuously moving soldering mechanism, and the extractor device for removing the soldered can-bodies from the continuously-moving mandrels or horns.

68. In a soldering-machine, the combination with the continuously-moving endless carrier chain or belt, of the mandrels or horns secured thereto and carried thereby, mechanism for receiving the body-blanks, rolling the same and delivering the rolled body-blanks to the moving mandrels or horns, and the vertically-movable knife or blade for holding down the lap edge of the rolled body during the operation of soldering.

69. In a soldering-machine, the combination with the continuously-moving mandrels or horns which receive and hold the can-bodies while being soldered, of the movable knife or blade carried by each mandrel or horn for holding down the lap edge of the body while being soldered, the continuously-moving soldering mechanism and a fixed cam for raising the knife or blade from the can-body after the soldering thereof.

70. In a soldering-machine, the combination with a series of longitudinally and continuously moving mandrels or horns, of a vertically-movable clamp blade or knife for each mandrel, the soldering mechanism moving continuously in a horizontal circle and devices for raising and lowering the clamp blade or knife.

71. In a soldering-machine, the combination with the continuously-moving mandrels or horns, of mechanism for rolling the can-body blanks and delivering the same to the moving mandrels or horns, a movable gage-plate connected to each mandrel or horn for sizing the can-body while held upon the mandrels or horns, and the movable clamp blade or knife for holding down the lap edge of the rolled body during the operation of soldering.

72. In a soldering-machine, the combination with the endless carrier chain or belt, of a series of mandrels or horns secured thereto and carried thereby, a movable gage-plate connected to each mandrel or horn, and fixed cams for throwing the movable gage-plate in and out of engagement with the end of the can-body held upon the mandrel or horn to which it is connected.

73. In a soldering-machine, the combination with an endless and continuously-moving carrier chain or belt, of series of mandrels or horns secured thereto and carried thereby, a spring-actuated clamp blade or knife for each mandrel or horn, which normally bears upon the lap edge of the body held upon the mandrel or horn, and fixed cams for elevating the clamp blade or knife during the movement of the mandrels.

74. In a soldering-machine, the combination with a series of continuously-moving mandrels or horns, of a movable clamp knife or blade carried by each mandrel or horn, the continuously-moving soldering mechanism, the fixed cams for raising the clamp blades or knives after the can-bodies carried by the mandrels or horns have been soldered and the extracting mechanism for removing the soldered can-bodies from the moving mandrels or horns.

75. In a soldering-machine, the combination with the continuously-moving mandrels or horns, of a movable gage-plate connected to each mandrel or horn for sizing the can-bodies, and devices for throwing the gage-plate in and out of engagement with the bodies held upon the mandrels or horns.

76. In a soldering-machine, the combination with the continuously-moving mandrels or horns, of the movable mechanism for receiving the body-blanks, rolling the same and delivering the rolled body-blanks to the moving mandrels or horns, the movable clamp blade or knife for each mandrel or horn, and the movable gage-plate for receiving the end of the bodies secured upon the mandrels or horns and sizing the bodies.

77. The combination with the continuously-moving mandrels or horns, of the movable gage-plate, and devices for throwing the movable gage-plate at an angle to the axis of the mandrels or horns during the movement thereof.

78. The combination with the mandrels or horns, of the movable gage-plate for sizing the body held upon the mandrel or horn, of devices for throwing the movable gage-plate at an angle to the axis of the mandrel or horn, and devices for moving the gage-plate toward and from the mandrel or horn, so as to move the same in and out of engagement with the end of the body.

79. In a soldering-machine, the combination with the longitudinally and continuously moving mandrels or horns, of mechanism for rolling the body-blanks and delivering the same to the mandrels or horns, gage-plates for receiving the ends of the rolled bodies and sizing the same, one of said plates being movable, devices for moving the movable gage-plate toward and from the mandrel or horn and throwing the same at an angle to the axis of the mandrel or horn, a clamp-plate or knife which bears upon the lap edge of the can-body, and the horizontally and continuously moving soldering mechanism.

80. In a soldering-machine for can-bodies, the combination with the continuously-moving endless carrier chain or belt, of a series of mandrels or horns for the can-bodies secured to and carried by said belt or chain, which mandrels or horns form a complete cylinder at one end, being cut away diagonally from one side and end to the opposite side and end, the movable clamp blade or knife, the fixed and movable gage-plates which receive the ends of the can-bodies when secured upon the mandrels or horns, and devices for throwing the movable gage-plate at an angle to the axis of the mandrels or horns and toward and from the mandrels or horns.

81. In a soldering-machine, the combination with a series of continuously-moving mandrels or horns, of continuously-moving mechanism which receives body-blanks, rolls the same and delivers the rolled bodies to the mandrels or horns, during the continuous movement thereof, the movable and fixed gage-plates carried by each mandrel or horn, and devices for throwing the movable gage-plate at an angle to the axis of the mandrel or horn and toward and from the same during the same continuous travel thereof.

82. In a soldering-machine, the combination with the soldering mechanism, moving continuously in a horizontal circle of automatically-operated devices for raising and lowering the soldering mechanism with the stopping and starting of the soldering-machine.

83. In a soldering-machine, the combination with the continuously-moving mandrels or horns, of mechanism for driving the same, continuously-moving soldering mechanism operated by the mechanism which imparts motion to the mandrels or horns, devices for starting and stopping the driving mechanism at will, and devices for automatically lowering and raising the soldering mechanism with the starting and stopping of the machine.

84. In a soldering-machine, the combination with the continuously-moving mandrels or horns, of the movable solder-supplying mechanism, the soldering mechanism, and devices for raising and lowering the soldering mechanism with the starting and stopping of the machine.

85. In a soldering-machine, the combination with the can-body-blank feed device, of the endless carrier belt or chain for conveying the body-blanks toward the soldering mechanism, mechanism for driving the endless belt or chain, mechanism for receiving the can-body blanks from the feed device and removing the spring from the body-blanks, and the reciprocating slide-plates which receive the body-blanks from the carrier-belt and deliver the same to the said mechanism.

86. In a soldering-machine, the combination with the continuously-moving mandrels or horns, of the solder-feed, mechanism for imparting a continuously longitudinally-reciprocating movement to the solder-feed, and the automatically-operated knife for cutting the solder-wire after the proper amount of solder has been placed upon the can-body carried by the moving mandrels or horns.

87. In a soldering-machine, the combination with the longitudinally and continuously moving mandrels or horns, of the soldering mechanism, moving continuously in a horizontal circle, the soldering-irons carried thereby, devices for reciprocating the soldering-irons, so as to move back and forth over the side seam of the body held upon the mandrels or horns, during a portion of the rotary travel thereof, and the inclined cam or track for raising or lowering the soldering-irons during the movement of the soldering mechanism.

88. In a soldering-machine, the combination with the longitudinally and continuously moving mandrels or horns, of the reciprocating solder-feed mechanism, the horizontally and continuously moving soldering mechanism, the soldering-irons carried thereby, device for reciprocating the soldering-irons, the inclined cam or track for raising and lowering the soldering-irons during the horizontal movement of the soldering mechanism, and the continuously-moving extractor mechanism for automatically removing the soldered bodies from the longitudinally-moving mandrels or horns.

89. In a soldering-machine, the combination with the longitudinally continuously-moving mandrels or horns, of mechanism for receiving the can-body blanks, rolling the same and automatically delivering the rolled blanks to the mandrels or horns, movable devices for clamping the bodies upon the mandrels or horns and sizing the same, the movable solder-feed mechanism, movable device for applying flux to the can-bodies, the horizontally and continuously moving soldering mechanism, the soldering-irons carried thereby, device for reciprocating the irons, inclined cam or track for raising and lowering the soldering-irons, and the extractor mechanism for automatically removing the soldered can-body from the moving mandrels or horns.

90. In a soldering-machine the combination with the continuously-moving mandrels or horns, of the continuously-moving soldering mechanism, soldering-irons carried thereby, device for reciprocating the soldering-irons, the extractor mechanism for the soldered bodies, and mechanism for automatically raising and lowering the soldering mechanism with the starting and stopping of the machine.

91. In a soldering-machine, the combination with the mandrels or horns, of the mechanism for rolling the can-bodies and delivering same to the mandrels or horns, devices for clamping the can-bodies upon the mandrels or horns and sizing the same, the solder and flux supplying mechanism, soldering mechanism, extracting mechanism for removing the soldered can-bodies from the mandrels or horns, and mechanism for automatically raising and lowering the soldering mechanism with the starting and stopping of the machine.

92. In a can-soldering machine, the combination with the moving mandrels or horns which receive the can-body blanks and convey the same to the soldering mechanism, of a device which receives the can-body blanks and rolls the same so as to remove the spring from the metal and provides partially-formed can-bodies prior to the blanks being delivered to the mandrels or horns, of mechanism which receives the can-body blanks after being rolled and automatically delivers the same to the moving horns or mandrels, and of devices for clamping the rolled body-blanks upon the mandrels or horns and sizing or gaging the same.

93. In a soldering-machine, the combination with the continuously-moving mandrels or horns, of continuously longitudinally reciprocating mechanism which receives the can-body blanks and rolls the same prior to the feed thereof to the moving mandrels or horns, a cup-shaped mandrel around which the body is rolled, mechanism for forcing said mandrel in and out so as to place the rolled can-bodies upon the continuously-moving mandrels or horns, and devices which automatically clasp the can-bodies upon the mandrels or horns and size the same.

94. In a can-soldering machine, the combination with the moving horns or mandrels, of the feed mechanism for the can-body blanks, a device which receives the can-body blanks from the feed mechanism and rolls the same so as to remove the spring from the metal and provide partially-formed can-bodies, and of mechanism for receiving the rolled can-body blanks and automatically placing the same upon the moving horns or mandrels.

95. In a soldering-machine, the combination with the continuously-moving mandrels or horns, of a set of feed devices for the can-body blanks, mechanism for operating the same so as to give an alternate feed, a set of devices for rolling the can-body blanks and delivering the same to the moving mandrels or horns, mechanism for alternately delivering the rolled bodies to the moving mandrels or horns, mechanism for imparting an opposite reciprocating movement to each forming device, the reciprocating slide-plates for conveying the body-blanks from the feed devices to the forming devices, and mechanism for imparting opposite reciprocating movement to the slide-plates.

96. In a soldering-machine, the combination with the moving mandrels or horns, of the set of devices for receiving the body-blanks and rolling the same so as to remove the spring from the metal, devices for receiving the body-blanks as rolled, and mechanism for alternately moving the said devices toward and from the moving mandrels or horns.

97. In a primary forming device for can-body-soldering machines, of the combination with the rolls between which the can-body blanks are fed, mechanism for imparting motion to said rolls, the forming-mandrel which receives the blanks as delivered from the rolls, and mechanism for moving the forming-mandrel so as to place the rolled body-blank held thereby upon the mandrels or horns of the soldering-machine.

98. In combination with the mechanism of a soldering-machine for receiving and rolling the can-body blanks, of the forming-mandrel composed of the clamp-plates and the cup-shaped mandrel, between which and the clamp-plates the rolled can-body is received, and mechanism for moving the forming-mandrel toward and from the soldering-machine.

99. The combination with a can-body-soldering machine, of the can-body-blank-forming mechanism which receives the body-blanks and rolls the same prior to delivering the rolled body-blanks to the mandrels or horns of the soldering-machine, the mandrel secured within the forming mechanism the plunger-rod for moving the mandrel toward and away from the mandrels or horns of the soldering-machine, and mechanism for imparting a horizontal reciprocating movement thereto.

100. In a device for receiving can-body blanks and rolling the same so as to remove the spring therefrom prior to delivering the can-body blanks to a can-body-soldering machine, the combination with the forming-mandrel within which the can-body blanks are rolled, the movable lock or clamp plate which holds the rolled body against the face of the mandrel as the body is moved toward the machine, the plunger-rod, mechanism for moving the same in and out, and devices forming connection between the plunger-rod and movable clamp-plate, whereby the clamp-plate is raised and lowered as the forming-mandrel is moved in and out.

101. In a device which receives can-body blanks and rolls the same prior to the delivery thereof to the mandrels or horns of the machine, the combination with the carriage, of mechanism for imparting a longitudinally-reciprocating motion thereto, the rolls between which the body-blanks are fed, the forming-mandrel for receiving the body-blanks from between the rolls, the plunger-rod for moving the forming-mandrel in and out, and of mechanism for imparting movement to the plunger-rod.

102. In a device for receiving can-body blanks and rolling the same so as to remove the spring therefrom, the combination with the forming-mandrel, of the plunger-rod, the rocker-arm for imparting reciprocating movement to the plunger-rod, and the crank-cam for operating the rocker-arm.

103. The combination with a soldering-machine for can-bodies, the sliding carriage, of forming mechanism carried thereby which receives the can-body blanks and rolls the same, devices for delivering the rolled can-body blanks to the mandrels or horns of the soldering-machine, the cam for imparting reciprocating movement to the carriage, and mechanism for operating the driving-cam.

104. In a soldering-machine, in combination with the forming-mandrel for the can-body blanks, of the plunger-rod for moving the forming-mandrel in and out, and devices for slightly rotating the plunger-rod as moved in and out so as to impart a twist to the forming mandrel or horn after the can-body has been placed upon the mandrel of the soldering-machine, so as to bring the lap edge of the can-body beneath the clamp plate or knife of the mandrel or horn of the soldering-machine.

105. In a soldering-machine, the combination with the vertical drive-shaft for the soldering mechanism, of mechanism for imparting rotary motion thereto, the movable keys working within grooves or channels cut in the vertical drive-shaft, the spider-frame connected to said keys, soldering-arms carried by said frame which arms carry the soldering-irons, and mechanism for raising and lowering the keys, so as to raise and lower the soldering-irons, with the stopping and starting of the drive mechanism.

106. In a soldering-machine, the combination with the spider-frame, of soldering-arms connected thereto, which arms carry the soldering-irons, the rotatable shaft to which the spider-frame is connected, mechanism for driving the rotatable shaft, and devices for imparting a vertical and reciprocating movement to the soldering-arms.

107. In a soldering-machine, the combination with the vertical shaft, of mechanism for driving the same, a spider-frame carrying the soldering mechanism, secured to said shaft by slidable keys, collar for supporting the slidable keys, the weighted fulcrumed rods connected to said collar, a cam for raising and lowering the fulcrumed rods, and mechanism for automatically operating said cam with the stopping and starting of the driving mechanism.

108. In a solder-feed mechanism of a soldering-machine for can-bodies, the combination with the reciprocating bed-plate, of the solder-feed tubes secured thereto, the grooved solder-feed rolls, operating-shaft for imparting rotary motion to the feed-rolls, rack-pinion rotating upon said shaft, rack-bar with which the rack-pinion engages, mechanism for raising and lowering the bed-plate, a pawl which engages with a gear rigid upon the operating-shaft as the bed-plate moves downward, the knife for cutting the solder, and a fixed cam for operating the solder-cutting knife.

109. In a soldering-machine, the combination with the flux-holding receptacles secured to the frame of the machine above the mandrels or horns, of the mandrels or horns, the flux-applying devices, and mechanism for imparting longitudinal and horizontal movement to the flux-applying devices, and for raising and lowering the said devices.

110. In a soldering-machine, the combination with the continuously-moving mandrels or horns, of continuously-moving mechanism for placing can-bodies upon more than one of the moving mandrels or horns, and continuously-moving devices for supplying solder and flux to more than one of the can-bodies simultaneously.

111. In a soldering-machine, the combination with the solder-feed mechanism, of the movable bed, mechanism for imparting longitudinal and horizontal movement to said plate, flux-applying devices connected to the plate, the lift-rod for raising and lowering the said plate, the fulcrumed lever connected to lower end of said rod, and the eccentric cam for actuating the fulcrumed lever so as to raise and lower the lift-rod.

112. In a soldering-machine for can-bodies, the combination with the endless carrier chain or belt, of mechanism for imparting continuous motion thereto, a series of mandrel-frames secured to the endless carrier chain or belt, a mandrel or horn secured to and projecting horizontally from each mandrel-frame, a movable gage-plate for each mandrel or horn, said plate having an annular groove cut within its inner face for reception of the end of the can-body.

113. In a soldering-machine, the combination with the mandrels or horns, of a movable gage-plate for each mandrel or horn, the arm to which said plate is connected, the sleeve projecting from the lower end of said arm, rotatable shaft to which said sleeve is keyed, fixed cams or devices for oscillating said shaft so as to raise and lower the gage-plate, and devices for moving the rotatable shaft in and out so as to move the gage-plate in and out of engagement with the end of the can-body secured upon the mandrel or horn.

114. In a soldering-machine, the combination with the endless carrier chain or belt, of the mandrels or horns projecting therefrom, the movable gage-plate, devices for lowering the gage-plate as the mandrel or horn is carried toward the extracting mechanism, the curved or inclined trackway or cam for gradually lowering the movable gage-plate, and the extractor for removing the can-bodies from the mandrels or horns.

115. In a soldering-machine, the combination with the feed mechanism, of the endless carrier for the body-blanks, the frame within which the same works, the rolls which receive the blanks from the endless carrier and remove the burs therefrom as the body-blanks pass therebetween, mechanism for imparting motion to the endless carrier and rolls, and devices which receive the can-body blanks and roll the same so as to remove the spring therefrom.

116. In a can-soldering machine, the combination with the horns or mandrels thereof, of a device located at one side of the soldering-machine which receives the can-body blanks and rolls the same so as to remove the spring from the metal prior to the blanks being placed upon the horns or mandrels of the soldering-machine, said device consisting of the rolls which receive the can-body blanks, the forming-mandrel which receives the body-blanks as delivered from between the rolls and the deflecting-plate located between the rolls and the forming-mandrel, and of mechanism for delivering the rolled and partially-formed can-body blank to the mandrels or horns of the soldering-machine.

117. In a can-body-soldering machine, the combination with the horns or mandrels, of the forming device located at one side of the soldering-machine which receives the can-body blanks and rolls the same so as to remove the spring from the metal prior to the blanks being placed upon the horns or mandrels of the soldering-machine, said forming device consisting of the rolls which receive the can-body blanks, the forming-mandrel which receives the can-body blanks as delivered from the rolls, and the adjustable deflecting-plate located between the rolls and the forming-mandrel, and of mechanism for delivering the rolled can-body blanks to the horns or mandrels of the soldering-machine.

118. In a soldering-machine for can-bodies, the combination with the continuously-moving mandrels or horns, of the continuously-moving extractor devices for removing the can-bodies from the moving mandrels, the movable gage-plates, devices for throwing the movable gage-plates out of engagement with the can-bodies held upon the mandrels or horns, as the mandrel is carried toward the extractor, the clamp blades or knives which bear upon the lap edge of the can-bodies, the movable arms to which the clamp-blades are secured, and the fixed cams, secured to the frame of the machine, with which the free ends of the arms of the clamp-blades engage during the travel of the mandrels or horns.

119. In a soldering-machine, the combination with the continuously-moving mandrels or horns, of mechanism for delivering can-body blanks thereto, devices for holding the can-body blanks upon the mandrels or horns, the continuously-moving extractor mechanism which automatically removes the soldered can-bodies from the mandrels or horns during the continuous movement thereof, and devices located within the pathway of the mandrels or horns which automatically release the holding devices for the can-bodies as the mandrels or horns are carried toward the extractor, whereby the can-bodies may be readily withdrawn from the mandrels or horns.

120. In a soldering-machine, the combination with the continuously-moving mandrels or horns which receive and hold the can-bodies, of the continuously-moving extractor for automatically removing the can-bodies from the mandrels or horns during the continuous movement thereof, and a device for discharging the can-body from the extractor after the same has been drawn off the mandrel or horn.

121. In a soldering-machine, the combination with the continuously-moving mandrels or horns, of the longitudinally and horizontally continuously-reciprocating extractor mechanism, the nipper-arms carried thereby, devices for opening and closing the nipper-arms, so as to grasp the can-body and release the same during the horizontally-reciprocating movement of the extractor mechanism, and a device for automatically discharging the can-body from the extractor upon the opening of the nipper-arms.

122. In a soldering-machine, the combination with the extractor mechanism for the can-bodies, of an upper and a lower slidable plate mechanism for imparting a continuously and longitudinally reciprocating movement to the lower plate and a continuously and horizontally reciprocating movement to the upper plate and devices which grasp the can-bodies upon the full forward movement of the upper plate and release the same upon its outward movement.

123. In a soldering-machine, the combination with the driving mechanism, of the extractor mechanism for the soldered can-bodies, and connection between the driving mechanism of the machine and extractor mechanism, whereby a continuously longitudinally and horizontally reciprocating movement is imparted to the extractor mechanism.

124. In an extractor device for can-body-soldering machines, the combination with the upper slidable plate, of mechanism for imparting a horizontally-reciprocating movement thereto, the nipper-arms, the slide-rods for moving the slidable plate, the slide-rod located between the nipper-arms, fixed cams upwardly projecting from the slidable plate which forces the last-mentioned slide-rod in and out, lazy-tongs connection between the nipper-arms and the slide-rods, and the fixed plate secured to the slidable plate between the free end of the nipper-arms, which plate fits within the can-body when the slidable plate is moved forward its full distance.

125. In an extractor for the can-bodies of a soldering-machine, the combination with the nipper-arms for engaging the can-bodies and removing the same from the horns or mandrels of the soldering-machines, devices for opening and closing the nipper-arms, the push-rod for releasing the can-body after having been extracted from the horns or mandrels of the soldering-machine and the slide-plate which engages the push-rod as the extractor mechanism is moved away from the soldering-machine.

126. In a soldering-machine, the combination with the extractor, of the upper slidable plate, mechanism for imparting a continuously horizontally-reciprocating movement thereto, mechanism for driving the machine, the central shaft connected thereto which operates the driving mechanism for the upper slidable plate, the lower slidable plate which carries the upper slidable plate, the cam for giving a continuously longitudinally-reciprocating movement thereto, and mechanism driven by the central shaft for imparting motion to the driving-cam.

127. The combination with the extractor mechanism for removing the soldered can-bodies from the mandrels or horns, of a soldering-machine, of the cross-head for moving the same forward and backward, the crank-arms connected thereto at their upper end by straps, cross-shaft to which the said arms are secured, the pitman connection between the lower end of the crank-arms and crank-arms of the drive-shaft, and of mechanism for transmitting the motion of the soldering-machine to the drive-shaft.

128. In a soldering-machine for can-bodies, the combination with a series of soldering-irons, of mechanism for giving continuous movement thereto, the fire-boxes, the air and gas reservoir composed of a rotatable and non-rotatable section, the rotatable section being secured to a vertical shaft which drives the soldering mechanism, each section of the reservoir being subdivided into an air and gas chamber, an air-inlet and a gas-inlet pipe communicating with said chambers, outlet-pipes extending from the air and gas chambers of the rotatable section, and flexible connections between the outlet-pipes and the fire-boxes for the soldering-irons.

129. In a soldering-machine, the combination with the soldering-irons, of mechanism for continuously rotating the same, devices for reciprocating the irons during the rotary movement thereof, the fire-boxes, the air and gas reservoir, consisting of a rotatable and a non-rotatable section, a packing-ring located between the sections so as to provide a seat, and the flexible connections between the rotatable section and the fire-boxes.

130. In a soldering-machine for can-bodies, the combination with the longitudinally-movable endless carrier chain or belt, of a series of mandrels or horns secured thereto and carried thereby, the feed mechanism for the can-body blanks, a device which receives the can-body blanks from the feed mechanism and rolls the same so as to remove the spring from the metal and delivers the rolled bodies to the mandrels or horns, movable devices for clamping the can-bodies upon the mandrels or horns, and sizing the same, mechanism for applying solder and flux to the can-bodies held upon the mandrels, horizontally-movable soldering mechanism, a series of soldering-irons carried thereby, gas and air supplying mechanism, devices for releasing the clamping devices which hold the can-bodies to the mandrels or horns, after the side seam of the can-body has been soldered, a device for automatically removing the released soldered bodies from the mandrels or horns, and mechanisms for imparting continuous movement to the several parts and causing them to operate in the order named.

131. In a soldering-machine, the combination with the horizontally and continuously moving soldering mechanism, of a series of soldering-irons carried thereby, the air and gas reservoir, consisting of a rotatable and a non-rotatable section suitably united, and the flexible air and gas connection between the soldering mechanism and the rotatable section of the air and gas reservoir.

132. In a can-body-soldering machine, the combination with the horns or mandrels, of a device for receiving the can-body blanks and rolling the same so as to remove the spring from the metal prior to the body-blanks being delivered to the horns or mandrels of the soldering-machine, said device being located to one side of the soldering-machine and consisting of the forming-mandrel, the forming-rolls which receive the can-body blanks and feed the same to the forming-mandrel and a device which prevents the can-body blanks moving above the forming-mandrel after being fed thereto by the forming-rolls, and of the mechanism for delivering the rolled can-body blanks to the horns or mandrels of the soldering-machine.

133. The combination with a continuously-moving mandrel or horn, of the continuously-moving solder-supplying mechanism, and reciprocating soldering devices moving continuously in a horizontal circle.

134. The combination with a series of continuously-moving mandrels or horns, of the continuously-moving solder-supplying mechanism, a movable flux-supplying device and a series of reciprocating soldering devices moving continuously in a horizontal circle.

135. The combination with a continuously-moving mandrel or horn, of the continuously-moving solder-supplying mechanism, and of the soldering device moving continuously in a horizontal circle.

136. The combination with the continuously-moving mandrel or horn, of a movable solder-supplying mechanism, and of a soldering device moving continuously in a horizontal circle and bearing upon the mandrel during a portion of its movement, and a device for imparting a reciprocating movement to the soldering device while bearing upon the mandrel or horn.

137. The combination with the continuously-moving mandrel or horn, of the continuously-moving feed mechanism for automatically placing the can-body blanks upon the moving mandrel or horn, the continuously-moving solder-feed mechanism for supplying solder to the moving can-bodies carried by the mandrel or horn and the continuously-moving soldering device.

138. In a soldering-machine for can-bodies, the combination with the longitudinally and continuously moving endless carrier, a series of horns or mandrels secured thereto and carried thereby, the soldering mechanism moving continuously in a horizontal circle and devices for imparting a reciprocating movement to the soldering-irons carried by the soldering mechanism during a portion of the travel of said mechanism.

139. In a soldering-machine, the combination with the continuously-moving horns or mandrels, of the soldering mechanism moving continuously in a horizontal circle.

140. In a soldering-machine, the combination, with the continuously-moving horns or mandrels, of the flux-applying device, the solder-feed and the soldering mechanism moving continuously in a horizontal circle.

141. In a soldering-machine, the combination with the continuously-moving mandrels or horns, of the soldering mechanism carrying a series of soldering-irons which move continuously in a horizontal circle and devices for raising and lowering the soldering-irons during the movement of the soldering mechanism.

142. In a can-body-soldering machine, the combination with the continuously-moving horns or mandrels, of the soldering-irons moving continuously in a horizontal circle and which bear upon the horns or mandrels during a portion of their travel, devices for moving the soldering-irons back and forth over the seam of the can-body held upon the horns or mandrels and of mechanism for automatically raising and lowering the soldering-irons.

143. In a can-body-soldering machine, the combination with the continuously-moving horns or mandrels, of the continuously-moving mechanism for supplying can-body blanks to the horns or mandrels, a series of soldering-irons moving continuously in a horizontal circle, devices for reciprocating the soldering-irons and raising and lowering the same during the movement thereof and of the continuously-moving extracting mechanism for automatically removing the soldered can-bodies from the moving horns or mandrels.

In testimony whereof I affix my signature in the presence of two witnesses.

HENRY SCHAAKE.

In presence of—
N. A. ACKER,
L. C. CHRISTIE.